United States Patent [19]

Furuya et al.

[11] 4,327,440

[45] Apr. 27, 1982

[54] SIGNAL DETECTOR FOR USE IN DIGITAL COMMUNICATION

[75] Inventors: Yukitsuna Furuya; Fumio Akashi, both of Tokyo, Japan

[73] Assignee: Nippon Electric Co., Ltd., Tokyo, Japan

[21] Appl. No.: 132,482

[22] Filed: Mar. 19, 1980

[51] Int. Cl.³ ................... H03K 13/34; H04L 27/06
[52] U.S. Cl. .......................................... 375/76; 371/6;
364/723; 375/94; 375/99; 375/103; 329/104
[58] Field of Search .................. 329/104; 371/6, 22,
371/26, 30, 31; 340/146.2 D, 146.3 R, 146.3
AQ, 149; 365/78; 375/76, 16, 82, 94, 99, 102,
39; 455/184, 307, 312; 364/514, 723, 480, 200,
900, 577

[56] References Cited

U.S. PATENT DOCUMENTS

| Re. 27,047 | 2/1971 | Lucky | 375/16 |
| 3,386,078 | 5/1968 | Varsos | 371/6 |
| 3,925,732 | 12/1975 | Tanaka | 375/94 |
| 4,163,209 | 7/1979 | McRae | 371/6 |
| 4,223,404 | 9/1980 | Lowenschuss | 375/94 |

OTHER PUBLICATIONS

IEEE Transactions on Information Theory, Jan. 1971, "Feedback Equalization for Fading Dispersive Channels".
IEE Transactions on Communications, vol. COM-25, No. 7, Jul. 1977, "Maximum Likelihood Sequence Estimation . . . ".
IEEE Transactions on Communications Technology", vol. COM-16, No. 6, Dec. 1968, "Error Control in Duobinary Data Systems".

*Primary Examiner*—Benedict V. Safourek
*Attorney, Agent, or Firm*—Townsend and Townsend

[57] ABSTRACT

A signal detector for use in the digital signal communication, comprising a tentative decision means for assigning certain symbols to receiving signals based on a predetermined value; a first memory means for storing the output of said tentative decision means in sequence; a second memory means for storing a plurality of reference values prepared in association with all the signals to be received, said signals corresponding to the symbol sequence assigned by said first memory means; a selection means for selecting at least one of said reference values based on at least a part of the contents of said first memory; and a processing means wherein there is proceeded by using said selected reference value the process to relate said receiving signals with signals to be received that are most likely receiving signals among all the signals to be received, thereby producing output.

48 Claims, 41 Drawing Figures

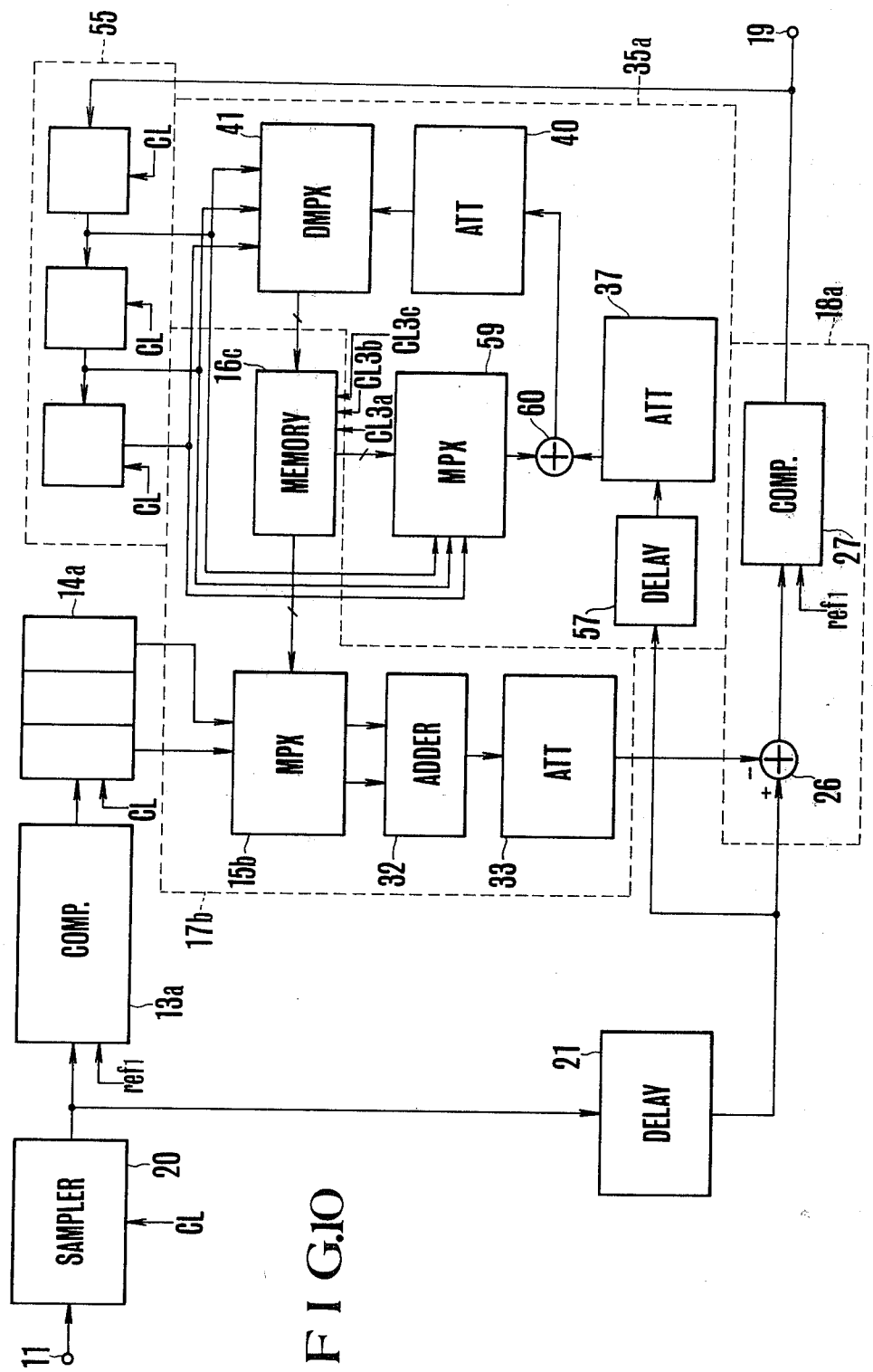
F I G. 10

F I G.12
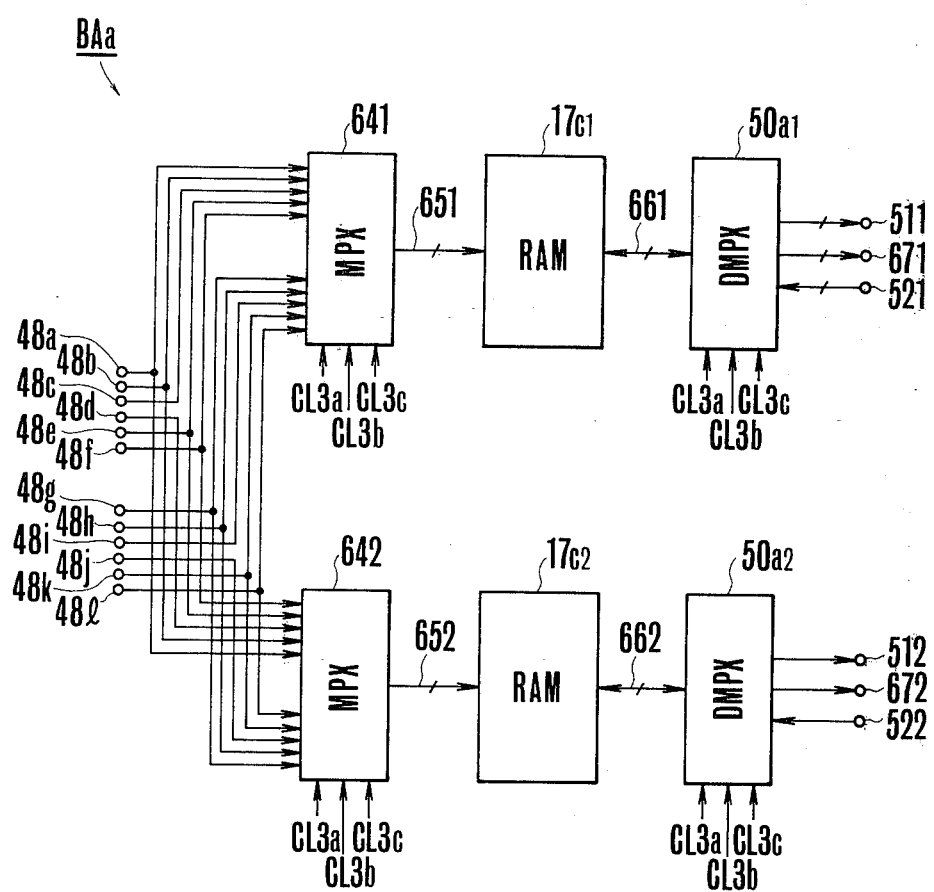

F I G. 16
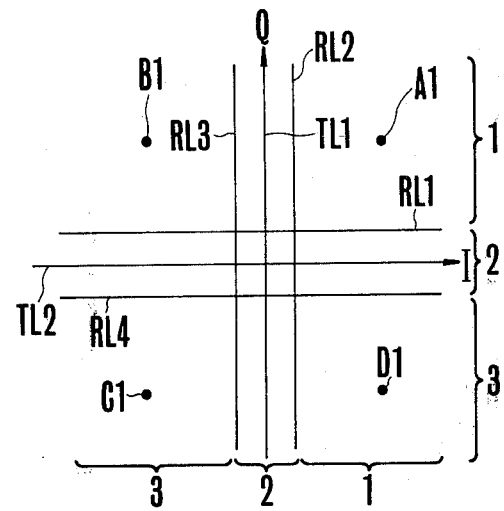
F I G. 17
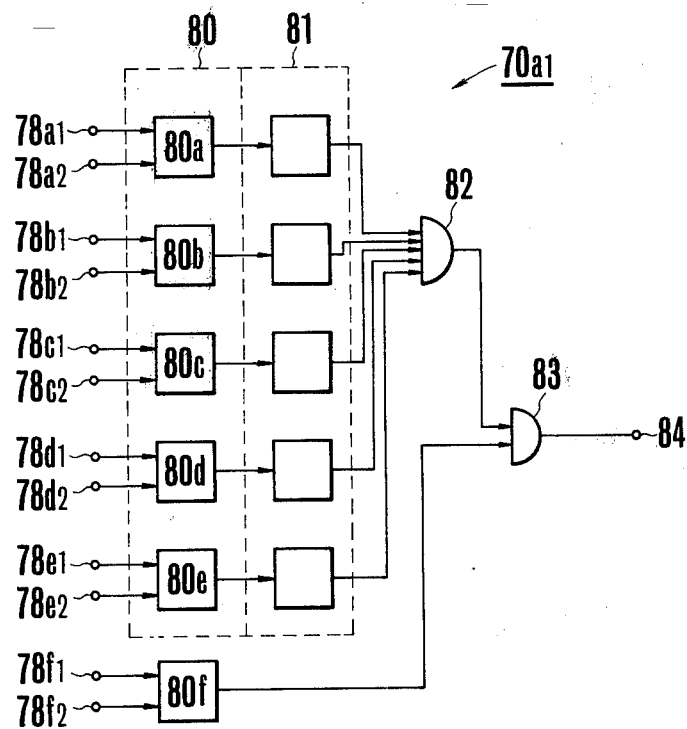

SIGNAL DETECTOR FOR USE IN DIGITAL COMMUNICATION

BACKGROUND OF THE INVENTION

This invention is related to a signal detector for use in digital communication, and more particularly it concerns the signal detector which is used at a signal receiver side in the digital communication by using cables or electric waves.

It is known that the quality of such digital communication become worse when an intersymbol interference occures. In order to prevent such quality degeneration in the digital communication, a lot of trials have been made to obviate such distortion as generated in signals during transmission thereof. In almost all the trials, the impulse response of the transmission system is estimated first, and then receiving signals are equalized based on such estimation, thereby obviating the distortion involved therein. Such technology will be seen in the article, for instance, which is reported by Peter Mousen and entitled "Feedback Equalization for Fading Dispersive Channels" (IEEE Transaction on Information Theory, January 1971, p 56-64).

According to the technology as mentioned above, the linear distortion is removed out satisfactorily. The non-linear distortion, however, which is generated by a non-linear amplifier adopted in the transmission system is hardly removed out by such a prior art having been developed so far.

SUMMARY OF THE INVENTION

Accordingly, a principal object of the present invention is to provide the signal detector which is able to remove the distortion caused in the signal transmission line regardless of the linear or non-linear distortion.

According to the present invention, in order to achieve the object as mentioned above there is provided a signal detector for use in the digital signal communication, which comprises: a tentative decision means for assigning certain symbols to receiving digital signals based on a predetermined value; a first memory means for storing the output of said tentative decision means in sequence; a second memory means for storing a plurality of reference values prepared in association with all the signals to be received, said signals corresponding to symbol sequence assigned by said first memory means; a selection means for selecting at least one of said reference values based on at least a part of contents of said first memory; and a processing means for in which there is proceeded by using selected said reference values the process to relate said receiving signals with signals to be received that are most likely to said receiving signals among all the signals to be received, thereby producing output.

According to another aspect of the present invention, there is provided a signal detector for use in the digital communication wherein said reference values are the distortion quantity and said process means for generating the output is provided with a means which compensates the distortion of said receiving signals by using said distortion quantity.

According to still another aspect of the present invention, there is provided a signal detector for use in digital communication, wherein said reference values are desired receiving signals; said selection means transmits a plurality of desired receiving signal sequence based on contents of said first memory; said process means includes means for calculating vector metric distance (size) between contents of said first memory and corresponding receiving signals; and a final decision means transmits the minimum of said calculation result as an output.

BRIEF DESCRIPTION OF THE DRAWINGS

FIG. 10 is a block diagram to show the signal detector which is further modified from that shown in FIG. 7;

FIG. 12 is a block diagram to explain the contents of the block BAa in FIG. 11;

FIG. 16 is a graph to explain the null region in connection with the reliability detector circuit in FIG. 15;

FIG. 17 is a block diagram to show the concrete example of the reliability detector being used in the signal detector as shown in FIG. 13;

DESCRIPTION OF THE PREFERRED EMBODIMENT

Figure 1:
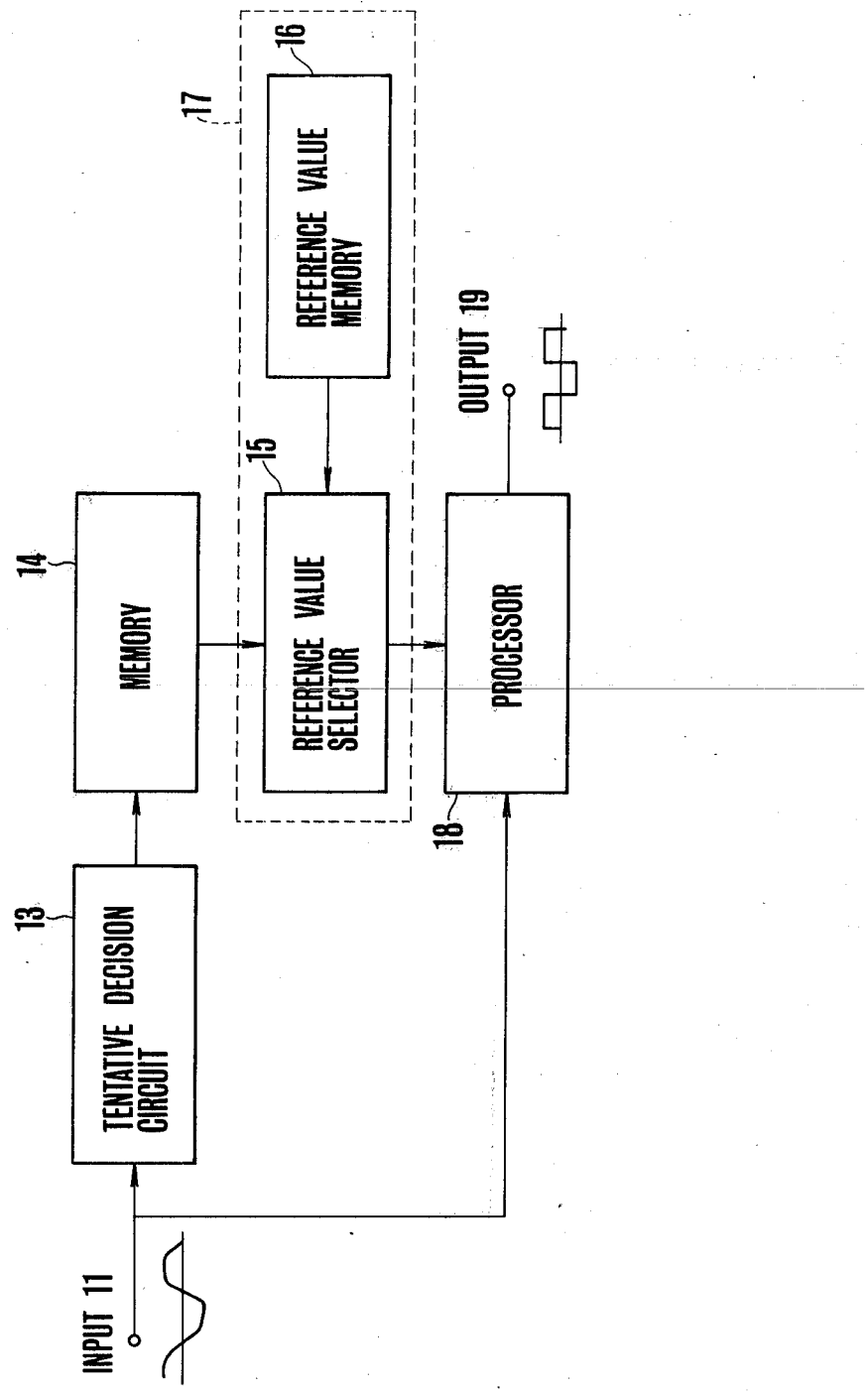
FIG. 1 is a block diagram showing the fundamental principle of the signal detector according to the present invention.

FIG. 1 is a block diagram showing the fundamental construction of the signal detector according to the present invention. An input terminal 11 of the signal detector is used to receive digital signals which are transmitted through a known signal transmission system. In the digital signal communication, it is general that digital signals to be transmitted receive some restriction as to their frequency band when being transmitted. This is done for making use of the frequency band of the transmission line effectively. Digital signals having been transmitted then arrive at the input terminal 11 after they have received various distortion, which is inherent in the transmission line. Consequently, the symbols represented by two digital values, for example, come to have a broad wave form spreading across several time slots at the receiving end, thus causing intersymbol interference in front and rear time slots. One example of such wave forms is shown at the input terminal 11 in FIG. 1.

Digital signal received at this input terminal are transmitted to a tentative decision circuit 13, where a certain symbol is assigned to the signal in each time slot of the receiving signals in accordance with the rule predetermined, and then is put out therefrom. For instance, the circuit 13 may be a comparator, which gives a binary output "1" or "0" according to whether the amplitude of the receiving signal is larger or smaller than a criterion. The output of the tentative decision circuit 13 is transmitted to the memory 14 and is stored therein as a data pattern decided tentatively. The memory 14 may be a series shift register with plural bits. Signals having been transmitted from the circuit 13, in this case, come to be stored in the shift register in series in order. The output of the memory 14 is parallelly taken out therefrom, and then is transmitted to a selection means 15 for selecting a reference values, which constitutes a memory circuit 17 for memorizing reference values in cooperation with a reference value memory 16 and is adapted to select the output from the memory 16 by referring to the parallel output from said memory 14. The reference value memory 16 is adapted to memorize a plurality of reference values provided in association with all the signals to be received and corresponding to the symbol sequence transmitted from the memory 14. As will be discussed later, said reference value may be a correction value needed for removing the distortion which has been superposed on receiving signals during their transmission, or possible values of symbols to be decided in correspondence with detected patterns. The reference value selected by said selection means 15 is then transmitted to a processor 18, which processes receiving signals through the input terminal 11, by using said reference values so as to make said receiving signals correspond to the most likely signals to be received, and then transmits the processed signal as a decision output. When said correction value is used as a reference, it is subtracted from the receiving signal and then the result of the subtraction is compared with the reference to obtain a final decision output. When possible values of symbols to be decided are used as a reference, vector metric between the receiving signal and each of possible values is calculated, and the final decision is made by using the minimum of said calculated vector distance. The decision output obtained in such way is transmitted from the output terminal 19. The wave form of the output from said output terminal will be almost same as the digital signal transmitted initially, which does not include any distortion therein as shown near the terminal 19 of FIG. 1.

According to the constitution as mentioned above, it becomes possible to eliminate the non-linear distortion that is caused by the conventional transmission system, by using the tentative decision circuit. More particularly, based on the output of the tentative decision circuit, a reference value is selected in association with the signal to be received, thereby obtaining the output which is associated with the signal to be received but does not include non-linear distortion.

More concrete costruction and operation of the signal detector according to the present invention will be more fully understood through the following description on various concrete embodiments.

Figure 2:
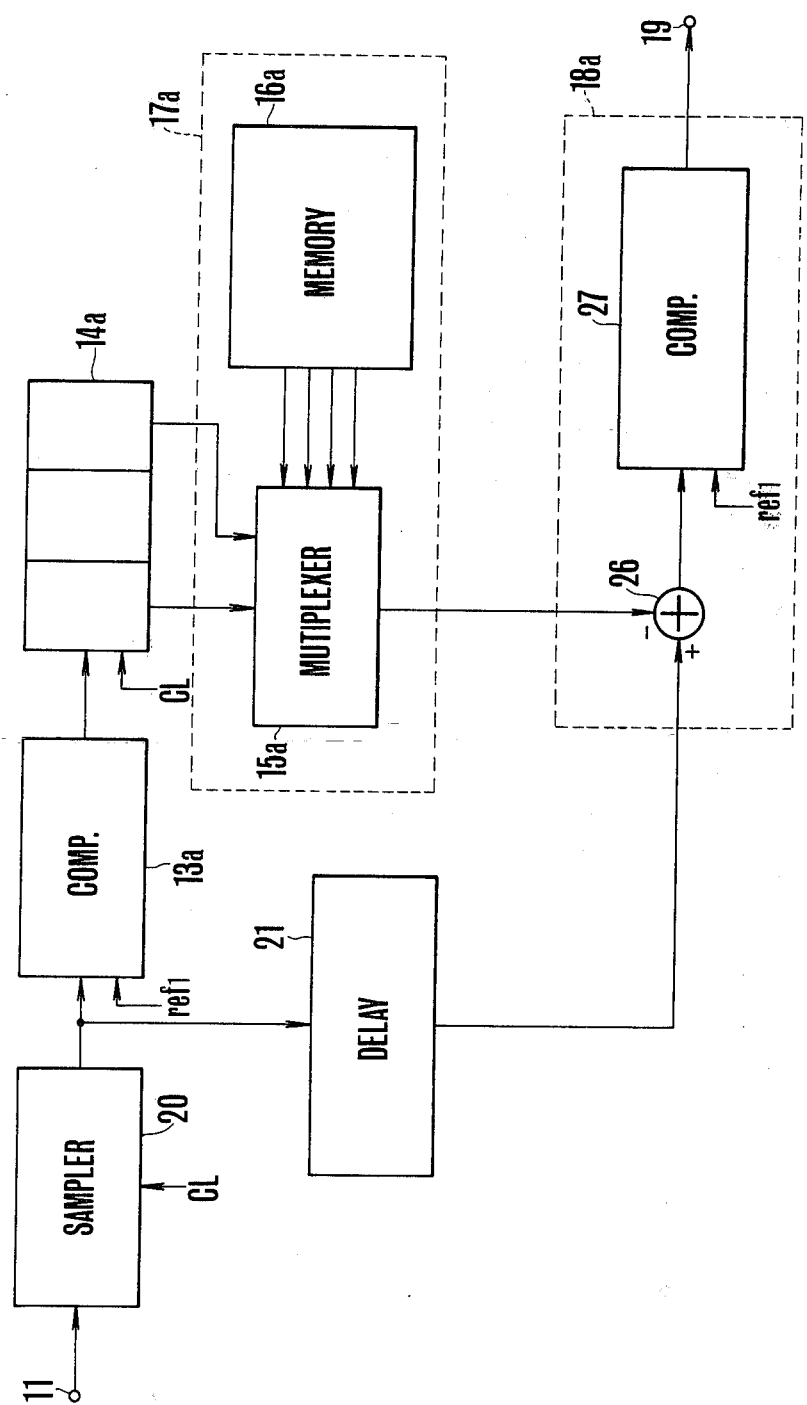
FIG. 2 through FIG. 4 are block diagrams showing the signal detector embodying the present invention, which is suitable for the communication using two value digital signals and in which the threshold system is adopted.

FIG. 2 is a diagram of the signal detector embodying the present invention, showing more concrete constituents of the signal detector. When intersymbol interference is made in a receiving signals to be decided, by symbols having been transmitted immediately before and after said receiving signal, it is necessary to remove such interferene from the receiving signals in order to obtain a digital signal with two values. The embodiment shown in FIG. 2 is for removing such interference as mentioned above. Input signals from the input terminal 11 receive a sampling process which is executed by a sampler 20 according to a predetermined timing signal CL. Then, a tentative decision "0" or "1" is assigned to the sampled signal through a tentative decision circuit, which is a comparator 13a in this instance. The decision threshold of the comparator in this case is the intermediate voltage between the voltage at the time when "1" is received without any distortion and the voltage when "0" is received without any distortion. The data decided are put into a pattern detection circuit, which is a shift register type memory 14a. In this instance, the shift register is of 3 stage type. The analog voltage sampled by the sampler 20 is received by a processor that is a final decision circuit 18a through a delay line or a delay circuit 21 which delay signals by 1 time slot. Owing to this, the output from this delay circuit 21 comes to show an analog value corresponding to the 2nd decision of the shift register 14a. The contents of the first and 3rd bits of said memory 14a are transmitted to a distortion quantity memory means 17a. The output of this memory 14a is transmitted to the selector of said memory means 17a which is a multiplexer 15a. This multiplexer 15a is adapted to pick up from a memory 16a an estimated distortion corresponding to bit patterns stored in the first and 3rd stages of said shift register 14a. The estimated distortion is transmitted to a final decision circuit 18a, which comprises a subtracting means 26 and a comparator 27 which is same as the comparator 13a. The subtracting means 26 is operated to subtract said estimated distortion from the output of the delay circuit 21. At the comparator 27, there is made the comparison between the result of said subtraction and a reference value ref. 1. Based on this comparison, the tentative decision is reviewed to make a final decision. When the final decision is made, it is transmitted from the output terminal 19.

In the following paragraphs, the method of obtaining estimated distortion voltage stored in the memory 16a will be described by taking the case, for instance, where estimated distortion voltage for the bit pattern (1, 1, 1) is determined. At first, there is obtained the average voltage $a_{v1}$ for the center bit "1" of the bit pattern (1, 1, 1) when said pattern is received, and then the average voltage $a_{v0}$ for the center bit "0" of the bit pattern (1, 0, 1) is obtained when said pattern is received. The receiving voltage generally includes distortion caused by noise and intersymbol interference. It may be possible, however, to eliminate almost all the influence due to such noise by averaging a lot of data. Consequently, average voltage $a_{v0}$, $a_{v1}$ as obtained above come to represent average distortion quantity due to intersymbol interference.

Accordingly, the estimated distortion $v_d$ is expressed as follows.

$$v_d = \frac{a_{v0} + a_{v1}}{2} - v_{th} \quad (1)$$

where $v_{th}$ is same as the same decision threshold as used in the comprator 13a. The estimated distortion for other bit patterns is obtained in the same way. The estimated distortion voltage is obtained for 4 combinations (1, X, 1), (1 X, 0), (0, X, 1) and (0, X, 0) in this embodiment and then stored in the analog memory 16a. "X" denotes "1" or "0" in the above 4 combinations. In the multiplexer 15 connected with the analog memory 16a, said 4 estimated distortion voltages stored in the memory 16a is switched by using the first and the last bits of the shift register 14a, and the estimated distortion voltage for the center symbol corresponding to the symbol series stored in the shift register 14a is transmitted to the final decision circuit 18a. In this final decision circuit, the estimated distortion voltages from said multiplexer 15a is subtracted from the analog voltage from the delay circuit 21, and the result of the subtraction is then transmitted to the comparator 27 to compare with the decision threshold $ref_1$ that is same as used in the comparator 13a. As described above, the decision is made by shifting the decision threshold by the quantity of the estimated decision, thereby a correct decision being obtainable.

The method as described above may be applied not only to the linear distortion but also to the non-linear distortion. In the linear system, the ith sample $b_i$ of receiving signal is generally expressed by the following equation.

$$b_i = \sum_k a_{i+k} \cdot h_{-k}$$

where $\{a_i\}$ denotes a transmitting symbol series and $\{h_{-k}\}$ the amplitude which is obtained by sampling the impulse response of the system by the band rate. The term $a_i h_0$ ($h_0$: the basic term of $h_k$) appearing on the right handside of the equation (2) represents a likely signal to be received, but others represent signals affected more or less by intersymbol interference. In the equation (2), $h_k$ depends on such characteristics of the transmission line, so that when said characteristics are maintained being unchanged, intersymbol interference is dominated by symbol series before and after the signal $a_i$ that is the likely signal to be received. According to the above instance, when averaging the receiving voltage by fixing one symbol each before and after the likely signal, the average receiving voltage obtained comes to include intersymbol interference from said each one symbol before and after the likely signal. As will be understood from the equation (2), the intersymbol interference caused by the symbols before and after the likely signal $a_i$ is independent of itself. Accordingly, each average receiving voltage deviates equally from the likely voltage to be received, thus intersymbol interference caused by symbols before and after the likely symbol being eliminated.

The method as mentioned heretofore is also applicable to the handling of the non-linear distortion that can not be eliminated by a conventional linear automatic equalizer. In the non-linear channel, generally, the sample $b_i$ of the receiving circuit is expressed as follows.

$$b_i = \sum_{j_1} \sum \ldots \sum_{j_{2n+1}} \beta_{j_1 j_2 \ldots j_k \ldots j_{2n+1}} \quad (3)$$

$$\begin{matrix} j_1 & & j_{n+1} & & j_{2n+1} \\ a_{i-n} & \ldots & a_i & \ldots & a_{i+1} & \ldots \end{matrix}$$

where, $j_k$ represents 0, 1, 2, . . . and $\beta_{j_1 \ldots j_{2n+1}}$ represents the magnitude of the intersymbol interference caused by linear and non-linear distortion. There term $$\sum_{k=1}^{2n+1} j_k = 1$$

appears also in the case of the linear transmission system while the other terms only in the case of non-linear transmission system. In this case, the desired signal is represented by the term where $j_{n+1}=1$, $j_k=0$ ($k\neq n+1$). All the other terms denote distortions. Among these distortions, what the linear automatic equalizer can remove is that represented by the term $$\sum_{k=1}^{2n+1} j_k = 1 \; (j_{n+1} = 1).$$

According to the present method, however, all the terms with $j_{n+1}=0$ which represent the distortion independent of the value of $a_i$ can be removed. Accordingly, the signal detector of the present invention makes it possible to remove distortions which the conventional linear equalizer could not remove.

In the embodiment, it is intended to remove the intersymbol interference caused by each symbol before and after the likely signal to be received. When intersymbol interference is caused by remote symbols, it may be possible to remove such interference by increasing the stage number of the shift register 14a and the time of delay by the delay circuit 21. The estimated distortion voltage respectively corresponding to bit patterns of the shift register 14a is stored in the analog memory 16a. The shift register 14a with 5 bits may be enough for this purpose. The number of the data to be stored in the analog memory 16a will be exponentially increased when intersymbol interference is caused by more than two symbols. In order to prevent the extreme increase of memory capacity, the following should be considered. That is, the estimated distortion quantity will be calculated and stored in the memory only when patterns with big distortion are detected while it will be made zero when the other patterns are.

In the embodiment as described above, the receiving signals are first sampled by the sampler 20 and then receive decision by comparators 13a and 27. It may be possible, however, to omit the sampler 20 and to let said comparators 13a and 27 have sampling function instead.

Figure 3:
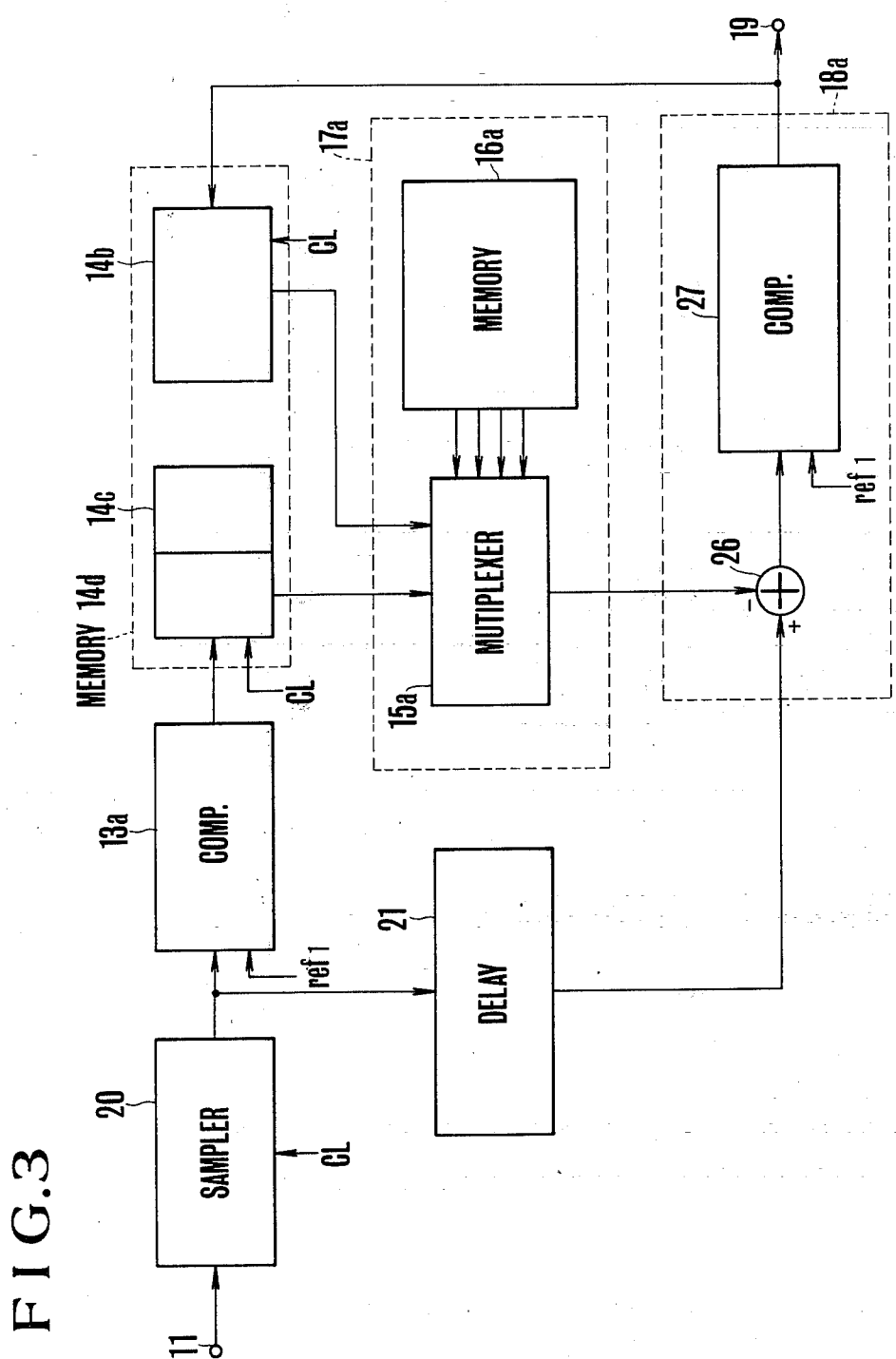

FIG. 3 is a block diagram showing the embodiment modified from that shown in FIG. 1. In the embodiment shown in FIG. 2, when the delay circuit 21 transmits its output on which the correction will be executed for symbols which are received by the shift register 14a before said output has already received a final decision, it is desirable to use the output from the final decision circuit 18a. FIG. 3 shows the embodiment suitable for such case. The output from the circuit 18a is transmitted to a memory 14b with one bit. The output from this memory 14b is then supplied to the multiplexer 15a of the memory 17a along with the first bit output from the 2-bit shift register. Accordingly, the memory 14d comprising the memory 14b and 14c becomes equivalent to the memory 14 as shown in FIG. 1.

Figure 4:
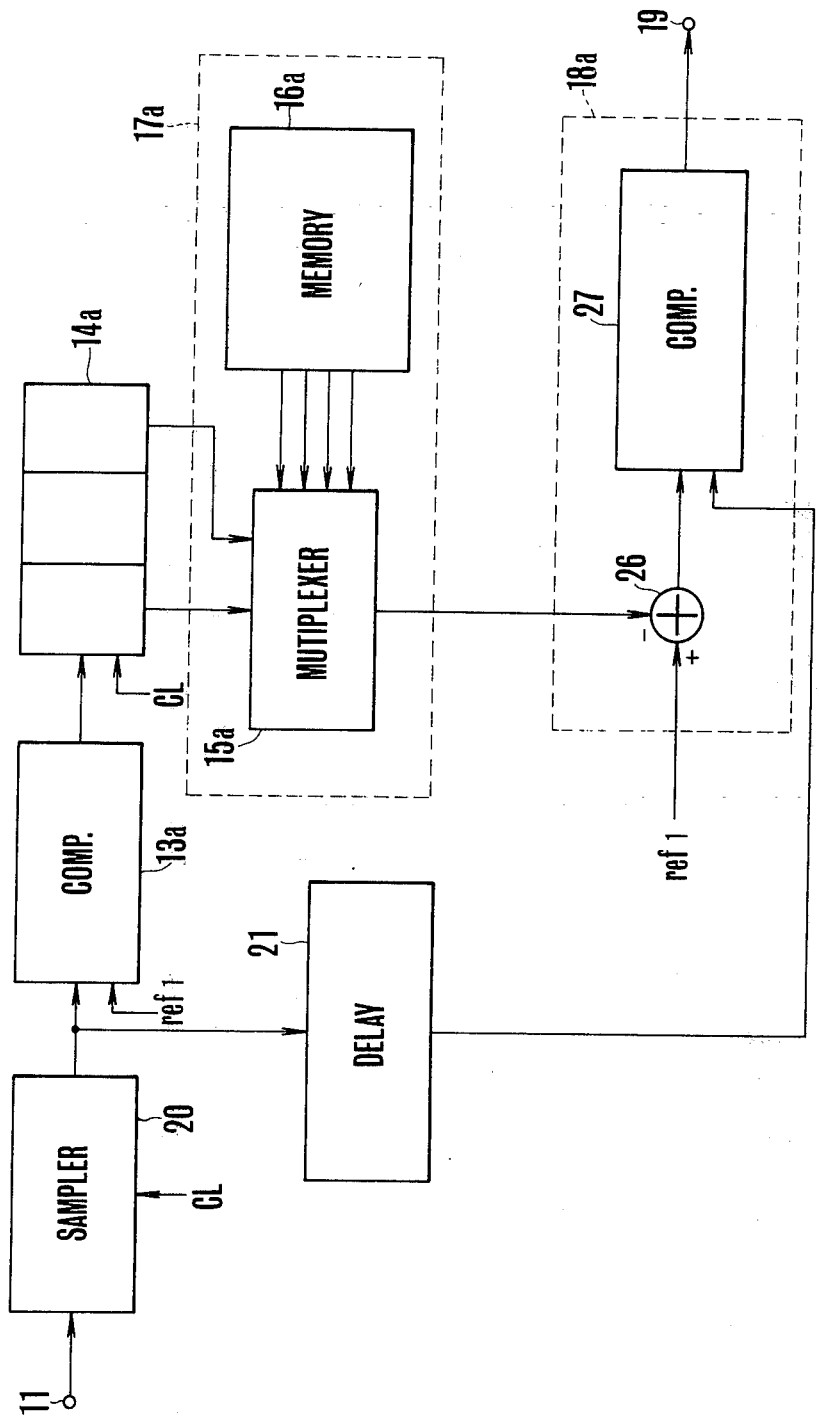

FIG. 4 shows another embodiment of the invention, which is still modified from that shown in FIG. 1. In this instance, the output of the delay circuit 21 is transmitted to one input terminal of the comparator 27 of the final decision circuit 18a directly. A subtracting means 26a is adapted to subtract the output of the multiplexer 15a from the decision threshold ref$_1$. The result of this subtraction is transmitted to the other input terminal of said comparator 27. This construction can provide the same effect as that shown in FIG. 1.

Figure 5:
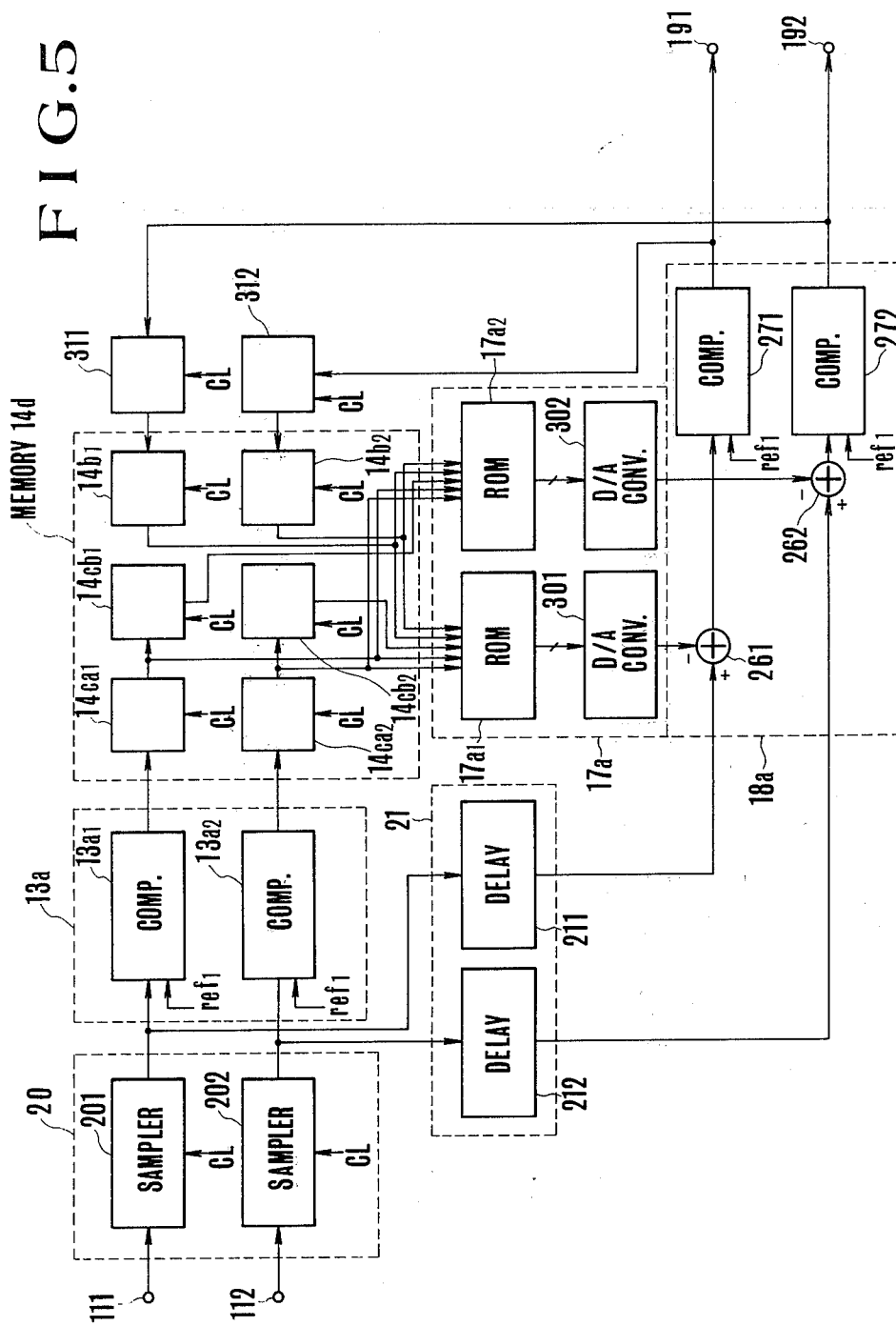
FIG. 5 is a block diagram of the signal detector which is modified from the embodiment shown in FIG. 3, and applied to the quadrature amplitude modulation with 4 values.

FIG. 5 shows the case when the embodiment modified from that shown in FIG. 3 is applied to 4-value quadrature amplitude modulation system. In this case, input terminals 111 and 112 receive base band analog waveforms which are demodulated in phase and in quadrature phase respectively. In this figure, same reference numerals and characters as shown in FIG. 3 denote same parts and functions. In order to distinguish one channel for dealing with signals supplied to the input terminal 111 from the other for dealing with the signals supplied to the terminal 112, some of reference numerals and characters are provided with "1" or "2" at their tails. For instance, numeral "111" in FIG. 5 is made by adding "1" to the tail of reference numeral "11" in FIG. 3. In this embodiment, as discussed previously, there will be discussed the distortion which is caused by one symbol each before and after said likely signal. Two base band signals in phase and in quadrature phase are sampled by the sampler 20, and then they are tentatively decided by the tentative decision circuit 13a, and at the same time, they are treated through the delay circuit 21 to be delayed by one time slot. The tentatively decided data are received by the memory 14d constituting a pattern detection circuit. In this embodiment, as for the data which are received after or at the same time as the delay circuit 21 has sent out its output signal to be decided finally, the output of the tentative decision circuit 13a is stored in the shift register type memory 14c. As to the data, however, which are received before the output signal of said delay circuit 21, as the final decision has been made already, the output from the final decision circuit 18a is stored in the shift register type memory 311 and 312, and then written in the registers 14b1 and 14b2 respectively at the next time slot.

In this way, the tentative decision data on the receiving signal in phase and in quadrature phase are stored in the register 14ca, said receiving signals arriving at terminals 111 and 112 one time slot later than the output signal to be decided finally are sent from the delay circuit 21; the tentative decision data of the receiving signal received at the same time slot is stored in the register 14cb; and the final decision data of the receiving signal received one time slot before is stored in the register 14b. A distortion memory means 17a comprises ROM (read only memory) 17a1 and 17a2 and D/A (digital to analog) converters 301 and 302, and it is adapted to generate the distortion quantity by using said memory and converters based on the patterns stored in the pattern detection circuit 14d. In this case, it should be noted that each of ROM 17a1 and 17a2 is constructed with the memory for reference values and the multiplexer.

The method of generating the distortion quantity will now be descried by taking an example in the following.

Figure 6:
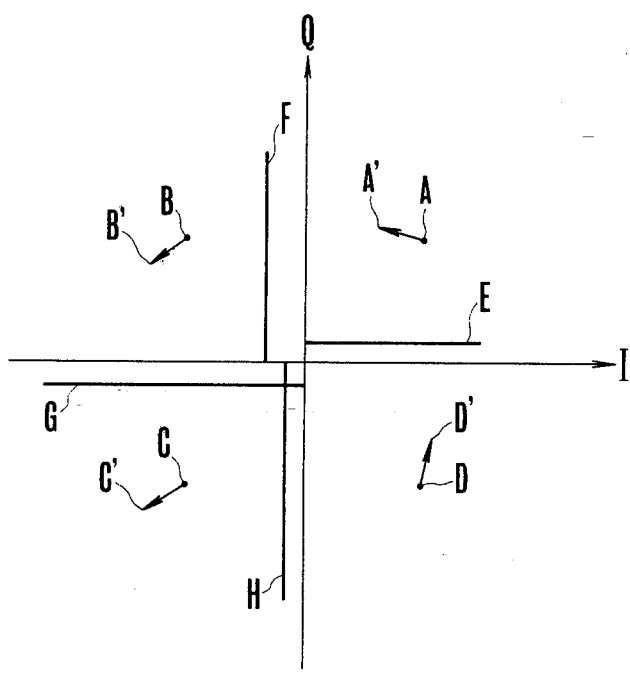
FIG. 6 is a graph for use in explaining the distortion of the non-linear transmission system as shown in FIG. 5.

Now, let ($a_I$, $a_Q$) be the data which are transmitted within one time slot (where $a_I$ and $a_Q$ denote data in phase and in quadrature phase, and will take the value "1" or "−1"). Now, it is assumed that patterns (1,1), (1,−1) and (−1,−1) have been received in continuous 3 time slots. In this case, the digital data stored in the address (1, 1, −1, −1, −1) of ROM 17a1 are taken out as the distortion quantity for the data in phase while the digital data stored in the address (1, 1, 1, −1, −1) of ROM 17a2 are taken out as the distortion quantity for the data in quadrature phase. This means that in case of data in phase, receiving bit patterns of front and rear time slots and the quadrature receiving bit of the self time slot are used together as the address, from which the distortion quantity is to be taken out, while in case of data in quadrature phase, receiving bit patterns of front and rear time slots and the receiving bit in phase of the self time slot are used together as the same. The reason for using bits of the same time slot but in the different phases as address information is because the interference between data both in phase and in quadrature phase is apt to happen in the non-linear transmission system and there is possibility that the distortion of the quadrature data varies depending on the value of the data in phase. This will be seen in FIG. 6, where components in phase and in quadrature phase are represented by I-axis and Q-axis respectively. Reference characters A, B, C, and D denote likely signal points to be received of which coordinates are (1, 1), (−1, 1), (−1, −1) and (1, −1) respectively while each of reference characters A', B', C' and D' denotes the point representing the average value of the receiving signal with distortion that is generated when its front and rear signals have had specific patterns. Further, reference characters E, F, G and H represent respective average values of the quadrature component of said receiving signal points A' and D', the component in phase of said receiving signal points A' and B', the quadrature component of said receiving signal points B' and C', and the component in phase of said receiving signal points C' and D'. These values correspond to respective threshold values. From the graph in FIG. 6 it will be readily seen that the value of the data in phase are giving influence upon the decision threshold for the data in quadrature phase or that the value of the data in quadrature phase are doing the same against the decision threshold for the data in phase. The distortion quantity taken out from ROM 17a1 and 17a2 as a digital code is converted into an analog value through D/A converters 301 and 302, and then transmitted to the final decision circuit 18a to obtain a correct final decision. The data written in ROM 17a1 and 17a2 are average receiving voltage of desired symbols at the time when pattern series showing the address have been received.

As described above, with respect to the data in the time slot for which the final decision has been made already, the final decision is used as the pattern data for the pattern detection circuit. Consequently, there may be lowered the possibility that erroneous bits exist in the pattern detection circuit and also that the distortion quantity for the erroneous pattern data is used.

In the embodiments as discussed heretofore, the contents of the reference memory, which are used to generate the distortion quantity, are kept constant. Therefore, the embodiments will not be applicable to a signal transmission system of which characteristics are varied with time.

Figure 7:
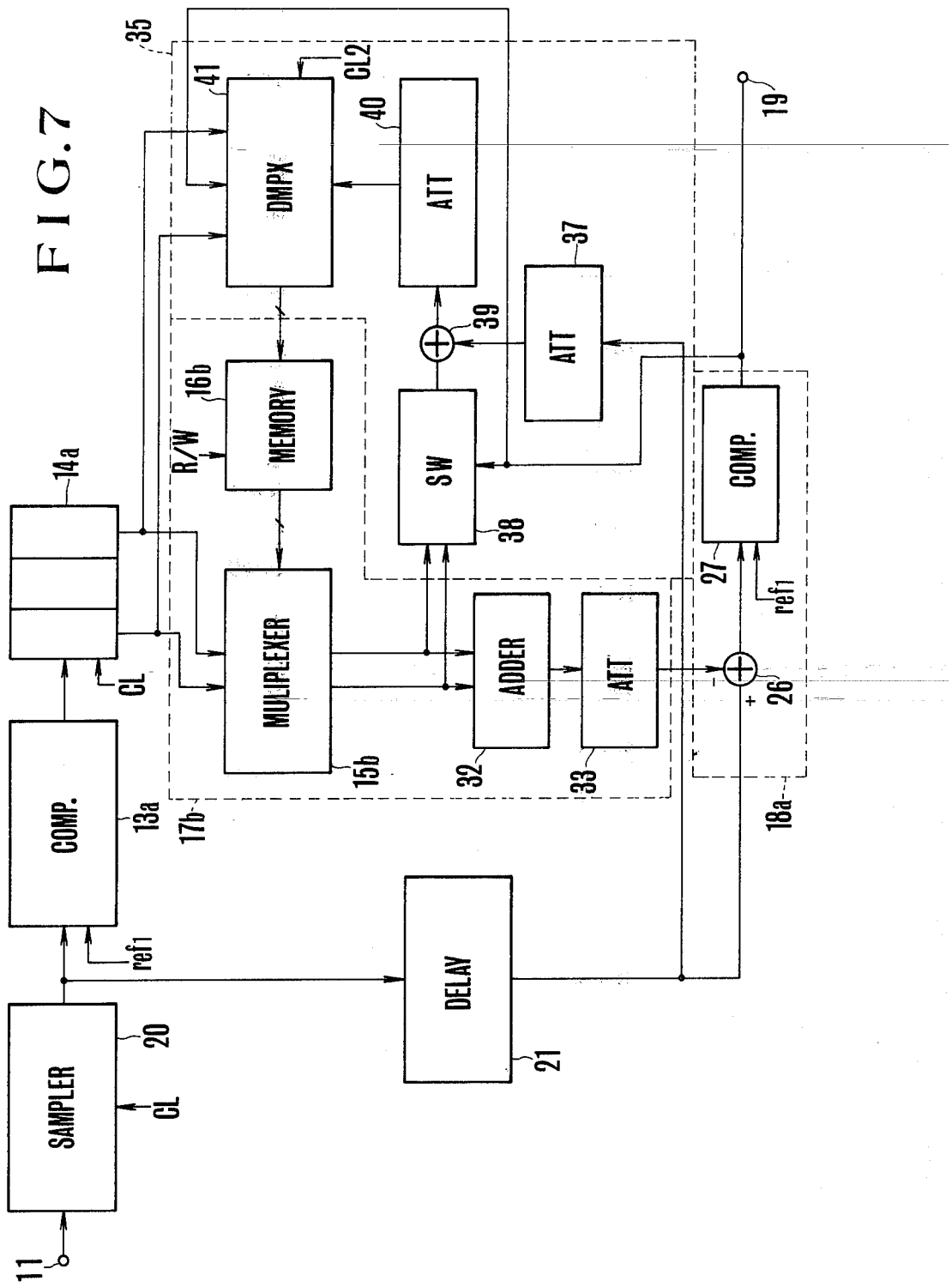
FIG. 7 is a block diagram showing the detector modified from the embodiment as shown in FIG. 2.

FIG. 7 shows another embodiment which resolves the above-mentioned problem and which is obtained by modifying the embodiment as shown in FIG. 2. In the figure, digital signals received by the input terminal 11 are transmitted to the comparator 13a as well as to the delay circuit 21 after being sampled by the sampler 20. The comparator 13a compares the signals sampled with the threshold value $ref_1$ and then, gives the tentative decision "0" or "1", according to whether the signal sampled is larger or smaller than said threshold value. The output from said comparator 13a is transmitted to the shift register type memory 14a forming a pattern detection circuit and is stored therein. In this embodiment, said shift register is assumed to be of 3 stage type. The analog voltage sampled by said sampler 20 is transmitted to the final decision circuit 18a through the delay line 21 forming a delay circuit for making one time slot delay. Consequently, the output value from the delay circuit comes to be an analog value corresponding to the decision value as to the 2nd stage register in said shift register 14a. In the next, estimated distortion voltages, which correspond to bit patterns stored in the first and third memory of the shift register 14a, are taken out from the distortion memory circuit 17b and then, transmitted to the subtracting means 26, at which the estimated distortion voltage is subtracted from the output voltage of said delay circuit 21. The result of this subtraction is evaluated again by the comparator 27 having the decision threshold $ref_1$ which is zero volt for instance, thereby putting out the final decision value from the output terminal 19. In this embodiment, the distortion memory circuit 17a comprises an analog memory 16b for storing the average receiving voltage for the center symbols of 8 patterns (0, 0, 0), (0, 0, 1), (0, 1, 0), (0, 1, 1), (1, 0, 0), (1, 0, 1), (1, 1, 0) and (1, 1, 1), a multiplexer 15b for use in selecting two patterns from said 8 patterns, corresponding to two bit patterns in said first and third stages of the register 14a, an adder 32 to add two output from said multiplexer 15b, and an attenuator 33 for making the output of said adder be half.

Now, it is assumed that a bit pattern (1, X, 0) (where X denotes "1" or "0") has been detected by the shift register. At this time, the multiplexer 15b chooses two patterns (1, 0, 0) and (1, 1, 0) from the 8 patterns stored in the analog memory 16b. Then, the average of the memory value of said two patterns chosen is calculated by using said adder 32 as well as attenuater 33. Therefore, the center value of the receiving voltage for the center symbol "1" or "0" is obtained as the output of the attenuator 33 when the pattern of each one symbol before and after the signal to be decided has been determined. This voltage is subtracted from the receiving signal that is obtained through the delay circuit 21, by using subtracting means 26, thereby the center value of the average voltage for "1" and "0" being made zero. Thus, the decision by the comparator 27 becomes most reliable and suitable. In the way as described above, there is eliminated intersymbol interference that is caused by each one symbol immediately before and after the receiving signal to be decided.

In this embodiment there is further provided a distortion memory adaptation circuit 35, which is used for adaptively changing the average receiving voltage to be stored in the analog memory 16b when the characteristics of the transmission system is changed with time. This adaptation circuit 35 achieves adaptation by correcting the contents of the analog memory 16b, which correspond to 3-bit memory stored in the shift register 14a. In the adaptation circuit 35, the output of the delay circuit 21 is multiplied by a constant k (k<1) by using the attenuator 37. The multiplexer 15b chooses two memory values based on bit patterns of the shift register 14a. The switch 38 is then operated to choose one of said two memory values, which corresponds to the output from the final decision circuit 18a, thereby obtaining the average receiving voltage corresponding to the likely symbol. Said average receiving voltage is then added to the output of the attenuator 37 by using the adder 39. Then, in order to normalize the output of the adder 39, it is multiplied by k/(k+1) at the attenuator 40 and then written in the memory corresponding to 3-bit patterns of the shift register 14a by changing the demultiplexer 41 under the control of the clock pulse CL2 having the frequency twice as much as the clock CL. In this case, 2 bits at the first and third places of the 3-bit shift register 14a and the output of the final decision circuit 18a are used together as address selection signals for writing the output of the attenuator 40 into the analog memory 16b. Of course, it is possible to use 3 bits of the shift register 14a only as an address selection signal.

As discussed above, the contents of the analog memory 16b are corrected as occasion demands, so that intersymbol interference can be eliminated even when it is changing with time in correspondence with variation in the channel characteristics. When the characteristics of the system are changing slowly, this may be dealt with by making k smaller while this may be dealt with by making k larger when quickly changing.

Figure 8:
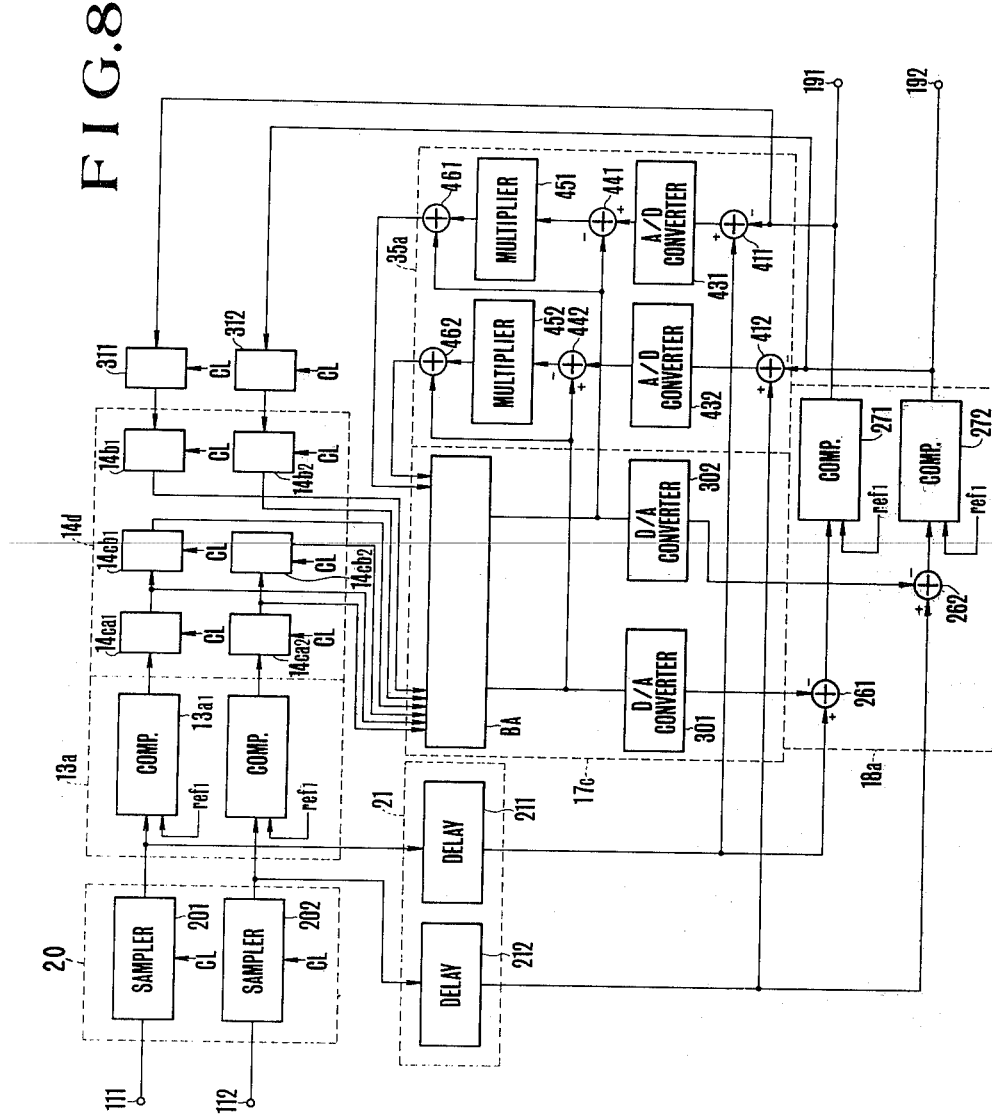
FIG. 8 is a block diagram showing the signal detector modified from the embodiment as shown in FIG. 7 and applied to 4-value quadrature amplitude modulation system.

FIG. 8 shows another embodiment which is modified based on the embodiment shown in FIG. 7 and which is designed to be suitably applied to 4-value quadrature amplitude modulation system. In this figure, like reference numerals and symbols as used in FIG. 5 denote like parts and function. In the following, the description will be made as has been done before, in connection with the distortion which the signal to be decided is receiving from each one symbol immediately before and after itself. Demodulated base band analog waves in phase and in quadrature phase are supplied to terminal 111 and 112, and then are sampled by the sampler 20. After the sampling, they are transmitted to the tentative decision circuit 13a as well as to the delay circuit 21 to receive the tentative decision and the delay of one time slot respectively. The data tentatively decided are received by the pattern detection circuit 14d. In this embodiment, the data, which are received after or at the same time the delay circuit 21 has sent its output signal to be finally decided, are stored in the shift register type memory 14ca and 14cb through the tentative decision circuit 13a. As to the data, however, which are received before said output signal from said delay circuit 21, the final decision has been made already, so that the output from the final decision circuit 18a is stored in the shift register type memory 311 and 312, and then it is written in the registers 14b1 and 14b2 respectively at the next time slot.

In this way, the tentative decision data on the receiving signals in phase and in quadrature phase received at terminals 111 and 112 one time slot later than the output signal to be finally decided at the output of the delay circuit, are stored in the register 14ca, the tentative decision data on the receiving signal received at the same time slot are stored in the register 14cb, and the final decision data on the receiving signal received one time slot before are stored in the register 14b.

From distortion memory 17c, the distortion is taken out in the form of digital code by using patterns as an address, said patterns being detected by the pattern detection circuit 14d and said distortion corresponding to patterns in phase and in quadrature phase respectively. With respect to the block BA of this distortion memory circuit, more detailed description will be made later. The distortion taken out of said block BA is converted into the analog voltage through D/A converter 301 and 302, and then supplied to the final decision circuit 18a. In this decision circuit 18a, the distortion from said converter 30 and the receiving signal from said delay circuit 21 are treated at the subtracting means 26 to make the balance therebetween, thereby eliminating intersymbol interference caused by each one symbol immediately before and after the receiving signal. Then, the result of said subtraction is compared with the reference value at the comparator 27, thereby the decision becoming very accurate.

Next, the distortion memory adaptation circuit 35 will be discussed. According to this adaptation circuit 35, in order to obtain the distortion of the receiving data delayed by the delay circuit 21, the decision data from the final decision circuit 18a are compared with said delayed receiving data by using subtracting means 411 and 412 to see the errors therebetween. Error voltages obtained by subtracting means 411 and 412 are converted into digital codes by means of analog-digital (A/D) converter 421 and 422.

Then, the balance between the average error voltage and the instant error voltage is attained by using didital subtracting means 441 and 442 which subtract the digital error voltage which is read out of said block BA, from the output of A/D converters 431 and 432. Said balance is then multiplied by a certain constant and is added to the average error which is read out of the block BA, by using adders 461 and 462. The result of the addition is written in an address corresponding to patterns stored in the shift register 14d. In this way, the distortion stored in the distortion memory circuit BA is varied adaptively in response to the state of the transmission system.

Figure 9:
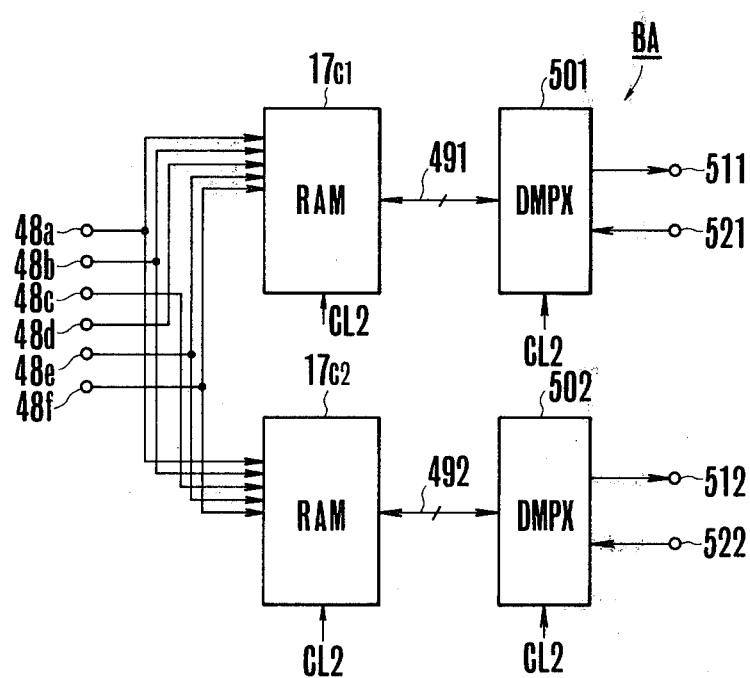
FIG. 9 is a block diagram for showing the concrete example of the block BA in the distortion memory circuit shown in FIG. 8.

FIG. 9 shows the detail of said distortion memory circuit BA. In the figure, input terminals 48a through 48f respectively correspond to output terminals of registers 14ca1, 14ca2, 14cb1, 14cb2, 14b1 and 14b2 in the pattern detection circuit. These terminals are connected with random access memory (RAM) 17c1 and 17c2 as address terminals therefor. Said RAM 17c1 and 17c2 store average error voltages in correspondence with patterns of $2^n$ which are stored in respective pattern detection circuits as the distortion in phase and in quadrature phase. Data buses 491 and 492 are connected with output terminals 511 and 512 as well as with input terminal 521 and 522 through demultiplexer 501 and 502. Said output terminals 511 and 512 are connected with D/A converters 301 and 302 respectively whereas input terminals 521 and 522 are connected with adders 461 and 462 respectively. Said demultiplexer 501 and 502 receive the clock pulse CL2 having the frequency twice as much as the clock pulse CL and exchange the connection from the output to the input or vice versa.

The operation of the distortion memory circuit 17c will now be explained in the following. Let $(a_I, a_Q)$ be the data which are transmitted within one time slot (where $a_I$ and $a_Q$ denote data in phase and in quadrature phase and will take the value "1" or "−1"). Now, it is assumed that patterns $(1, 1)$, $(1, -1)$ and $(-1, -1)$ in 3 continuous time slots are detected by the pattern detection circuit 14d. In this case, the digital data stored in the address $(1, 1, -1, -1, -1)$ of ROM 17c1 are taken out as the distortion quantity for the data in phase whereas the digital data stored in the address $(1, 1, 1, -1, -1)$ of ROM 17c2 are taken out as the distortion quantity for the data in quadrature phase. This means that in case of data in phase, receiving bit patterns in the front and rear time slots and quadrature receiving bit in the self time slot are used together as an address, based on which the distortion quantity is to be taken out, whereas in case of data in quadrature phase, the receiving bit patterns of front and rear time slots and the receiving bit in phase of the self time slot are used together as the same. In other words, input terminals 48a, 48b, 48c, 48e and 48f are connected with RAM 17c2 to memorize the distortion in respect of quadrature components while input terminals 48a, 48b, 48d, 48e and 48f are connected with RAM 17c1 to memorize the distortion in respect of data in phase, thereby reading out the distortion corresponding to each pattern. The reason for using the bits in the same time slot but in the different phases as address information is because the interference between data both in phase and in quadrature phase is apt to happen in the non-linear transmission system and there is possibility that the distortion for the quadrature data varies depending on the value of the data in phse.

The distortion in phase and in quadrature phase which has been read out of RAM 17c1 and 17c2 is supplied to demultiplexers 501 and 502 through data buses 491 and 492. Demultiplexers 501 and 502 connects data bus to terminals 511 and 512 which have been connected with D/A converters 301 and 302 of FIG. 8 at the beginning of each time slot.

When a new distortion quantity has been obtained by the distortion memory adaptation circuit 35, demultiplexers 501 and 502 connect respective data buses 491 and 492 with input terminals 521 and 522 from digital adders 461 and 462 of the distortion memory adaptation circuit 35. At the same time, said demultiplexers change the mode of RAM 17c1 and 17c2 from read-out mode to writing mode. With operation for one time slot as mentioned above, memory quantity of RAM 17c1 and 17c2 is varied adaptively.

In the embodiment as described above, the output of the delay circuit 21 is used as one of the input for subtracting means 411 and 412, but the output of subtracting means 261 and 262 may be used instead. In that case, subtracting means 441 and 442 become unnecessary. This results in simplification of the circuit.

In the embodiment as discussed above, in which there is adopted the way that only the error voltage is made to memorize, there is the possibility that the distortion quantity in RAM 17c1 and 17c2 deviates from the mean value. Because the non-linear characteristics of the transmission system results in distortion which varies depending on the receiving signal and also in some specific code patterns which come to appear frequently. In such a case, the decision by the final decision circuit 18a is not always reliable. In the linear transmission circuit, however, inconvenience like this does not happened and the memory capacity of the distortion memory circuit may be made a half.

As described above, with respect to the data in the time slot for which the final decision has been made already, the final decision is used as pattern data for the pattern detection circuit. Consequently, there is lowered the possibility that erroneous bit exist in the pattern detection circuit and also that the distortion quantity based on the erroneous pattern data is used.

In all the embodiments as have discussed thus far, in order to obtain the decision on receiving signals, the distortion is calculated at first and then, it is subtracted from the receiving signal, thereby the receiving voltage being deviated. It is apparent, however, that the decision threshold may be deviated instead by the size of corresponding receiving voltage.

FIG. 10 is a block diagram showing another embodiment which makes it possible to obviate the distortion even when the characteristic of the channel is varied with time as in the cases of FIGS. 7, 8 and 9. However, the present embodiment is different from that shown in FIG. 7 in the following point. The distortion memory adaptation circuit 35a used in this embodiment is used to sequentially correct the memory contents of the address designated by the output of shift register type final decision memory circuit 55 which store the output of the comparator 27 in the final decision circuit 18a, across 3 time slots (which are the same slots as is to be stored in the shift register 14a). In this adaptation circuit 35, the output from the delay circuit 21 is further given one time slot delay through the delay circuit 57. Said delayed signal is then transmitted to the attenuater 37 and is multiplied by a constant k (k<1). After that, said multiplied signal is added by the adder 60 to the average voltage that has been taken out by the multiplexer 59, which is used for taking out the contents of the analog memory 16c corresponding to bit patterns stored in the shift register 55. The output of the adder 60 is multiplied by k/(k+1) through the attenuater 40 and then is switched by the demultiplexer 41 to be written into the memory which coincides with the bit pattern of the shift register 55 in the analog memory 16c.

In such a way as described above, the contents of the analog memory 16c are corrected in sequence, so that even when intersymbol interference is varied with time according to the change in the characteristic change of the channel, the signal detector of this invention may follow such change to obviate the interference caused thereby. When the influence of the noise is large and the characteristic of the channel varies slowly, the value of k is to be made smaller, but when the noise influence is small and the characteristic variation is quick, the value of k is to be made larger.

Figure 11:
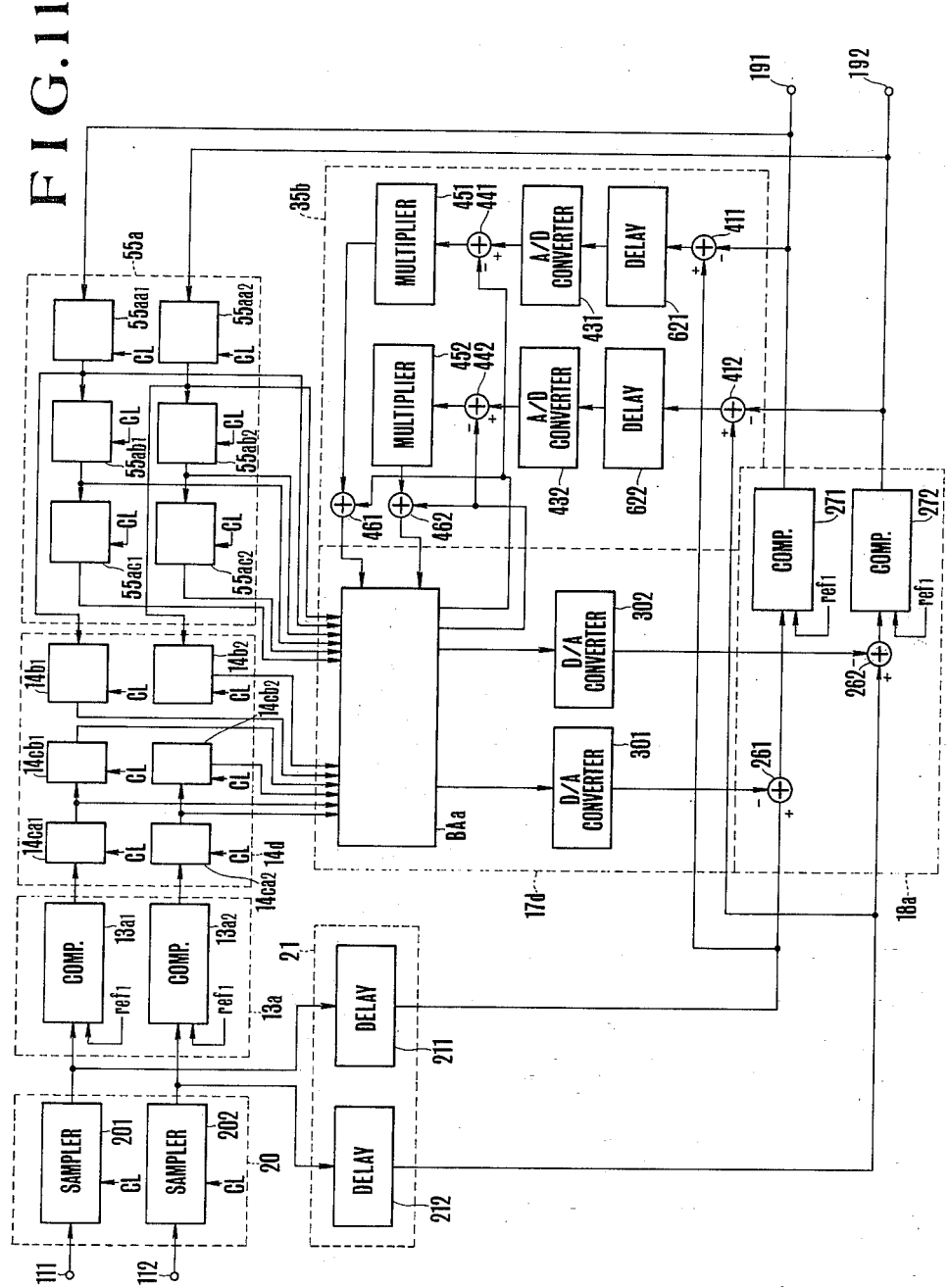
FIG. 11 is a block diagram of the signal detector applied to 4-value quadrature amplitude modulation system.

FIGS. 11 and 12 are block diagrams for showing the embodiment which is modified from that shown in FIG. 10 and is applicable to 4-value quadrature amplitude modulation system. FIGS. 11 and 12 are prepared in the same manner as FIGS. 8 and 9. In this embodiment, as discussed previously, there will be considered the distortion that are caused in the receiving signal by one symbol each before and after said receiving signal. Two base band signals in phase and in quadrature phase are sampled by the sampler 11, and then they are tentatively decided by the tentative decision circuit 13a, and at the same time, they are treated through the delay circuit 21 to be delayed by one time slot. The tentatively decided data are received by a pattern detection circuit 14d. In this embodiment, as for the data which are received after or at the same time the delay circuit 21 has sent its output signal to be decided finally, the output of the tentative decision circuit 13a is stored in the shift register type memory 14ca and 14cb. As to the data, however, which are received before the output signal of said delay circuit 21, the final decision has been made already, so that the output from the final decision circuit 18a is stored in the shift register type memory 55aa1 and 55aa2 and then written in the registers 14b1 and 14b2 respectively at the next time slot. The output of memory 55aa1 and 55aa2 is sequentially shifted to memory 55ab1, 55ac1 and 55ab2, 55ac2.

In this way, the tentative decision data of receiving signals in phase and in quadrature phase are stored in the register 14ca1 and 14ca2, said receiving signals being received at terminals 111 and 112 one time slot later than the output signal to be decided finally are sent from the delay circuit 21; the tentative decision data of receiving signals received at the same time slot are stored in the register 14cb2; and the final decision data of receiving signals received one time slot before are stored in the register 14b. In the block BAa of the distortion memory 17d, the distortion corresponding to respective patterns in phase and in quadrature phase are taken out as the digital code by using as address the patterns detected by the pattern detection circuit 14d as address. Details of the block BAa in said memory circuit 17d will be described later. The distortion taken out of said circuit 17d is converted into analog voltages through D/A converters 301 and 302, and then supplied to the final decision circuit 18a. In this circuit, the distortion from said converters 301 and 302 and receiving signal from said delay circuit 21 are treated at the subtracting mean 262 to make a balance therebetween, thereby eliminating intersymbol interference caused by each one symbol immediately before and after the receiving signal.

Then, the balance is compared with the reference value at the comparators 271 and 272, thereby the decision obtained becoming very accurate.

Next, the distortion memory adaptation circuit 35b will be discussed. According to this adaptation circuit 35b, in order to obtain the distortion of receiving data delayed by the delay circuit 21, decision data from the final decision circuit 18a are compared with said delayed receiving data to check errors therebetween by using subtracting means 411 and 412. Error voltage obtained by subtracting means 411 and 412 is delayed by one time slot through delay lines 621 and 622 and then converted into digital codes by means of analog-digital (A/D) converters 431 and 432. At the same time, the distortion quantity in phase as well as in quadrature phase is read out of the block BAa of the distortion memory 17d. This is done in the same way as mentioned before, in which address operation is made by using the pattern of the final decision series which have been stored in the shift register 55a and memory patterns of said pattern detection circuit 14d as well. The distortion voltage obtained as the output of A/D converter 431 and 432 is behind the final decision time by one time slot, so that it corresponds to the central data of the shift register 55a, thus it indicating the distortion that is really received corresponding to data which have been read out. The data read out of said distortion memory 17d are subtracted from the output of said A/D converters 431 and 432 by means of digital subtracting means 441 and 442. The balance made by this subtracting operation is multiplied by a constant k through digital multipliers 451 and 452, and then products are added to the average distortion that is read out of the block BAa of the distortion quantity memory. The result is written into an address corresponding to a pattern stored in the shift register 55a. When this value is used as the correction quantity of the distortion, it comes to be possible to vary the distortion correction quantity which is stored in the block BAa of said distortion quantity memory 17d, in response to the transmission system condition.

FIG. 12 shows the details of said distortion memory circuit BAa. In the figure, input terminals 48a through 48f correspond to output terminals of registers 14ca1, 14ca2, 14cb1, 14cb2, 14b1 and 14b2 respectively in the pattern detection circuit, respectively, while terminals 48g through 48l correspond to output terminals of registers 55aa1, 55aa2, 55ab1, 554ab2, 55ac1 and 55ac2 of the final decision pattern memory circuit 55. Two sets of said terminals are exchanged by multiplexers 641 and 642 are connected with random access memory (RAM) 17c1 and 17c2 through address buses 651 and 652. Data buses 661 and 662 of RAM 17c1 and 17c2 are connected to terminals 511, 521 and 671 or to terminals 512, 522 and 672 by means of the demultiplexers 50a1 and 50a2. MPX 641 and 642, and DMPX 50a1, 50a2 respectively change the connection of output and input by receiving pulses CL3a, CL3b and CL3c which are supplied at different times in one time slot.

The operation of the distortion memory circuit 17d will now be explained in the following. Let ($a_I$, $a_Q$) be the data which are transmitted within one time slot (where $a_I$ and $a_Q$ denote data in phase and in quadrature phase and will take the value "1" or "−1"). Now, it is assumed that patterns (1, 1), (1, −1) and (−1, −1) in 3 continuous time slots are detected by the pattern detection circuit 14d. In this case, the digital data stored in the address (1, 1, −1, −1) of ROM 17c1 are taken out as the distortion quantity for the data in phase whereas the digital data stored in the address (1, 1, 1, −1, −1) of ROM 17c2 are taken out as the distortion quantity for the data in quadrature phase. This means that in case of data in phase, receiving bit patterns in time slots before and after the receiving signal and the quadrature receiving bit in the time slot of the receiving signal itself are used together as an address, based on which the distortion quantity is to be taken out, whereas in case of data in quadrature phase, receiving bit patterns in front and rear time slots and the receiving bit in phase in the time slot of the receiving signal itself are used together as the same. In other words, input terminals 48a, 48b, 48c, 48e and 48f are connected with RAM 17c1 to memorize the distortion in respect of quadrature components while input terminals 48a, 48b, 48d, 48e and 48f are connected with RAM 17c2 to memorize the distortion in respect of data in phase, thereby reading out the distortion corresponding to each pattern. The reason for using the bits, which are in the same time slot but in the different phase, as the address information is because the interference between data both in phase and in quadrature phase is apt to happen in the non-linear channel and there is possibility that the distortion of quadrature data varies depending on the value of data in phase.

The distortion in phase and in quadrature phase which has been read out of RAM 17c1 and 17c2 is supplied to demultiplexers 661 and 662 through demultiplexers 50a1 and 50a2, which connects data buses to terminals 511 and 512, which have been connected with D/A converters 301 and 302 of FIG. 11 at the beginning of each time slot (CL3a). When the time for final determination (sufficiently smaller than one time slot) has passed, multiplexers 641 and 642 connect terminals 48g, 48h, 48i, 48k and 48l to the address bus 651, and also connect terminals 48g, 48h, 48j, 48k and 48l to the address bus 652. At the same time, demultiplexers 50a1 and 50a 2 connect data buses 661 and 662 to terminals 671 and 672 which are to be connected to the distortion memory adaptation circuit 35b. Consequently, from terminals 671 and 672 there is put out the distortion quantity in phase and in quadrature phase, which is determined by the final decision pattern stored in the shift register 55a.

When a new distortion quantity has been obtained by the distortion memory adaptation circuit 35, demultiplexers 50a1 and 50a2 connect respective data bus 661 and 662 with input terminals 521 and 522 from digital adders 461 and 462 of the distortion memory adaptation circuit 35. At the same time, said demultiplexers change the mode of RAM 17c1 and 17c2 from read-out mode to writing mode. With the operation for one time slot as mentioned above, the memory quantity of RAM 17c1 and 17c2 is varied adaptively.

In the embodiment as discussed above, there is less probability that erroneous bits exist in the pattern detection circuit. Thus, the possibility of using the distortion quantity corresponding to erroneous pattern data may be lowered very much although the circuit construction becomes complicated to some extent.

In the embodiment as described above, the output of the delay circuit 21 is used as one of the input for subtracting means 411 and 412 but the output of subtracting means 261 and 262 may be used instead. In such case, subtracting means 441 and 442 become unnecessary, thus resulting in simplification of the circuit.

In short, according to the embodiment as described above, a tentative decision is made as to symbols before and after the symbol to be decided, thereby $b_{i-n}, \ldots b_{i-1}, b_{i+1}, \ldots b_{i+n}$, being determined by the equation (3). When the tentative decision is true, each of said terms $b_k$ (except $k=i$) becomes equal to the term $a_k$. In this case, as to the term of the equation (3), where $j_{n+1}=0$, the distortion quantity is attained if the term $b_{j1} \ldots j_{2n+1}$ is determined, thus it being possible to eliminate such distortion. According to this method, all the terms, where $j_{n+1}=0$, may be eliminated, thereby distortion being eliminated regardless of linear or non-linear. However, this method has to rely on the condition that said tentative decision is correct to the last. Unless such condition is satisfied, the distortion obtained comes to correspond to an undesirable different pattern. It might even result in the possibility to increase the error rate. In order to prevent enlargement of the distortion due to erroneous patterns, a certain null region or zone is provided near the decision threshold because the possibility of deciding receiving signals erroneously becomes highest at the region near said threshold. When it happens that said symbols before and after the symbol to be decided enter into said null region, all of correcting operation is stopped in order to prevent the erroneous correction corresponding to an improper pattern. Accordingly, when the null region is defined properly, it is possible to prevent enlargement of the distortion due to detection of erroneous patterns. Further, when the symbol to be decided is in said null region, the decision for correction will not be performed, thereby decreasing the quantity of calculation and simplifying the circuit structure as a whole.

Figure 13:
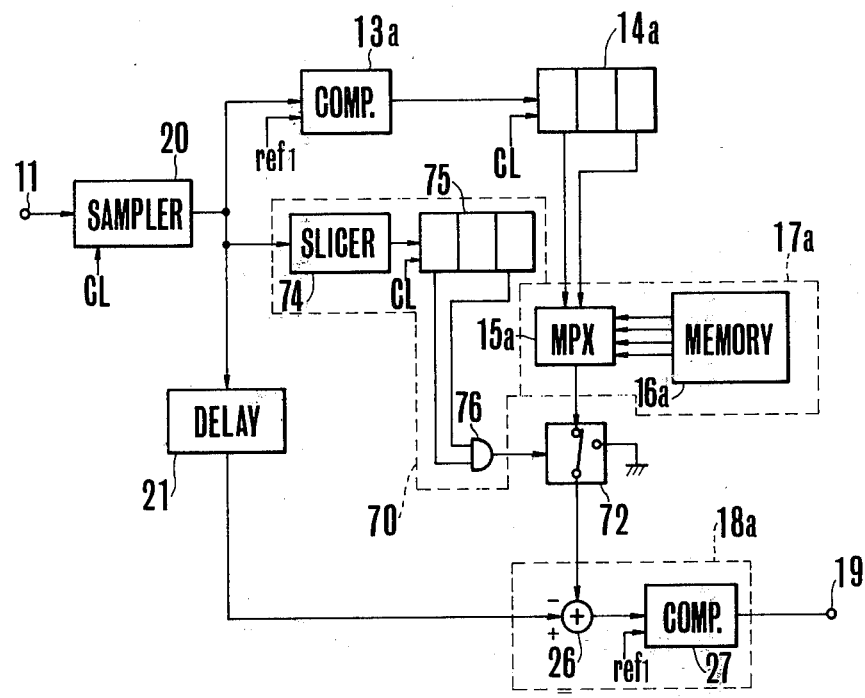
FIG. 13 is a block diagram of the embodiment modified from that in FIG. 2.

FIG. 13 is a block diagram of another embodiment according to the present invention, which is for use in coping with the data specially, those in the null region. The embodiment shown in FIG. 13 is achieved by adding a reliability detector means 70 and switching means 72 to that shown in FIG. 2. Therefore, explanation of this embodiment will be concentrated only to that point, accordingly. Said reliability detector means 70, comprises a slicer 74 to receive said output from the sampler 20, 3-bit shift register type memory 75, and AND gate 76 which receives the output of first and third registers as its input. Said slicer 74 puts out "0" when the input from the sampler 20 is in the null region while it puts out "1" when not in the null region.

Figure 14:
FIG. 14 is a graph to explain the null region in connection with the reliability detector circuit in FIG. 13.

An example of said null region is shown in FIG. 14. In the figure, symbols $P_1$ and $P_2$ designate true receiving points of "1" and "0", TL designates the decision threshold value and R indicates the null region. In this discussion, it is assumed that noise will follow a Ganssian distribution and that intersymbol interference is not so heavy. Under this assumption, almost all errors may happen when the receiving signal falls into the null region. Accordingly, when the receiving signal is not in the null region, the decision by said tentative decision circuit means 13a is believed almost correct. The shift register 75 stores information as to whether or not the receiving signal is in the null region R which is decided by the slicer 74. The AND gate 76 produces "and" product by using the first and third data of the shift register 75. When data in the time slot before and after the output signal of the delay circuit 21 are not in said null region R, in other words, only when the tentative decision for such data is considered correct with high probability, the output of said AND gate 76 becomes "1". Accordingly, only when the output of said AND gate 76 is "1", said switching means 72 acts to give the final decision circuit means 18a the distortion correction quantity which corresponds to the first and third bit patterns of the shift register 14a. When the output of the AND gate 76 is "0", the final decision circuit 18a is given zero volt instead of the output from the distortion quantity memory, thereby not performing correction. In this manner, the probability of using the distortion of the incorrect pattern is lowered to a great extent. In the final decision circuit 18a, the correction voltage from the switching means 72 is subtracted from the output of the delay circuit 21 by means of the subtracting means 26. The result of subtraction receives the decision again and then, final decision is transmitted through the terminal 19.

In this way, according to the embodiment as mentioned above, it becomes possible to remove the distortion that can not be removed by the conventional linear equalizer. Further, because the reliability detector means 70 is adopted, it is possible to obviate such influence that the error becomes heavier when it has happened.

Figure 15:
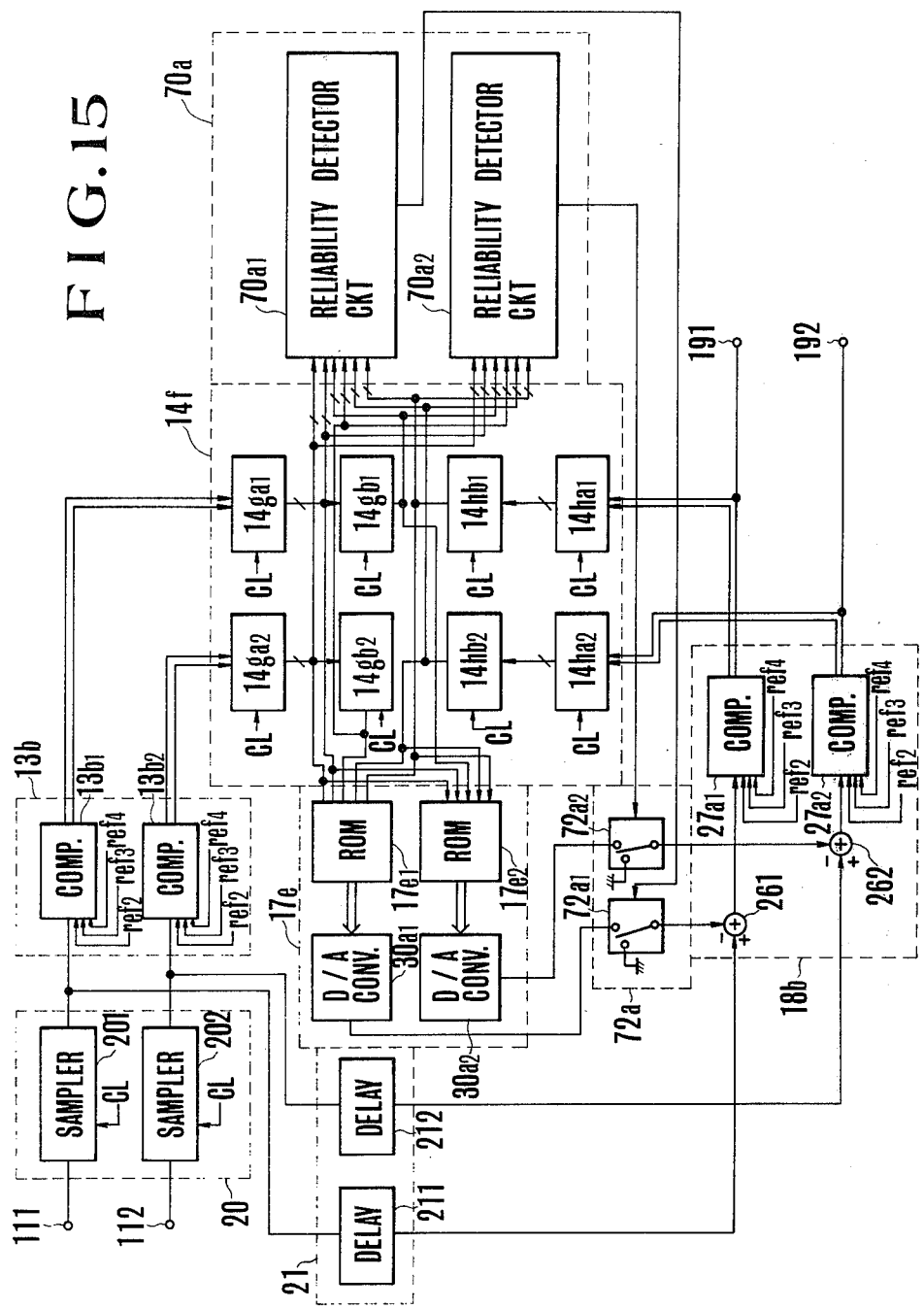
FIG. 15 is a block diagram of the embodiment modified from that of FIG. 13, which is applied to 4-value quadrature amplitude modulation system.

FIG. 15 is a block diagram showing another embodiment modified from that which is shown in FIG. 13, to be applied to 4-value quadrature amplitude modification system. Demodulated base band analog wave forms in phase and in quadrature phase received at input terminals 111 and 112 are sampled by samplers 201 and 202 of sampler means 20, and then transmitted to the tentative decision circuit means 13b, which compare the input thereto with reference values $ref_2$, $ref_3$ and $ref_4$. Namely, the tentative decision circuit means 13b achieves two different decision function by single circuit capable of performing multi-value decision (4 values in phase and in quadrature phase respectively). That is, it achieves function by said tentative decision means and reliability decision circuit means as shown in FIG. 13.

FIG. 16 shows the decision threshold value of said tentative decision circuit 13b. In this figure, symbols $A_1$, $B_1$, $C_1$ and $D_1$ designate true signal points to be received; $RL_1$, $RL_2$, $RL_3$ and $RL_4$ are threshold values indicating the null regions; and $TL_1$ and $TL_2$ tentative decision threshold for making tentative decision series. In the tentative decision circuit 13b, 4 value decision (11), (10), (01) and (00) is made by using threshold value $RL_2$, $TL_1$ and $RL_3$ as to the data in phase according to their magnitude while the same is done for the data in quadrature phase in accordance with their magnitude by using the threshold value $RL_1$, $TL_2$ and $RL_4$. Accordingly, tentative decision data both in phase and in quadrature phase are indicated by 2-bit data, thus MSB (most significant bit) representing the tentative decision result. In case data are represented by (1, 0) or (0, 1), it means that such data are in the null region. The data decided by said tentative decision circuit 13b are respectively transmitted from the registers 14ga1 and 14ga2 of the shift register type memory 14f to the register 14gb1 and 14gb2, and stored therein per 2 bits. On the one hand, in the registers 14ha1, 14ha2, 14hb1 and 14hb2 of the memory 14f, there is stored 2-bit decision series from the final decision circuit 18b.

In this way, the tentative decision data on the receiving signal in phase and in quadrature phase are stored in registers 14ga1 and 14ga2, said receiving signals being received at terminals 111 and 112 one time slot later than the output signal to be decided finally are sent from the delay circuit 21; the tentative decision data of receiving signals received at the same time slot are stored in registers 14gb1 and 14gb2; and the final decision data of the receiving signal received one time slot before are stored in the registers 14hb1 and 14hb2. Accordingly, it is possible to constitute pattern detector means by using 2-bit data patterns stored in registers 14ga1, 14ga2, 14gb1, 14gb2, 14ha1 and 14ha2.

Distortion memory 17e comprises read only memory ROM 17e1 and 17e2, and D/A (digital-analog) converters 30a1 and 30a2, and generates the distortion quantity by using said memory and converters based on patterns stored in said pattern detector means.

The method of generating the distortion quantity will now be described by taking the example in the following.

Now, let $(a_I, a_Q)$ be the data which are transmitted within one time slot (where $a_I$ and $a_Q$ denote data in phase and in quadrature phase, and will take the value "1" or "−1"). Now, it is assumed that patterns (1, 1), (1, −1) and (−1, −1) have been received in continuous 3 time slots. In this case, digital data stored in the address (1, 1, −1, −1, −1) of ROM 17e1 are taken out as the distortion quantity for data in phase while digital data stored in the address (1, 1, 1, −1, −1) of ROM 17e2 are taken out as the distortion quantity for data in quadrature phase. This means that in case of data in phase, receiving bit patterns in the front and rear time slots and the quadrature receiving bit in the time slot of receiving signal itself are used together as an address, from which the distortion quantity is to be taken out, while in case of data in quadrature phase, receiving bit patterns in the front and rear time slots and receiving bit in phase in the time slot of receiving signal itself are used together as the same. The reason for using bits in the same time slot but in the different phases as address information is because interference between data both in phase and in quadrature phase is apt to happen in the non-linear transmission system and there is possibility that the distortion for quadrature data varies depending on values of data in phase.

The distortion quantity picked out of ROM 17e1 and 17e2 in digital codes is converted into analog value by D/A converter 30a1 and 30a2 and then applied to a switching means 72a. Only when data from the reliability detector 70a is "1", the output of D/A converters 30a1 and 30a2 is given to the final decision circuit means 18b, but when said data is "0", zero volt is given to said final decision circuit 18b. Accordingly, in the final decision circuit means 18b, correction decision is made on receiving signal only when the reliability detector circuit 70a needs correction.

As described in connection with the embodiment as shown in FIG. 13, the data to be written in ROM 17e1 and 17e2 are average receiving signal voltage for desired symbol in the time when pattern series that indicates its address is received.

As discussed above, regarding the data in the time slot where the final decision is known, said decision is used as data pattern to the pattern detector circuit. In this way, there is lowered the possibility that erroneous bits exist in the pattern detector circuit, thus the probability of using the distortion of erroneous pattern data for decision being made smaller.

FIG. 17 is a block diagram showing the contents of reliability detector circuit 70a, which decides whether or not the correction is to be made, based on the data that have been decided by the tentative decision circuit 136 and final decision circuit 18b. As shown in FIG. 15, the reliability detector circuits means comprises reliability detector circuit 70a1 for detecting data in phase and reliability detector circuit 70a2 for detecting data in quadrature phase. Both circuits are almost same except a part such as some connection to the data. Accordingly, the following description will be made by referring to only the reliability detector circuit 70a1. In FIG. 17, pairs of terminals 78a1 and 78a2; 78b1 and 78b2; 78c1 and 78c2; 78d1 and 78d2; 78e1 and 78e2; represent the input from registers 14ga1, 14ga2, 14gb2, 14hb1 and 14hb2. Input terminals 78f1 and 78f2 represent the input from registers 14gb1. Input having like alphabetical suffix shows 2-bit input from like register. Each one symbol before and after the receiving symbol and the different phase data of the identical symbol (quadrature data in this example) are transmitted to exclusive "or" circuit means 80, which puts out "1" or "0" according to whether or not said symbol and data are in the null region. These are then transmitted to inverter means 81, of which the output is further transmitted AND gate 82 to obtain whole AND. As far as either one of said one symbol and different phase data is in the null region, "0" is put out of said AND circuit 82. Therefore, if this value is used as the output of the reliability detector circuit, the correction of data will be performed only when the address to ROM 17e1 is correct, thereby enlargement of failure being prevented. In respect of data to be decided finally, or tentatively decided data in phase and in the same time slot as well, the exclusive "or" circuit 80f first decides whether or not such data is in the null region and then the output of said circuit 80b is transmitted to AND gate 83 to make a whole AND. Data correction will be performed only when data to be decided are in the null region but others data are not in the null region. The output of this AND gate 83 is transmitted to the switch 72a1 through the terminal 84. As described above, when data to be decided finally is not in the null region, data correction of the data is not performed. However, this way will give no influence to the failure rate. Because as far as the Gaussian noise is considered, almost all the noise causing errors is considered to be in the null region. Accordingly, the number of calculation step is reduced to a great extent by performing data correction only when data to be decided are in the null region. This will contribute to simplification of the circuit when the multi-use of the circuit to be considered. The reliability detector circuit 70a2 has the same construction of the circuit 70a1 as shown in FIG. 17 except the construction that input terminal pairs 78c1, 78c2 and 78f2 are exchanged to each other.

As described above, in case the data have been already decided as the input data to the reliability detector circuit, the signal voltage in the final decision circuit is used, thereby the reliability of the reliability detector circuit itself being enhanced.

Figure 18:
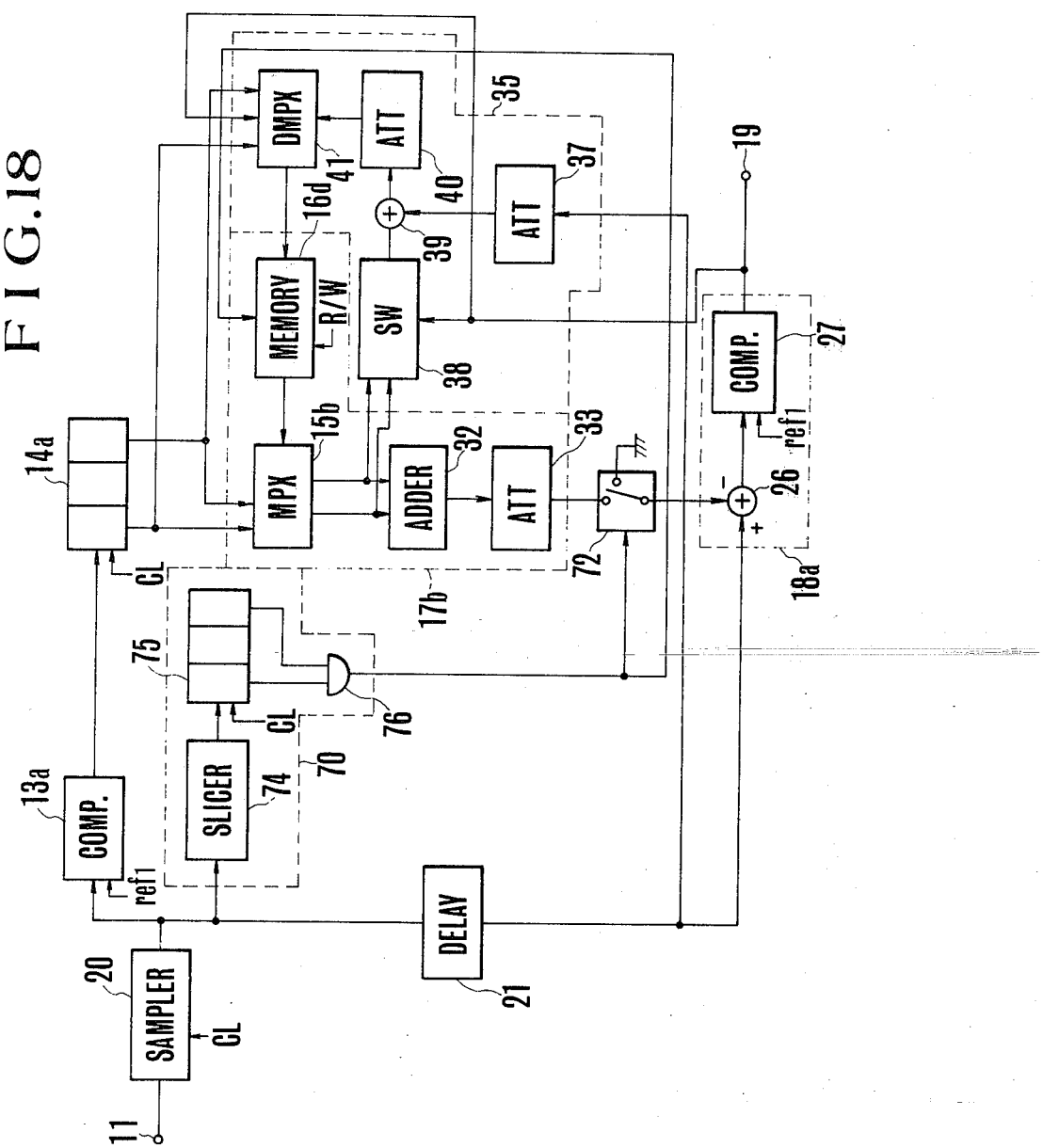
FIG. 18 is a block diagram of the modified embodiment achieved by combining those of FIGS. 7 and 13.

FIG. 18 is a block diagram showing another embodiment which is achieved by combining two embodiments as shown in FIG. 7 and FIG. 13 as well. In the embodiment of FIG. 7, as has been explained, it is attempted to remove the distortion of the transmission line, of which characteristics are varied with time, while the embodiment of FIG. 13 is attempting to reduce the failure rate upon decision.

In accordance with whether or not the output of the sampler is in the null region "R" in FIG. 14, the slicer 74 of the reliability detector circuit means 70 puts out the signal "0" or "1" which, in turn, is stored by 3-bit register 75 sequentially. The first and third data of said register 75 are transmitted to AND gate 76 to obtain "and". Said AND gate gives "1" only when data in the time slots before and after the output of the delay line 21 are not in the null region, or when the tentative decision is considered to be correct in all probability. Then, the output "1" is transmitted to the switch 72 and the reference value memory 16a as well. When at least one of the input signals to said AND gate 76 is in the null region R, "0" is put out of said gate 76. The switching means 72 passes the distortion quantity from the distortion memory 17b to the final decision circuit 18a when the output of AND gate 76 is "1" while it gives zero volt (earth potential) to the final decision circuit 18a when the output of said gate is "0". In this way, there is lowered the probability that the distortion quantity of the incorrect pattern is used as the estimated distortion. In the final decision circuit 18a, the correction voltage obtained through the switch 72 is subtracted from the output of the delay circuit 21 by using the subtracting means 26. The result of this subtraction is transmitted to the comparator 27 which has the same construction as the comparator 13a, to be compared with the ref.1. After this comparison, the final decision value is obtained through the terminal 19.

The construction of the distortion memory 17b in this embodiment is same as that of the embodiment as shown in FIG. 17 except that the analog memory 16a for storing reference values receives the output of the reliability detector circuit 70. Accordingly, it includes the multiplexer 15b, adder 32, and attenuater 33.

The distortion memory adaptation circuit 35 is used for sequentially correcting the contents of the analog memory 16d which correspond to patterns obtained by the first and third data of the shift register 14a and the output of the final decision circuit 18a. In the distortion memory adaptation circuit 35, the correction is performed only when the output of the reliability detector circuit 70 is "1", that is, when the pattern detected by the pattern detector circuit 14a appears to be likely. First of all, the output of the delay circuit 21 is given to the attenuater 37 as the signal for adaptation. Said attenuater is used for multiplying said delay circuit output by a constant value k. Then, the multiplexer 15b selects two values from the memory based on bit patterns of the shift register 14a. Further, the switch 38 selects one of said two values which corresponds to the output of the final decision circuit 18a. With this switch 38, an average receiving voltage corresponding to the receiving symbol is taken out and then transmitted to the adder 39 to be added to the output of said attenuater 37. After that, the result of addition is multiplied by k/k+1 through the attenuater 40, and then written into the memory through the demultiplexer 41, said memory corresponding to the pattern that is obtained by the first and third bits in the shift register 14a of the analog memory and the output of the final decision circuit 18a. It is apparent, in this case, that the output of the attenuater 40 may be written into the memory corresponding to the first, second, and third bit patterns of the shift register in said analog memory 16d. In this time, the output of the reliability detector circuit 70 is used as writing pulses and writing is performed only when said output is "1". In such a way as described above, the contents of the analog memory 16d are corrected in sequence, so that even when the intersymbol interference is changed with time by the irregular characteristic variation of the transmission line, the signal detector of this invention may follow such change and obviate the distortion caused by such intersymbol interference. When the noise influence is large and the characteristic of the channel varies slowly, value of k is to be made smaller, but when the noise influence is small and the characteristic variation is quick, the value of k is to be made larger. Further, the adaptation is performed only when the output of the reliability detector circuit 70 is "1", so that there is less possibility that a wrong writing is made in a wrong address, thus achieving more accurate correction.

Figure 19:
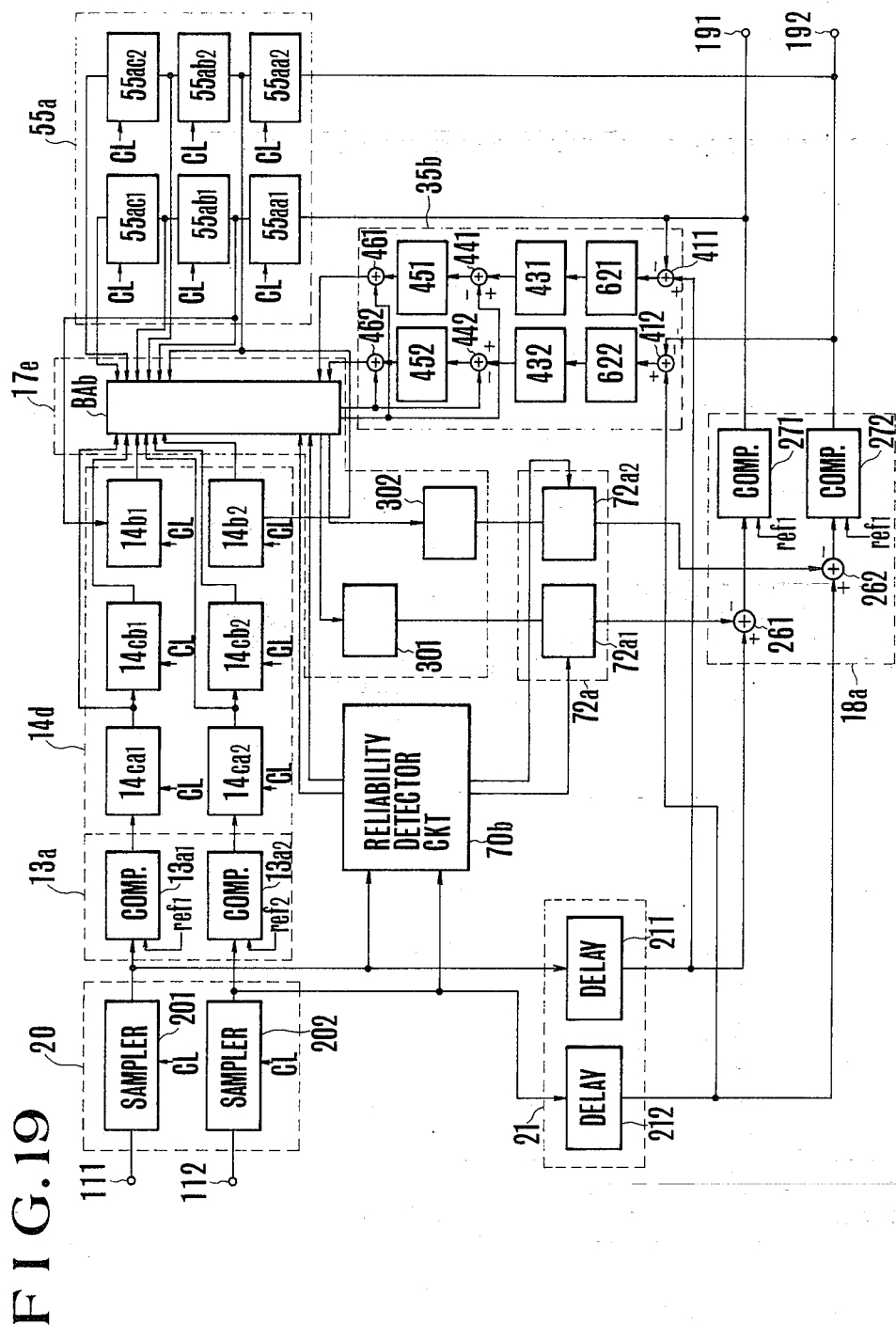
FIG. 19 is a block diagram of the embodiment modified to be applied to 4-value quadrature amplitude modification system.
Figure 20:
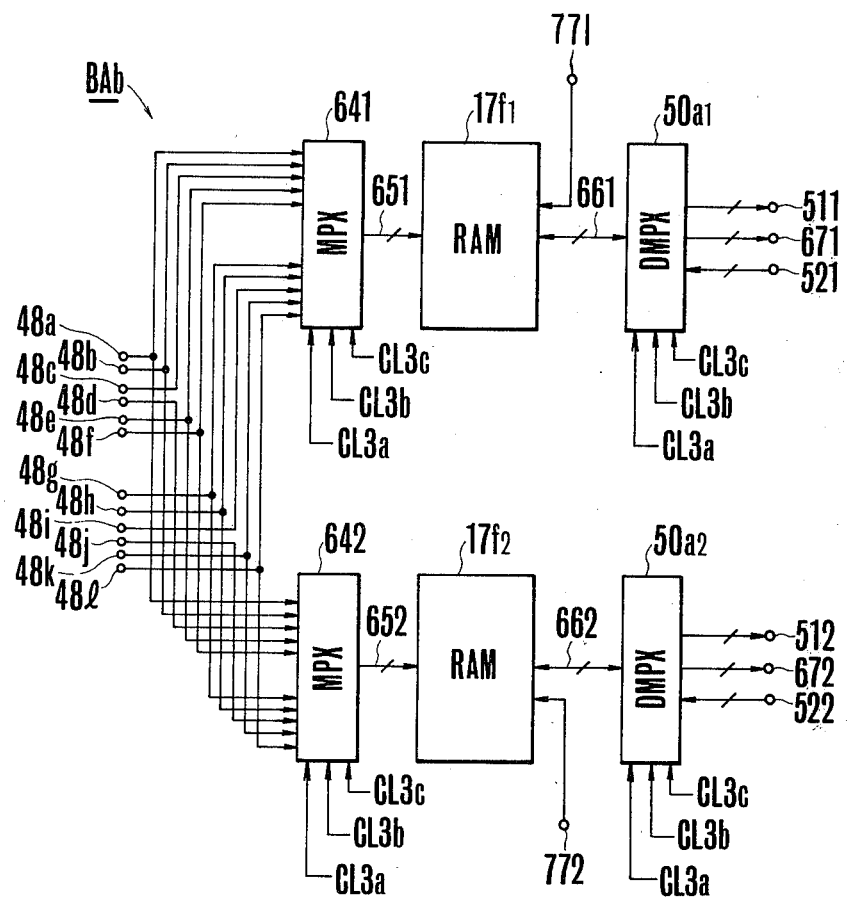
FIG. 20 is a block diagram to show concrete contents of the block BAb in FIG. 19.

FIGS. 19 and 20 are block diagrams showing still another embodiment of this invention, which is applied to 4-value quadrature amplitude demodulation system. This embodiment is realized by combining the embodiment as shown in FIG. 11 and a circuit for reducing the failure rate at the time of the tentative decision.

In this embodiment, as discussed thus far, it is considered to remove the distortion caused by each one symbol before and after a receiving symbol. Two base band signals in phase and in quadrature phase are sampled by the sampler 20, and then they are tentatively decided by the tentative decision circuit 13a, and at the same time they are used as the input of the reliability detector circuit 70b and treated by the delay circuit 21 to be delayed by one time slot. The tentatively decided data are received by a pattern detection circuit 14d. In this embodiment, as for data that are received after or at the same time the delay circuit 21 has sent its output signal to be decided finally, the output of the tentative decision circuit 13a is stored in the shift register type memory 14ca1, 14cb1 and 14ca2, 14cb2. As to data, however, that are received before the output signal of said delay circuit 21, the final decision has been made already, so that the output from the final decision circuit 18a is stored in the shift register type memory 55aa1 and 55aa2 and then written in the registers 14b1 and 14b2 respectively at the next time slot.

In this way, the tentative decision data of receiving signals in phase and in quadrature phase are stored in the register 14ca1 and 14ca2, said receiving signals being received at terminals 111 and 112 one time slot later than the output signal to be decided finally is sent from the delay circuit 21; the tentative decision data of receiving signals received at the same time slot are stored in the register 14cb2; and the final decision data of the receiving signal received one time slot before are stored in the register 14b. In the block BAb of the distortion memory 17e, the distortion corresponding to respective patterns in phase and in quadrature phase are taken out as the digital code by using as address the patterns detected by the pattern detection circuit 14d. The detail of the block BAb in said distortion memory circuit 17d will be described later.

The distortion taken out of said block BAb of the distortion memory circuit is converted into analog voltages through D/A converters 301 and 302, and then supplied to switching circuit means 72a. In this switching circuit means 72a, like the case of FIG. 18, only when the signal from the reliability detector circuit 70b is "1", the output from said D/A converter 301 and 302 is given to the final decision circuit 18a to make a correction decision. When the output of said reliability detector circuit 70b is "0", the estimated distortion is made zero, thus performing no correction. The operation of this reliability detector circuit will be discussed later.

The output of the final decision circuit 18a is supplied to the shift register means 55a for 3 symbol which constitutes the final decision pattern memory circuit.

Next, the distortion memory adaptation circuit 35b will be discussed. According to this adaptation circuit 35b, in order to obtain the distortion of receiving data delayed by the delay circuit 21, decision data from the final decision circuit 18a are compared with said delayed receiving data to determine errors therebetween by using subtracting means 411 and 412. Error voltages obtained by subtracting means 411 and 412 are delayed by one time slot through delay lines 621 and 622 and then converted into digital codes by means of analog-digital (A/D) converters 431 and 432. At the same time, the distortion quantity in phase as well as in quadrature phase is read out of the block BAb of the distortion memory 17e. This is done in the same way as mentioned before, in which addressing is made by using the pattern of the final decision series which has been stored in the shift register 55a, and the memory pattern of said pattern detection circuit 14d as well. The distortion voltage obtained as the output of A/D coverter 431 and 432 is delayed by delay lines 621 and 622 from the final decision time by one time slot so that it corresponds to the central data of the shift register 55a, thus it indicating the distortion that is really received corresponding to the data pattern which has been read out. Data read out of said distortion memory 17e are subtracted from the output of said A/D converters 431 and 432 by means of digital subtracting means 441 and 442. The balance by this subtracting operation is multiplied by a constant k through digital multipliers 451 and 452, and then the product is added to the average distortion that is read out of the distortion quantity memory 17e. The result is written into the address corresponding to the pattern stored in the shift register 55a. By this way it comes to be possible to vary the distortion correction quantity which is stored in the block BAb of said distortion quantity memory 17e, in response to the transmission system condition.

FIG. 20 shows the details of the block BAb in the distortion memory circuit 17e. The construction of said block BAa is same as that of the block BAa in FIG. 12 except the point that RAM 17f1 and 17f2 for storing the reference value are connected to terminals 771 and 772 to which the output of the reliability detector circuit 70b is supplied. Accordingly, only the point which characterizes the block BAb will be described in the following.

The distortion quantity in phase and in quadrature phase, which is read out of RAM 17f1 and 17f2 by using the pulse CL3a, is received by demultiplexers 50a1 and 50a2 through data buses 661 and 662. Said demultiplexer 50a1 and 50a2 connect said data buses to the terminals 511 and 512 which are connected respectively to D/A converters 301 and 302 of FIG. 19 at the beginning of each time slot. When the time for final decision, (sufficiently smaller than one time slot) has passed, multiplexers 641 and 642 connect terminals 48g, 48h, 48i, 48k and 48l to the address bus 651, and also connect terminals 48g, 48h, 48j, 48k and 48l to the address bus 652. At the same time, demultiplexers 50a1 and 50a2 connect data buses 661 and 662 to terminals 671 and 672 which are to be connected to the distortion memory adaptation circuit 35b. Consequently, from terminals 671 and 672 there is put out the distortion quantity in phase and in quadrature phase, which correspond to the final decision pattern stored in the shift register 55a.

When a new distortion quantity has been obtained by the distortion memory adaptation circuit 35b, demultiplexers 50a1 and 50a2 connect respective data bus 661 and 662 with input terminals 521 and 522 from digital adders 461 and 462 of the distortion memory adaptation circuit 35b. Further, when the input to terminals 772 and 773 from the reliability detector circuit 70b is "1", or only when the final decision patterns given from terminals 48g, 48h, 48i, 48j, 48k and 48l are considered reliable, RAM 17f1 and 17f2 are changed from read-out mode to write mode. By performing such operation as mentioned above for one time slot, the memory capacity of RAM 17f1 and 17f2 is varied adaptively and it is prevented that the distortion is written into a wrong address when a wrong pattern is decided.

Figure 21:
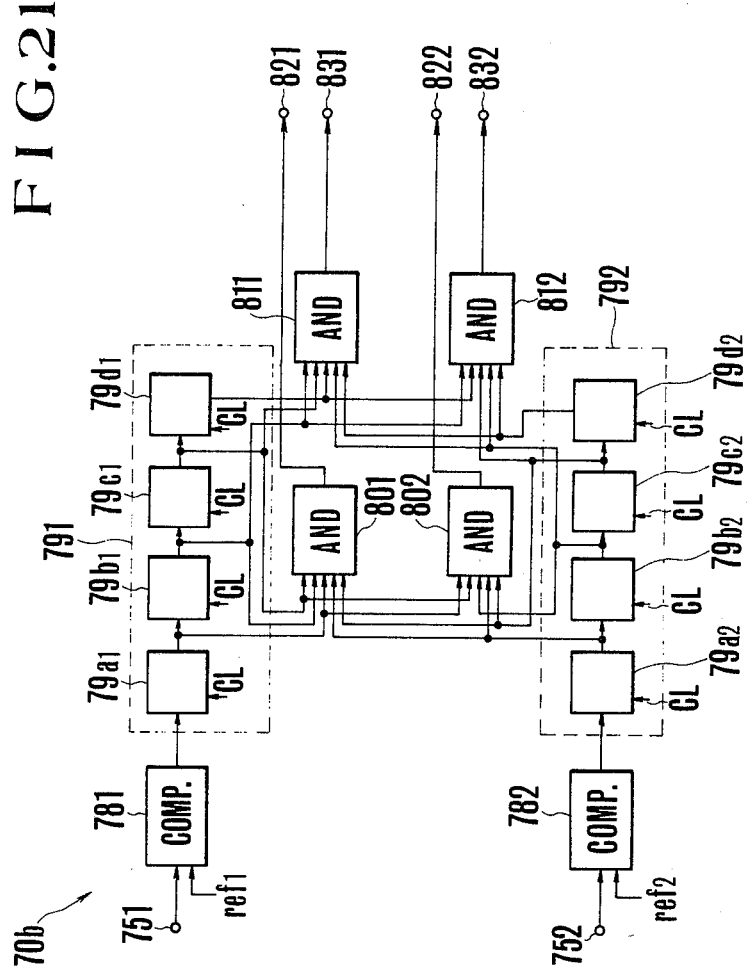
FIG. 21 is a block diagram to show a concrete example of the reliability detector in FIG. 19.

FIG. 21 shows the details of the reliability detector circuit 70b shown in FIG. 19.

In the figure, terminals 751 and 752 are input terminals for receiving data in phase and in quadrature phase which have been sampled by the sampler 20 in FIG. 19. Comparator 781 and 782 decide whether or not the sampled receiving signal is in the null region that has been set in advance. Said comparators put out the signal "1" when the sampled receiving signal is not in the null region while they put out the signal "0" when said receiving signal is in the null region. The output from said comparator 781 and 782 is received by the shift registers 791 and 792 with 4 bits. The reliability of the patterns which are estimated at the pattern detector circuit 14d and final pattern memory circuit 55a, is decided based on patterns of said shift registers. In case of data in phase, the reliability of the pattern detector circuit 14d is determimed by using AND circuit 802 to make "and" of registers 79a1, 79c1, 79a2, 79b2 and 79c2. In case of data in quadrature phase, however, the reliability is determined by using AND gate 801 to make "and" of registers 79a1, 79b1, 79c1, 79a2, and 79c2. In other words, for the address for the distortion to be read out of the block BAb of the distortion memory circuit 17e, there are used the tentatively decided patterns for symbols before and after the receiving signal and the tentatively decided patterns of the other phase in the same time slot as the receiving signal, and "1" is put out only when all of said tentatively decided patterns are not in the null region. More particularly, in case of the data in phase, the reliability is determined by putting out "1" when both the tentatively decided data in phase and in quadrature phase in the front and rear time slot, and the tentatively decided data in quadrature phase in the identical time slot are not in the null region. In case of the data in quadrature, the reliability is determined by putting out "1" when both the tentatively decided data in phase and in quadrature phase in the front and rear time slot, and the tentatively decided data in phase in the same time slot as the receiving signal are not in the null region. In the same manner, for adaptation by the distortion memory adaptation circuit 35b, the patterns in the shift register 55a are used as the address, so that the reliability is determined by checking whether or not the data in the time slot corresponding to said address is in the null region. Accordingly, the reliability as to the data in phase is determined by using AND gate 812 to produce "and" by registers 79b1, 79d1, 79b2, 79c2, and 79d2, while as to the data in quadrature phase, it is determined by using AND gate 811 to produce "and" by registers 79b1, 79c1, 79d1, 79b2, and 79d2.

In this manner, the output from said AND circuits 802 and 801 is transmitted to switches 72a1 and 72a2 in FIG. 19 through terminals 822 and 821 while the output from said AND circuits 812 and 811 is transmitted to terminals 772 and 771 in FIG. 20 through terminals 832 and 831, thereby performing the correction decision by the final decision circuit 18a and the change of the distortion quantity by the distortion memory adaptation circuit 35b.

It should be noted that in the reliability detection upon distortion memory adaptation, the reliability is enhanced by using the decision whether or not the output of subtracting means 261 and 262 is in the null region.

With respect of the data in the time slot on which the final decision has been already made, it is better to use the final decision as the pattern data to the pattern detection circuit. Because this lessens the probability that erroneous bits exist in the pattern detector circuit. The construction of the circuit may become slightly complicated but the probability of using the distortion quantity corresponding to erroneous pattern data is reduced to a great extent.

By the way as described above, it is made possible to prevent the influence by erroneous tentative decision from being propagated to other symbols.

In the way as described above, however, the correction at the time of the final decision and the adaptation of the distortion memory circuit are not performed when the tentative decision is not reliable, so that it would not be proper to rely upon such way when the distortion in the channel is so large and the failure rate of the tentative decision is considerably high. In order to solve the problem like the above, filter means may be inserted before the tentative decision circuit. This filter means may be a linear automatic equalizer circuit which varies its characteristics adaptively. With filter means like this, the linear distortion of the transmission line is removed, thereby lowering the failure rate of the tentative decision and increasing efficiency of removing non-linear distortion.

Figure 22:
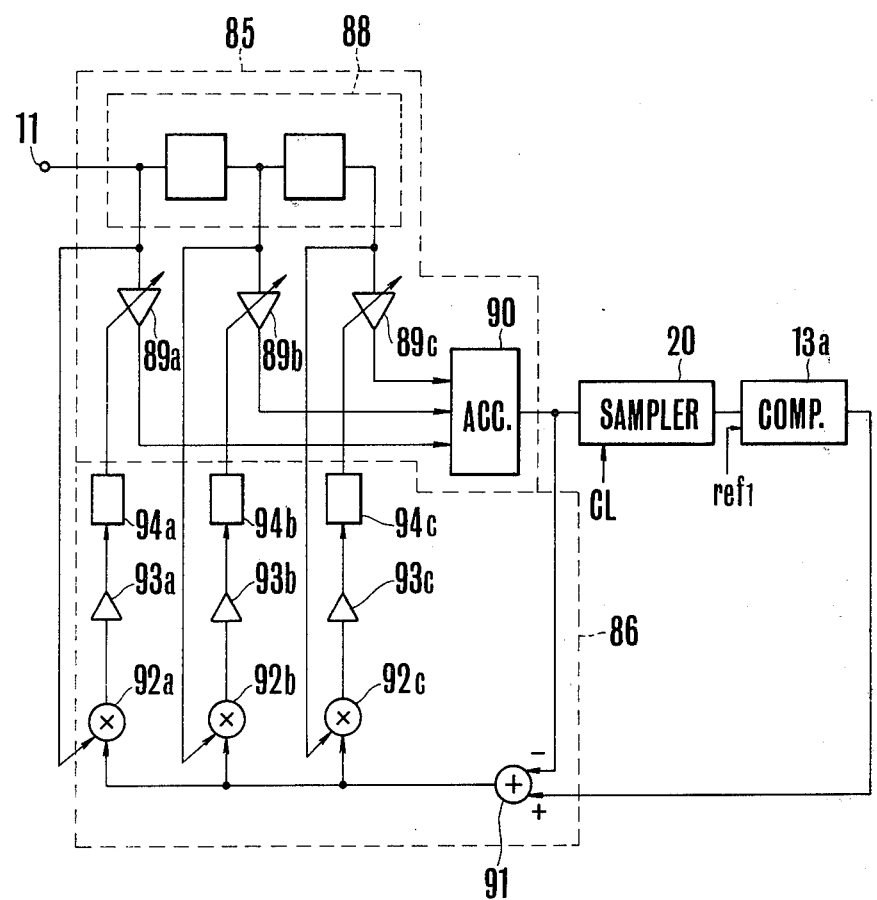
FIG. 22 is a block diagram of the modification of the present invention in case of using a linear automatic equalizer.

FIG. 22 is a block diagram of the linear automatic equalizer which is to be installed in the signal detector according to the present invention. In this instance, the equalizer is applied to embodiments as shown in FIGS. 18 and 19 and is inserted after the input terminal thereof. In FIG. 22, the linear automatic equalizer comprises a receiving signal filter 85 and a receiving signal filter adaptation circuit 86 which receives and uses the output from the tentative decision circuit 13a. Said receiving filter 85 is constructed with 3-tap delay line type transversal filter. The input signal received at the terminal 11 is given to the delay line 88 with taps. Each tap output of said delay line 88 is transmitted to the accumulator 90 through variable gain circuits 89a, 89b, and 89c. Said accumulator 90 adds all of said tap output together and transmits its output to the sampler 20. Subtracting means 91 subtracts the input of the sampler 13a from the output of the same. Multiplier 92a, 92b, and 92c multiply the output of subtracting means 91 by each tap output of said delay line 88 and transmit respective output to integrators 94a, 94b, and 94c through constant gain circuits 93a, 93b, and 93c. These integrators 94a, 94b, and 94c set the variable gain of variable circuits 89a, 89b, and 89c. With this construction, each gain of variable gain circuits 89a, 89b and 89c is set such that the square mean error at the input of the tentative decision circuit 13a is minimized.

In this embodiment, the receiving signal filter adaptation circuit is controlled by using the result of the tentative decision. However, it is apparent that the result of the final decision may be used for that purpose. Further, it is also apparent that an algorithm of linear automatic equalizer which makes the maximum error smaller, may be used instead of said equalizer which minimize the square mean error.

Next, another digital signal detector embodying the present invention will be discussed, in which vector metric calculation system is adopted.

Generally, the signal detector of this class is operated in the following manner. That is to say, desired receiving signals $S_{a_0a_1a_2a_3...}(t)$ are prepared in advance at the receiver side with respect to all the patterns of the transmitting digital signal series $a_0, a_1, a_2, a_3$ ... When the receiving signal s(t) is actually received, the vector distance (magnitude) between said receiving signal and desired receiving signals is calculated by the following equation with regard to all the patterns.

$$d^2 = \int_{-\infty}^{\infty} |S(t) - S_{a_0a_1a_2a_3...}(t)|^2 \, dt \quad (4)$$

After this calculation, the pattern having the minimum value is distinguished from others as the receiving digital series. In this manner, the receiving signal is distinguished most suitably.

The operation of the present embodiment follows the principle described briefly in the following. It is assumed that the symbol is not yet decided at one time slot among the digital series to be distinguished but all the symbols are already decided at other time slots. Under this condition, there existis only the desired receiving signal $S_{a_1a_2a_3...}(t)$ for all possible symbols in one time slot. As to the limits of integral in the equation (4) when the distance $d^2$ is calculated, they are to be determined to cover the range in which a pattern in a time slot gives its influence to said receiving signal. Now, let the continuous time during which a symbol in a time slot can give its influence, be $\pm\tau$. In this case, the vector distance in a time slot nT will be calculated as follows.

$$d'^2 = \int_{nt-\tau}^{nt+\tau} |S(t) - S_{a_1a_2a_3...}(t)|^2 \, dt \quad (5)$$

In this invention, as to the symbol other than that of the time slot to be decided, there is utilized the tentative decision result which is obtained by judging the receiving signal directly when the vector distance is calculated by the equation (5) above. In this case, if the tentative decision is correct to some extent, it may be possible to obtain signal distinction that is near the optimal distinction. Further, in the present invention, as to all the possible digital series patterns of the time slot within $\pm 2\tau$, which is capable of giving the influence to the signal continuous time $\pm \tau$, the sampled value which is obtained by sampling the desired receiving signal at a proper sampling interval within the signal continuous time $\pm\tau$ must be stored. The sampling interval may be smaller unless it fails to include the receiving signal therein. When said interval is small enough, the vector distance by the equation (5) may be calculated by accumulation. That is;

$$d''^2 = \sum_{-\frac{\tau}{T} < m < \frac{\tau}{T}} |S(mT') - S_{a_{n-1} \ldots a_n \ldots a_{n+1}}(mT')|^2 \quad (6)$$

where T' is a sampling interval, and $1 \leq \tau/T$. The prior method of calculating vector distance was disclosed by Mohammed Farroque Mesiya et al through the article entitled "Maximum Likelihood Sequence Estimation of Binary Sequencies Transmitted Over Bandlimitted Nonlinear Channels" (IEEE TRANSACTION ON COMMUNICATIONS Vol COM-25, No. 7, July 1977, p. 633–643). According to the present invention, however, the number of vector distance calculation is reduced to a great extent comparing with the prior art like the above, and the circuit for that purpose is considerably simplified. Still further, according to the present invention, it is not required to specify the nature of the receiving signal, so that the invention is apparently applicable not only to the linear transmission line but also to the non-linear.

In the following embodiment, there will be discussed 2-value digital signal communication.

Figure 23:
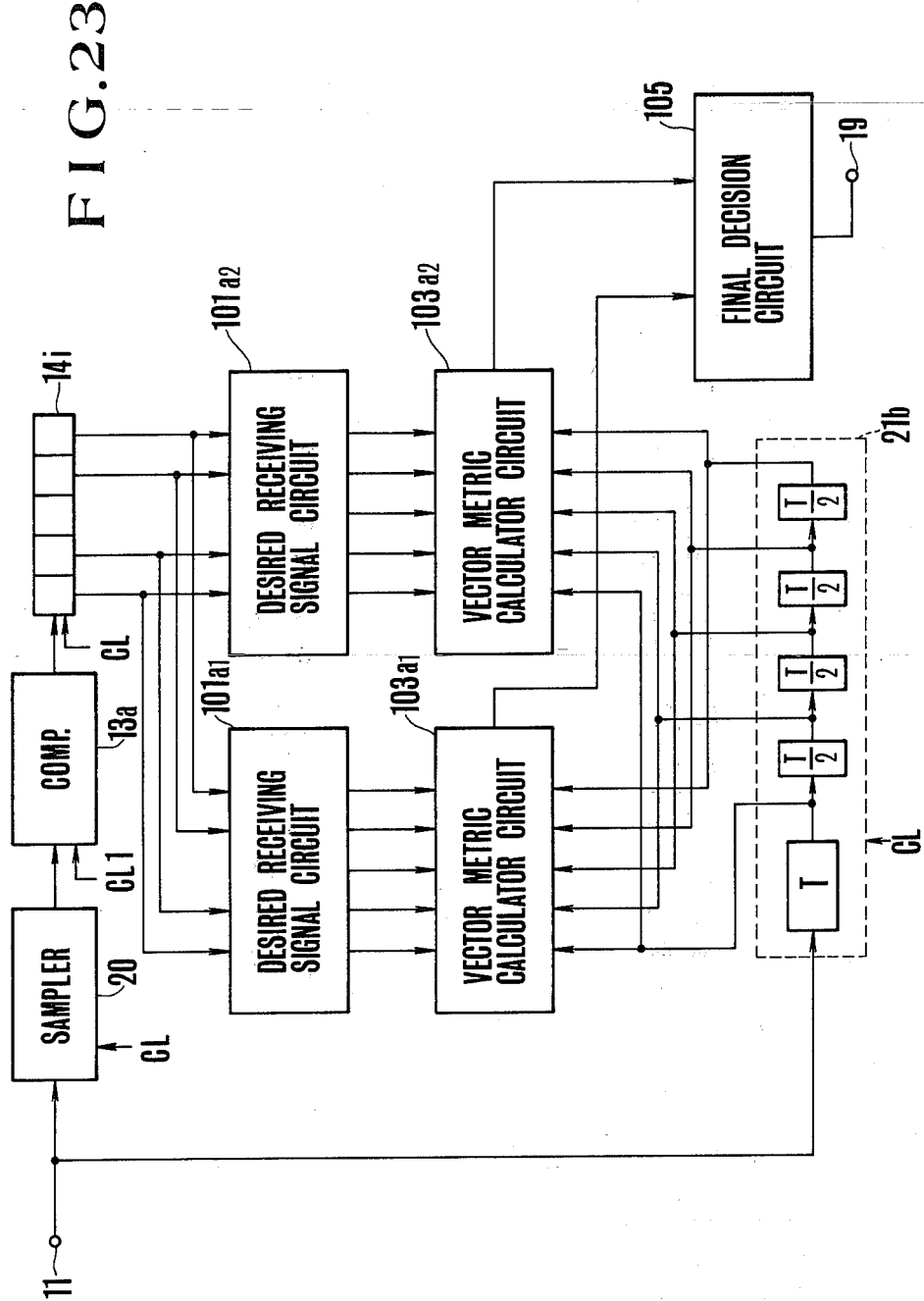
FIG. 23 is a block diagram of the embodiment of the invention, which is applied to 2-value digital signal communication and is provided with a vector metric calculator system.

FIG. 23 is a block diagram showing the signal detector embodying the present invention. In the following, there will be considered the case in which desired receiving signals are assumed to give the signal to be decided the influence from front and rear time slots, that is, the influence from all the possible digital series patterns for two time slots, and sample values of desired receiving signals are assumed to be stored at every half signal interval. The receiving signal received at the input signal 11 is divided into two. One is sent to the delay line 21b with taps, which provides the delay equivalent to 3 time slots, and the other is sampled by the sampler 20 and receives a tentative decision "0" or "1" at the comparator 13a forming the tentative decision circuit. The decision threshold of this comparator 13a is set as the center voltage between the voltage when "1" is received with no distortion and the voltage when "0" is received with no distortion. The data decided tentatively are sent to a shift register type memory 14i working as a pattern detector circuit. In this case, said shift register is assumed to have 5 stages. The desired receiving signal memory circuit means comprises memory circuits 101a1 and 101a2, said circuit 101a1 being prepared for the case when the symbol to be decided is "0" and said circuit 101a2 being prepared for the case when the symbol to be decided is "1". From said desired receiving signal memory circuits, there are taken out 5 desired receiving signal trains which correspond to bit patterns stored in the first, second, fourth and fifth registers of said shift register 14i. All the output from said memory circuit 101a1 are supplied to a vector metric calculator 103a1 while those of said memory circuit 101a2 are supplied to another vector metric calculator 103a2. Further, all the tap output from said delay circuit are also supplied to said calculators 103a1 and 103a2. Taps of said delay circuit 21b are formed at the points corresponding to sampling intervals T, T/2, T/2, T/2 and T/2 in view of the receiving signal side, and said delay circuit is under the control by the clock pulse CL as a whole.

Figure 24:
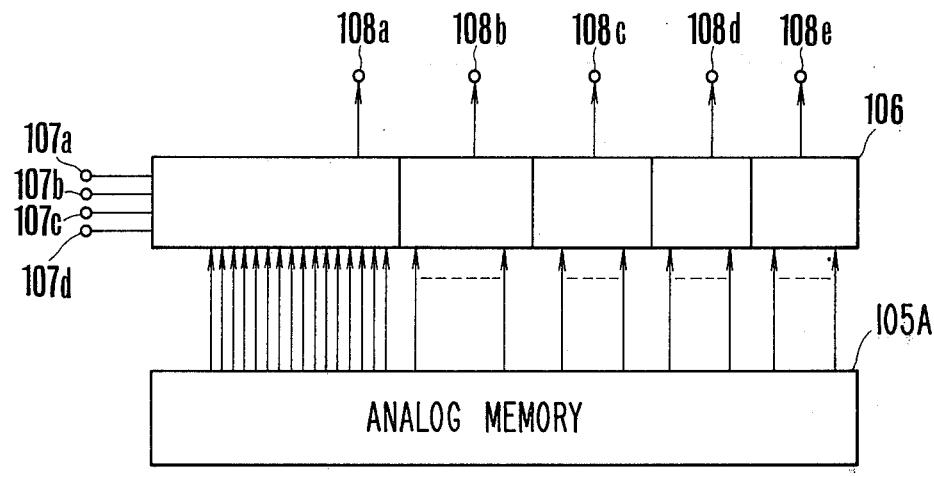
FIG. 24 is a block diagram to show a concrete example of the desired receiving signal memory circuit in FIG. 23.
Figure 25:
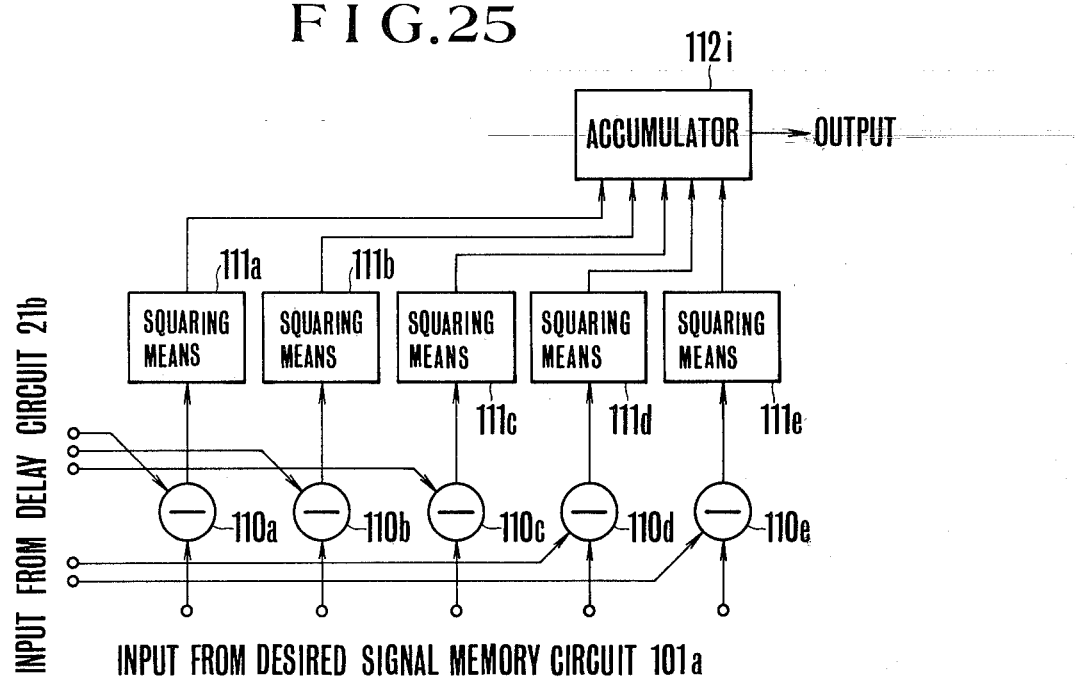
FIG. 25 is a block diagram to show a concrete example of the vector metric calculator in FIG. 23.

Calculators 103a1 and 103a2 calculate the sum of the quantities, each of which is the squared quantity of each tap output minus corresponding receiving signal. Output signals from these calculators are supplied to the final decision circuit 105, which is constituted by a comparator putting out "0" or "1" according to whether the vector distance calculated by said calculator 103a1 is smaller than that calculated by said calculator 103a2. The final decision value is given through the terminal 19. FIG. 24 shows the constitution of said memory circuit 101a and 101a2. In this figure, an analog memory stores reference receiving signal voltage corresponding to bit patterns of the shift register 14i. For instance, in this embodiment sample values of receiving signal voltage are stored in 16 ways of combination at 5 time points 1T, 0.5T, 0, −0.5T, and −1T. All the output of the analog memory 105a are transmitted to the multiplexer 106, which is connected to input terminals 107a, 107b, 107c, and 107d which receives the register output from the first, second, fourth and fifth registers of the shift register 14i. The memories corresponding to 4 bit patterns of the shift register 14i are read out of the terminals 108a, 108b, 108c and 108d of the multiplexer 106. Vector metric calculators 103a1 and 103a2 have such construction as shown in FIG. 25. In this figure, reference numerals 110a through 110e designate subtracting means which make the balance between the input from said delay line 21b and the corresponding input from said memory circuit 101a1 and 101a2. The output of subtracting means is sent to squaring means 111a through 111e to be squared. The squared output are gathered at the accumulator 112 to finalize the calculation of vector metric distance.

Figure 26:
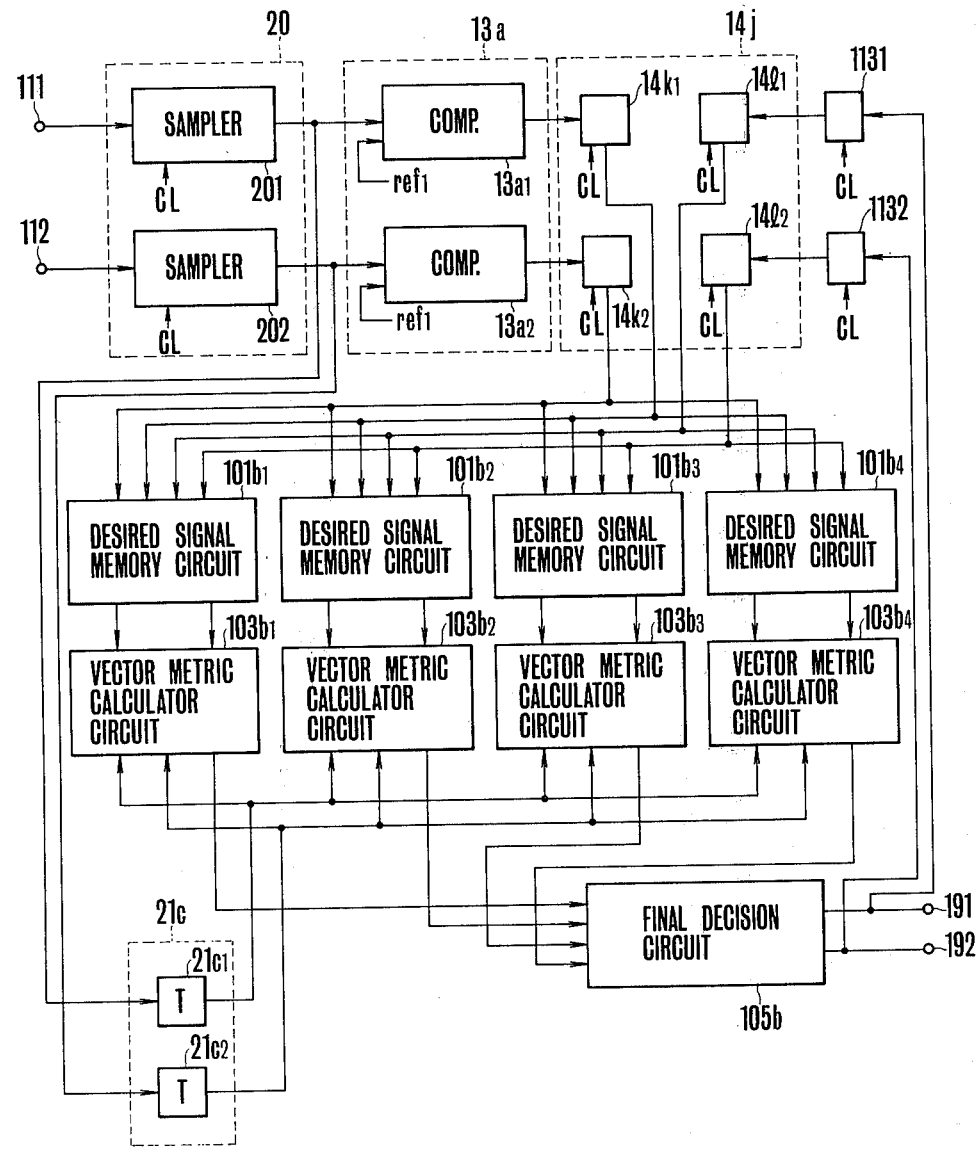
FIG. 26 is a block diagram to show the embodiment which is modified from that in FIG. 23 and applied to 4-value quadrature amplitude modulation system.
Figure 27:
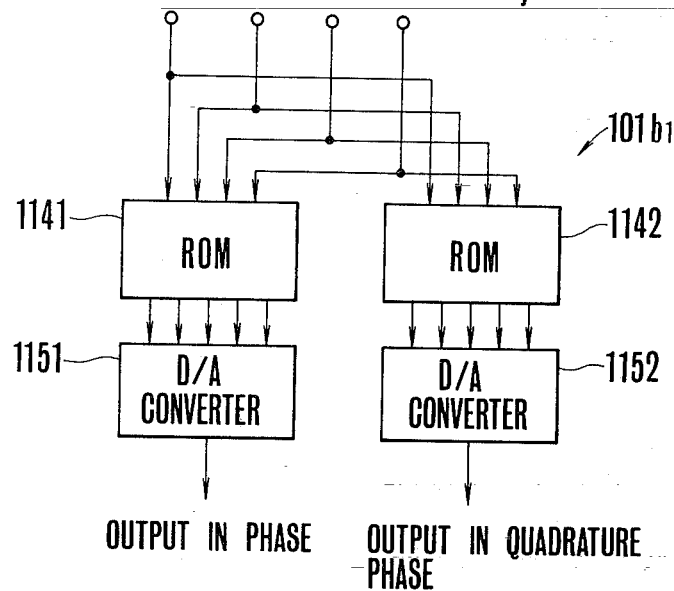
FIG. 27 is a block diagram to show a concrete example of the desired receiving signal memory circuit.
Figure 28:
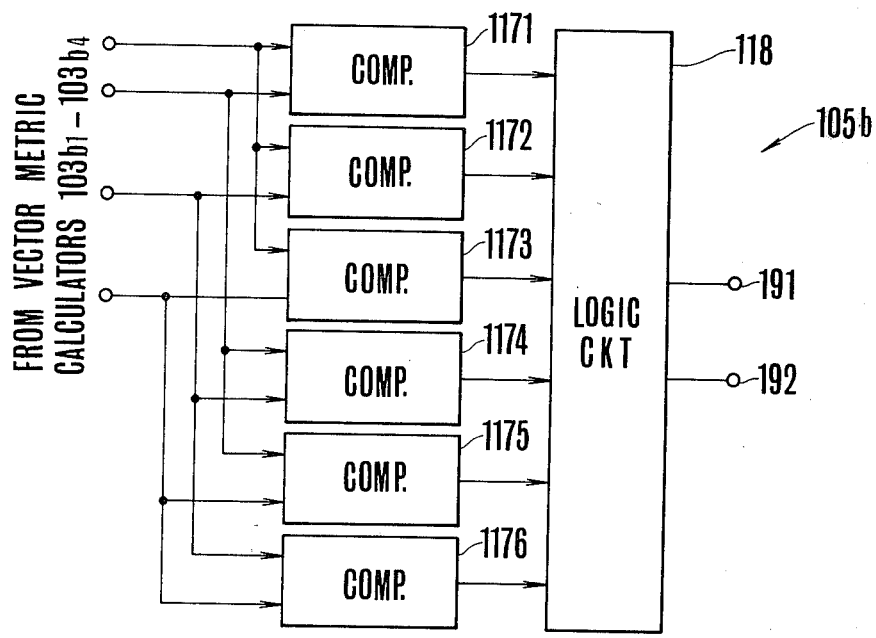
FIG. 28 is a block diagram of the final decision circuit as shown in FIG. 26.

FIG. 26 is a block diagram of another embodiment modified from that shown in FIG. 23 to be applicable to 4 value quadrature amplitude modulation system. Input terminal 111 and 112 receiver demodulated base band analog wave forms both in phase and in quadrature phase as receiving signals. There two series receiving signals are represented by complex numbers. With respect of vector metric distance, squared absolute value of the complex number is calculated only at the time point to be decided. In other words, in this embodiment, the sum of the quantities of squared data in phase and in quadrature phase is calculated and at said time point there is assumed the existence of influence from front and rear time slots. Two base band signals in phase and in quadrature phase are sent to the sampler 20 to be sampled and receive the tentative decision at tentative decision circuit means 13a. At the same time, they are delayed by one time slot by means of the delay circuit means 21c. The data decided tentatively are sent to pattern detector circuit means 14j. In this embodiment, as to the data which are received after or at the same time the delay circuit 21 has sent its output signal to be decied finally, the output of the tentative decision circuit 13a is stored in the shift register type memory 14k1 and 14k2. As to the data, however, which are received before the output signal of said delay circuit 21c, the final decision has been made already, so that the ouptut from the final decision circuit 105b is stored in the shift register type memory 113l1 and 113l2, and then it is written in the registers 14l1 and 14l2 respectively in the next time slot. In this way, the tentative decision data in phase and in quadrature phase, which are received in the next time slot of said delay circuit output, are stored in registers 14k1 and 14k2 while the final decision data in phase and in quadrature phase, which are received before one time slot of said delay circuit output, are stored in registers 14l1 and 14l2. Desired signal memory circuits and vector metric calculators have to be prepared in consideration of the number of patterns to be decided. Now, let (a$_I$, a$_Q$) be data which are transmitted within one time slot (where a$_I$ and a$_Q$ denote data in phase and in quadrature phase respectively and take the value "1" or "−1"). In this case, there exist 4 combinations which are (1, 1), (1, −1), (−1, 1) and (−1, −1). For these combinations there are provided 4 desired signal memory 101b1 through 101b4, and 4 vector metric calculations 103b1 through 103b4. FIG. 27 is a block diagram to show the concrete example of said memory circuit 101b1, which comprises ROM 1141 and 1142, and D/A converter 1151 and 1152, and sends out the output in phase and in quadrature phase from respective D/A converters. The output from the memory circuit 101b1 is received by said vector metric calculator 103b1 along with the output from said delay circuit 21c. FIG. 25 is a block diagram of a concrete example of said vector metric calculator 103b1. The input from the memory circuit 101b1 as well as from the delay line 21c is samely constituted with two signals, so that subtracting means and squaring means have to be prepared two each. Other desired signal memories 101b2 through 101b4 and vector metric calculators 103b2 through 103b 4 are constructed in the same way as said memory 101b1 and calculators 103b1. The vector distance values calculated by said calculators 103b1 through 103b4 are transmitted to the final decision circuit 105b, where the minimum value is selected among the calculated values in phase and in quadrature phase. In FIG. 28, one example of such final dicision circuit is illustrated by using a block diagram. All the combination of 4 signals are put into 6 comparators 1171 through 1176 to be compared with one another. The output from these comparators is sent to the logic circuit 118 to receive logic calculation. After the calculation, "1" or "0" is put out from terminals 191 or 192 in correspondence with data "1" or "−1" in phase and in quadrature phase.

The embodiment as described above differs from that of FIG. 23 in the way of using the data of the time slot on which the final decision has been already made. That is, in the embodiment, such data are used as pattern data to the pattern detection circuit. This might make the construction of the circuit be complicated a little but it lowers the probability of using the receiving signal corresponding to erroneous symbol data.

In order to calculate the vector metric distance, the sum of squared quantity is used in this invention. However, it is possible to construct the present signal detector wherein the sum of the vector absolute value is used for calculating the vector metric.

Figure 29:
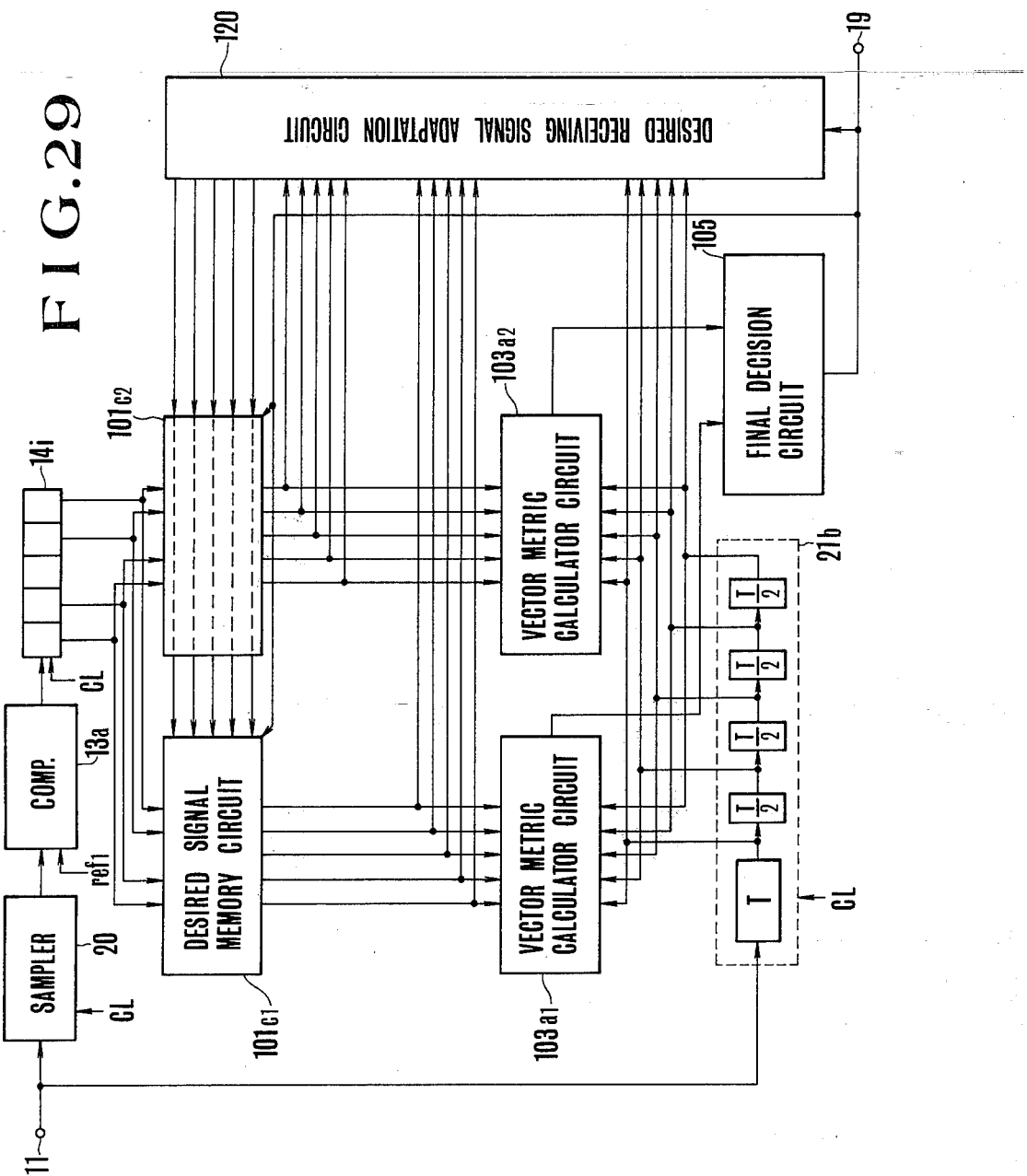
FIG. 29 is a block diagram of the embodiment modified from that shown in FIG. 23.

FIG. 29 is a block diagram to show still another embodiment of the invention, wherein the distortion can be removed by adaptively varying the reference value of the receiver even when the characteristic of the transmission line is varied.

Generally, in case there are pattern and a desired receiving signal Sa$_1$a$_2$a$_3$ ... (t) corresponding thereto, said receiving signal can be expressed as the expected value of a receiving signal S(t) when said pattern is received. Accordingly, said desired receiving signal Sa$_1$a$_2$a$_3$ ... (t) is sequentially corrected through the repetitive procedure represented by the following equation (7)

$$S^+a_1a_2a_3\ldots(t) = Sa_1a_2a_3\ldots(t) - \alpha[S(t) - Sa_1a_2a_3\ldots(t)] \quad (7)$$

where S$^+$a$_1$a$_2$a$_3$ ... (t) is a new corrected receiving signal and α is a correction factor. From this equation (7), it is understood that S$^+$a$_1$a$_2$a$_3$ ... (t) coincides with Sa$_1$a$_2$a$_3$ ... (t) under the steady state and has a value equal to the expected value of S(t). This is the reason why the correction is adaptively made in response to the characteristic variation of the transmission line.

The embodiment as shown in FIG. 29 is achieved by adding a desired signal memory adaptation circuit 120 to the circuit of the embodiment in FIG. 23 and at the same time by modifying the desired signal memory 101c1 and 101c2 in FIG. 23.

Figure 30:
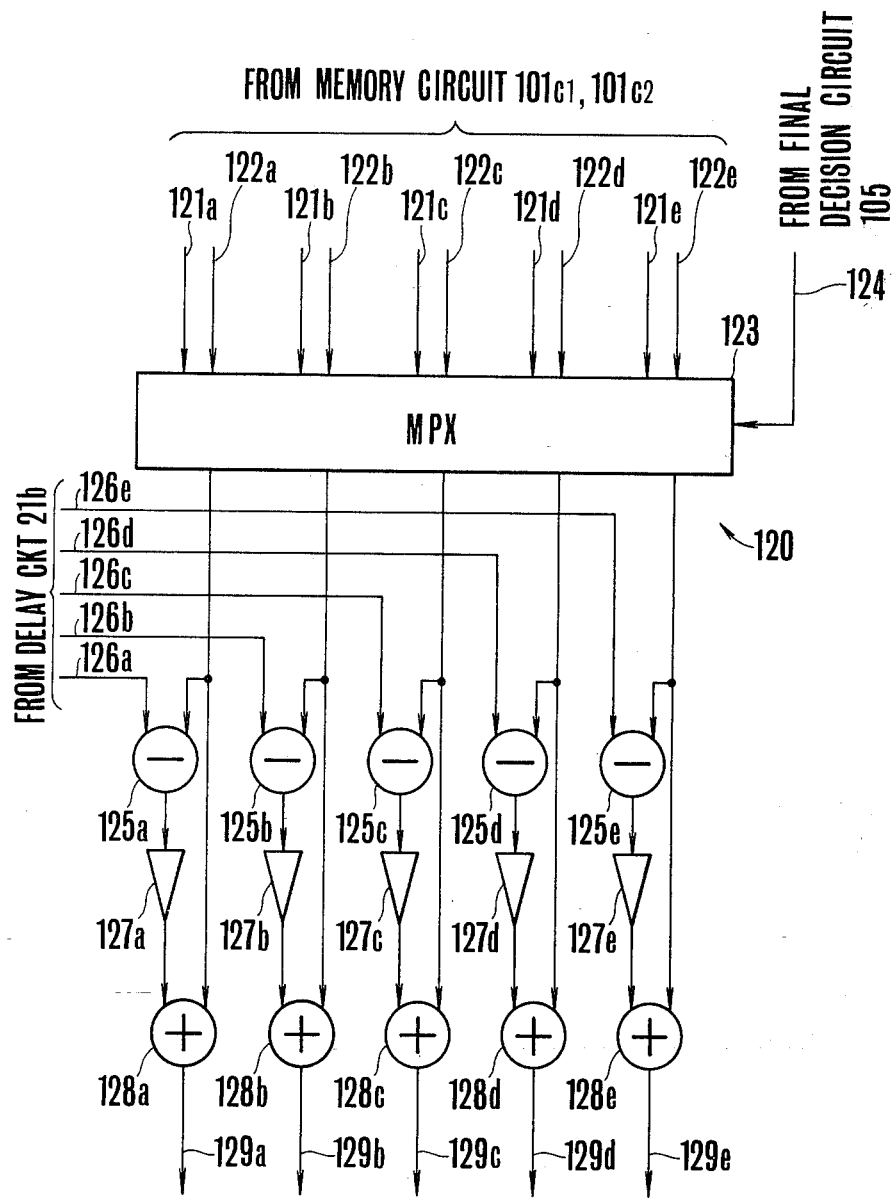
FIG. 30 is a block diagram of the desired receiving signal adaptation circuit.
Figure 31:
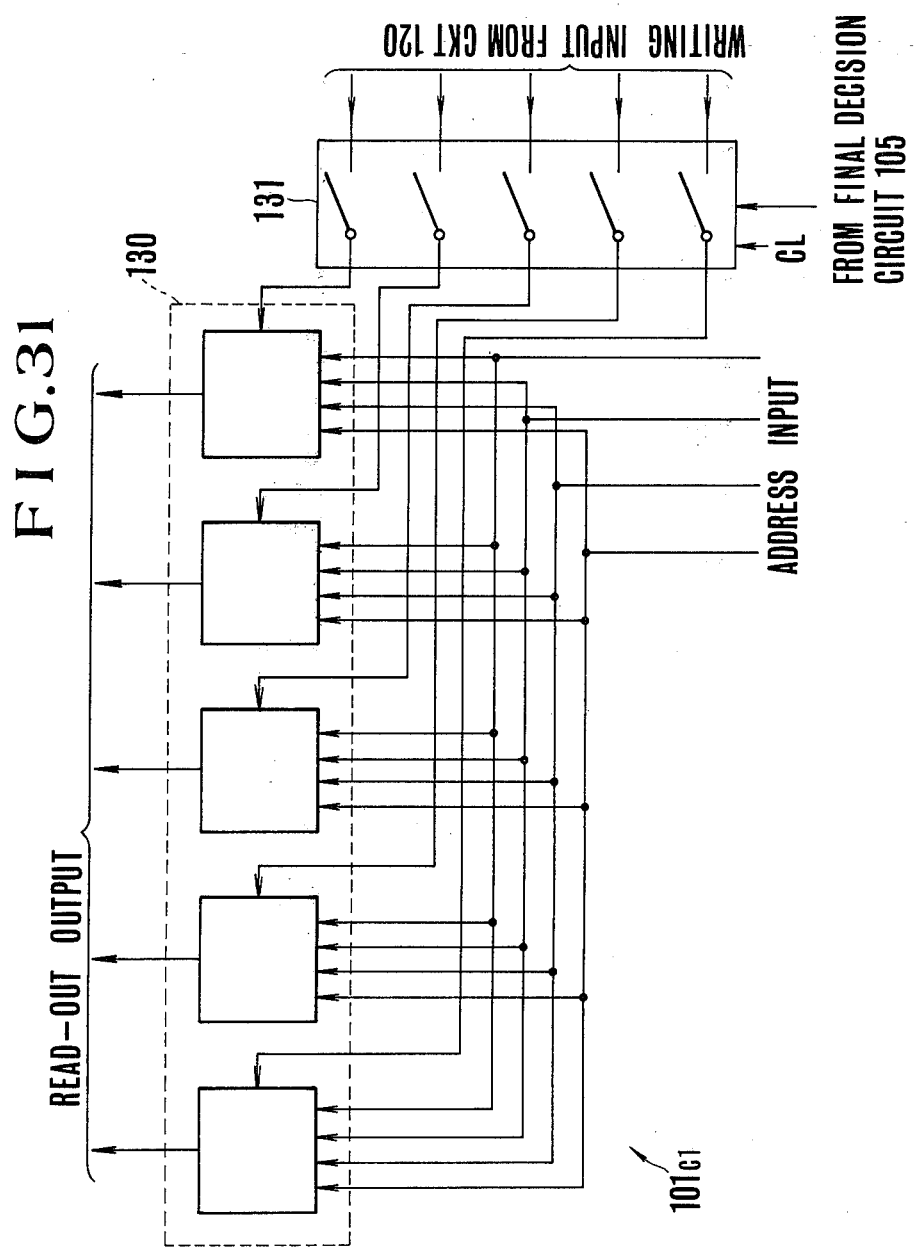
FIG. 31 is a block diagram to show a concrete example of the desired receiving signal memory circuit as shown in FIG. 29.

The concrete construction of said adaptation circuit 120 is shown in FIG. 30. In the figure, lines 121a, 121b, 121c, 121d and 121e are for receiving signals from said desired signal memory circuit 101c1 while lines 122a, 122b, 122c, 122d, and 122e are for receiving signals from said desired signal memory circuit 101c2. All these signals are put into multiplexer 123, by which the output from said memory circuit 101c1 or 101c2 is selected according to whether or not the output of the final decision circuit 105 is "0" or "1". These selected signals are subtracted by subtractors 125a through 125e from respective signals supplied by respective taps of said delay circuit 21b through lines 126a, 126b, 126c, 126d and 126e. The result of the subtraction above is transmitted to adders 128a, 128b, 128c, 128d, and 128e through fixed gains 127a, 127b, 127c, 127d and 127e to be added to signals from said multiplexes 123. Resultant signals by these adders are sent out through lines 129a, 129b, 129c, 129d and 129e as new desired receiving signals. Said memory circuits 101c1 and 101c2 have the construction represented by a block diagram shown in FIG. 31. In this figure, memory means 130 stores the desired signal voltage corresponding to bit patterns of said shift register 14i. In this embodiment, it stores 16 combination each of the sample values of the desired signal voltage at each of 5 time points, 1T, 0.5T, 0, −0.5T and −1T, and 5 memory contents corresponding to 4 bit patterns of the shift register 14i except the center thereof are read out at every time point. On one hand, the output of the desired signal memory adaptation circuit 120 is put into switching means 131, which performs connecting operation only when the output of the concerned signal memory circuit is corrected based on the output of the final decision circuit 105. With this connecting operation, new desired signals are written in correspondence with read-out addresses of the memory 130.

In this way, desired receiving signals stored as reference values in said memory 130 may be changed adaptively in response to the characteristic of the transmission line, thereby removing the distortion. Construction of the vector metric calculators 103a1 and 103a2 are same as that shown in FIG. 25. Further, subtracting means included in said vector metric calculators and said desired signal memory adaptation circuit perform same subtraction, so that said subtracting means may be constructed to be used commonly by them.

Figure 32:
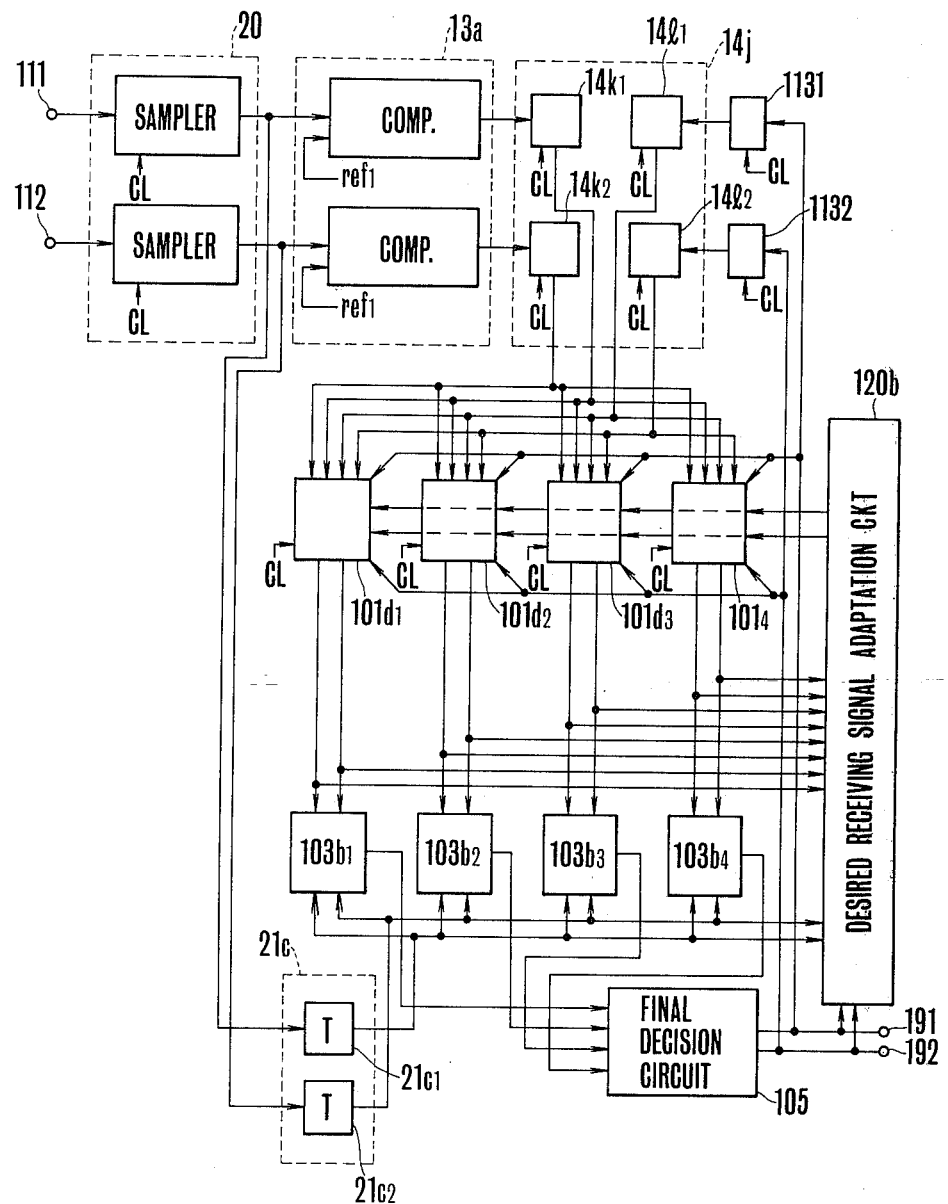
FIG. 32 is a block diagram to show the embodiment which is modified from that of FIG. 26 and is applied to 4-value quadrature amplitude modulation system.

FIG. 32 is a block diagram of another embodiment of this invention, which is modified from the embodiment as shown in FIG. 26, and of which function is same as that of the embodiment as shown in FIG. 29. In this embodiment, the desired signal memory adaptation circuit 120b has the same construction as that of the embodiment in FIG. 30 except the number of input to each element and the increased number of elements. Further, desired signal memory 101d1 through 101d4 are constructed in the same way as that of the embodiment shown in FIG. 31 except the number of input to each element and the increased number of elements. Accordingly the detailed explanation on the construction of this embodiment will be refrained from.

In this embodiment, all the desired signal memory receive new desires signal output in phase and in quadrature phase, and there are corrected the memory contents of the concerned desired receiving signal memory circuit, of which output has been corrected by the signal received.

Figure 33:
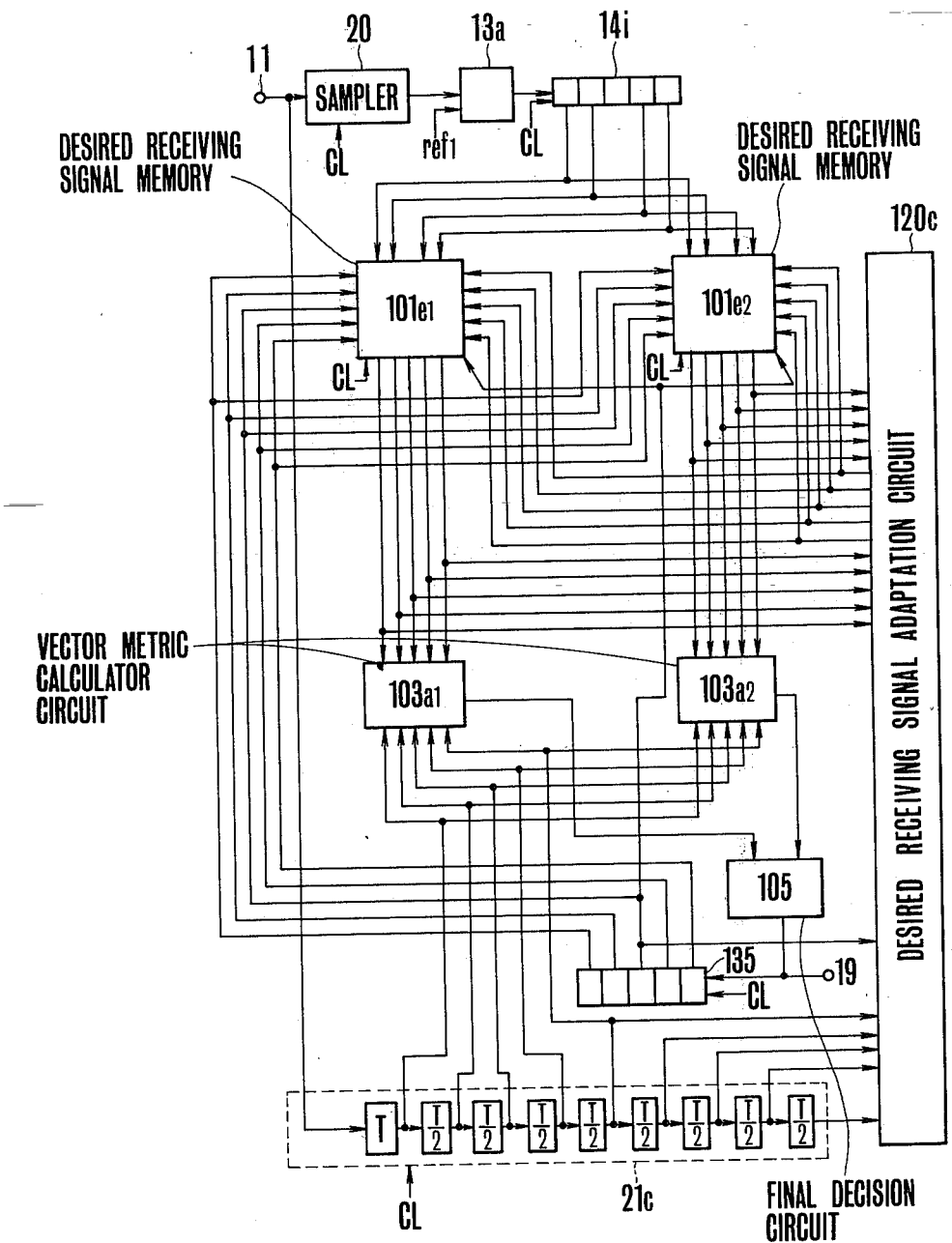
FIG. 33 is a block diagram of the embodiment modified from that of FIG. 29.

FIG. 33 is a block diagram corresponding to the embodiment which is obtained by modifying the embodiment as shown in FIG. 29.

The receiving signal received at the input signal 11 is divided into two. One is sent to the delay line 21b with tap, which provides the delay equivalent to 3 time slots, and the other is sampled by the sampler 20 and the receives a tentative decision "0" or "1" at the comparator 13a forming the tentative decision circuit. The decision threshold of this comparator 13a is set as the center voltage between the voltage when "1" is received with no distortion and the voltage when "0" is received with no distortion. The data decided tentatively are sent to a shift register type memory 14i working as a pattern detector circuit. In this case, said shift register is assumed to have 5 stages. The desired receiving signal memory circuit means comprises the memory circuits 101a1 and 101a2, said circuit 101a1 being prepared for the case when the symbol to be decided is "0" and said circuit 101a2 being prepared for the case when the symbol to be decided is "1". From said desired receiving signal memory circuits, there are taken out 5 desired receiving signal trains which correspond to bit patterns stored in the first, second, fourth and fifth registers of said shift register 14i. All the output from said memory circuit 101a1 are supplied to a vector metric calculator 103a1 while those of said memory circuit 101a2 are supplied to another vector metric calculator 103a2. Further, all the tap output from said delay circuit are also supplied to said calculators 103a1 and 103a2.

Figure 34:
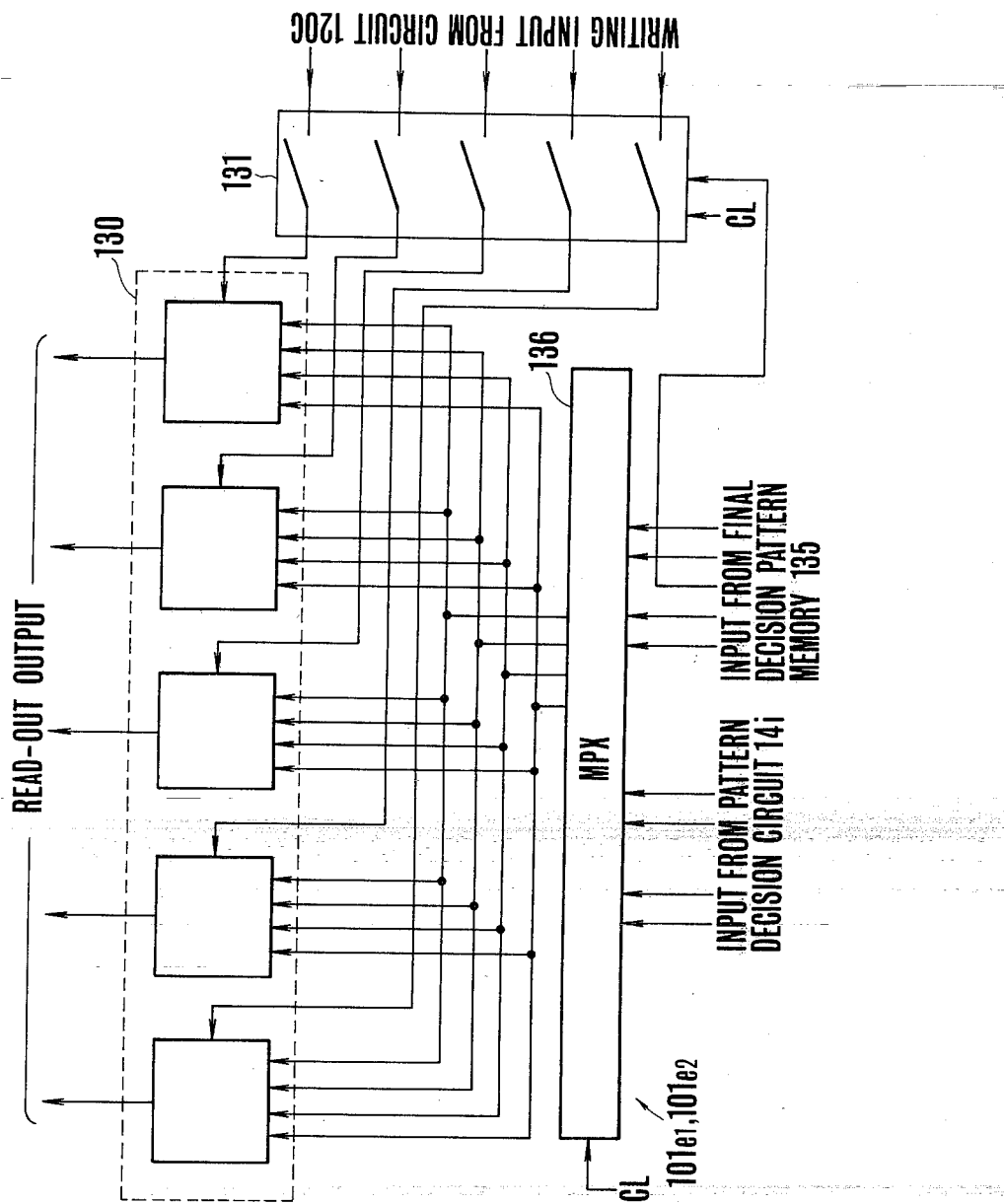
FIG. 34 is a block diagram to show a concrete example of the desired receiving signal memory circuit.

Calculators 103a1 and 103a2 calculate the sum of the quantities, each of which is the squared quantity of each tap output minus corresponding receiving signal. Output signals from these calculators are supplied to the final decision circuit 105, which is constituted by a comparator putting out "0" or "1" according to whether the vector metric calculated by said calculator 103a1 is smaller than that calculated by said calculator 103a2. The final decision value is given through the terminal 19. At the same time, the output of the final decision pattern memory circuit 105 is supplied to the final decision circuit 135 consisting of 5-stage shift register. On one hand, the desired receiving signal adaptation circuit 120c has the same construction as that shown in FIG. 30. In this embodiment, however, it should be noted that lines 126a, 126b, 126c, 126d and 126e of "FIG. 30 receive tap output of said delay circuit 21, which are delayed by 3, 3.5, 4, 4.5 and 5 time slots respectively, and pass it to subtracting means 125a, 125b, 125c, 125d and 125e respectively. These subtracting means also received the output from the multiplexer 123, which works to select the output of the memory 101e1 or 101e2 according to whether the center output of the final decision pattern memory circuit 135, which is supplied to the line 124, is "0" or "1". Each output of said subtracting means is supplied to adders 128a, 128b, 128c, 128d and 128e through fixed gains 127a, 127b, 127c, 127d and 127e to be added to the output of said multiplexer 123. The output from each adder is transmitted as a new desired receiving signal through lines 129a, 129b, 129c, 129d and 129e. FIG. 34 is a block diagram of desired receiving signal memory circuits 101e1 and 101e2, which are obtained by modifying those shown in FIG. 31. In the figure, the desired receiving signal voltage is stored in the memory 130 in correspondence with bit patterns which will be used as input addresses. In this embodiment, sample values of receiving signal voltage are stored in 16 ways of combination at 5 time points 1T, 0.5T, 0, −0.5T, −1T. All the address inputs of the analog memory 130 are coupled to the vector metric calculator 103a1. When said output is given to the vector metric calculator, the multiplexer 136 is switched and bit patterns of 4 memory contents in the shift register of the pattern detection circuit 14i are used as the address, while when it is given to the desired receiving signal adaptation circuit 120c, and bit patterns of 4 memory contents in the shift register of the final decision pattern memory 135 are used as the address. Switching operation of said multiplexer 136 is performed by the clock signal CL. On one hand, the output of the desired signal adaptation circuit 120c is sent to the switching means 131 which is operated only when the output of the concerned desired signal memory 101e1 or 101e2 is corrected by means of the 3rd output in the shift register of the final decision pattern memory circuit 135. With the operation of the switching means 131, new desired receiving signals are written in correspondence with the read-out address of the memory.

Vector metric calculator 103a1 and 103a2 have the same construction as those in FIG. 25.

Figure 35:
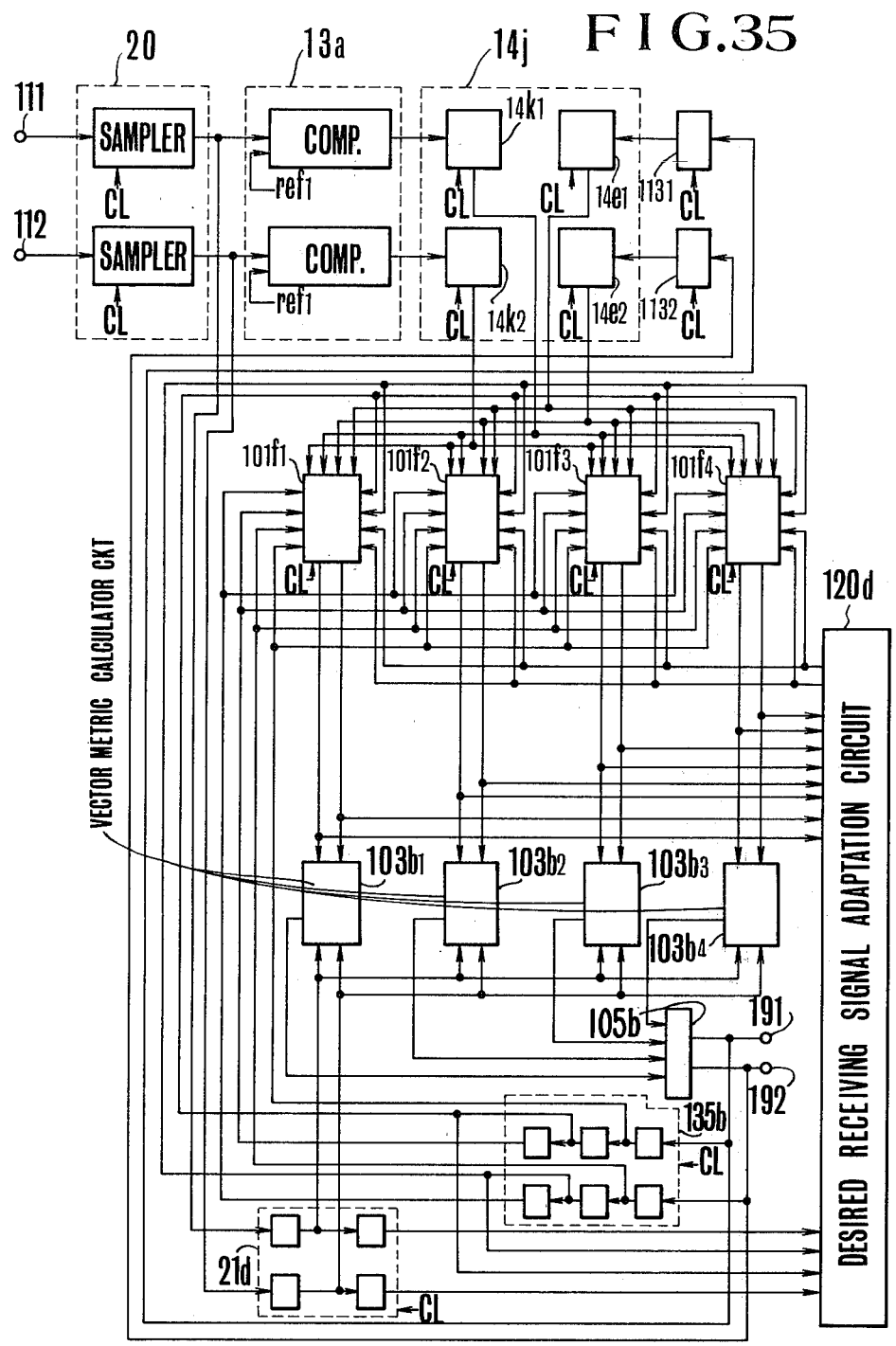
FIG. 35 is a block diagram to show the embodiment which is modified from that of FIG. 32 and applied to 4-value quadrature amplitude modulation system.

FIG. 35 is a block diagram of the embodiment which is achieved by modifying that of FIG. 32, and in which reference values of desired signal memory circuits 101f1, 101f2, 101f3, and 101f4 are corrected by the output of the final decision pattern memory circuit 135b. Input terminals 111 and 112 receive demodulated base band analog wave forms both in phase and in quadrature phase as receiving signals. These two series receiving signals are represented by complex numbers. With respect of vector metric, squared absolute value of the complex number is calculated only at the time point to be decided. In other words, in this embodiment, the sum of the quantities of squared data in phase and in quadrature phase are calculated and at said time point there is assumed the existence of influence from front and rear time slots. Two base band signals in phase and in quadrature phase are sent to the sampler 20 to be sampled and received the tentative decision at tentative decision circuit means 13a. At the same time, they are delayed by two time slots by means of the delay circuit means 21d with tops. The data decided tentatively are sent to pattern detector circuit means 14j. In this embodiment, as to the data which are received after or at the same time the delay circuit 21d has sent its first tap output signal to be decided finally, the output of the tentative decision circuit 13a is stored in the shift register type memory 14k1 and 14k2. As to data, however, which are received before the first tap output signal of said delay circuit 21d, the final decision has been made already, so that the output from the final decision circuit 105b is stored in the shift register type memory 1131 and 132, and then it is written in the registers 14e1 and 14e2 respectively in the next time slot. In this way, the tentative decision data in phase and in quadrature phase, which are received at the next time slot of said delay circuit output, are stored in registers 14k1 and 14k2 while the final decision data in phase and in quadrature phase, which are received before one time slot of said delay circuit output, are stored in registers 14e1 and 14e2. Desired signal memory circuits and vector metric calculators have to be prepared in consideration of the number of patterns to be decided. Now, let ($a_I$, $a_Q$) be data which are transmitted within one time slot (where $a_I$ and $a_Q$ denote data in phase and in quadrature phase respectively and take the value "1" or "−1". In this case, there exist 4 combinations which are (1, 1), (1, −1), (−1, 1) and (−1, −1). For these combinations there are provided 4 desired signal memory 101f1 through 101f4, and 4 vector metric calculations 103b1 through 103b4. Said memory circuits send out the output in phase and in quadrature phase by using the patterns stored in the pattern detection circuit as address. The output from the memory circuit is received by said vector metric calculator along with the output from said delay circuit 21d. The vector metric calculator 103b1 is constructed in the same manner as that shown in FIG. 34. The input from the memory circuit 101b1 as well as from the delay line 21d is samely constituted with two signals, so that subtracting means and squaring means have to be prepared two each. Other desired signal memory 101f2 through 101f4 and vector metric calculators 103b2 through 103b4 are constructed in the same way as said memory 101f1 and calculators 103b1. The vector distance values calculated by said calculators 103b1 through 103b4 are transmitted to the final decision circuit 105b, where the minimum value is selected among the calculated values and is put out from terminals 191 and 192 as the final decision values in phase and in quadrature phase. The output from the final decision circuit 105b, is supplied to the final decision pattern memory 135b which is constituted by two series of shift registers giving 3-bit delay. The desired receiving signal adaptation circuit 120d has the same construction as that of FIG. 30 and gives all the desired receiving signal memory circuit new desired receiving signals in phase and in quadrature phase in correspondence with the first and third output of said final decision pattern memory 135b. Among the memory stored in the desired receiving signal memory circuit, the contents of the memory, which has been selected in correspondence with the second output of the final decision pattern memory circuit 135b, are corrected based on the first and third output of said memory circuit 135b.

In this embodiment, the data that have been decided are used as pattern data to the pattern detector circuit. This might make the construction of the circuit to complicated a little but it lowers the probability of using the receiving signal corresponding to erroneous symbol data.

Figure 36:
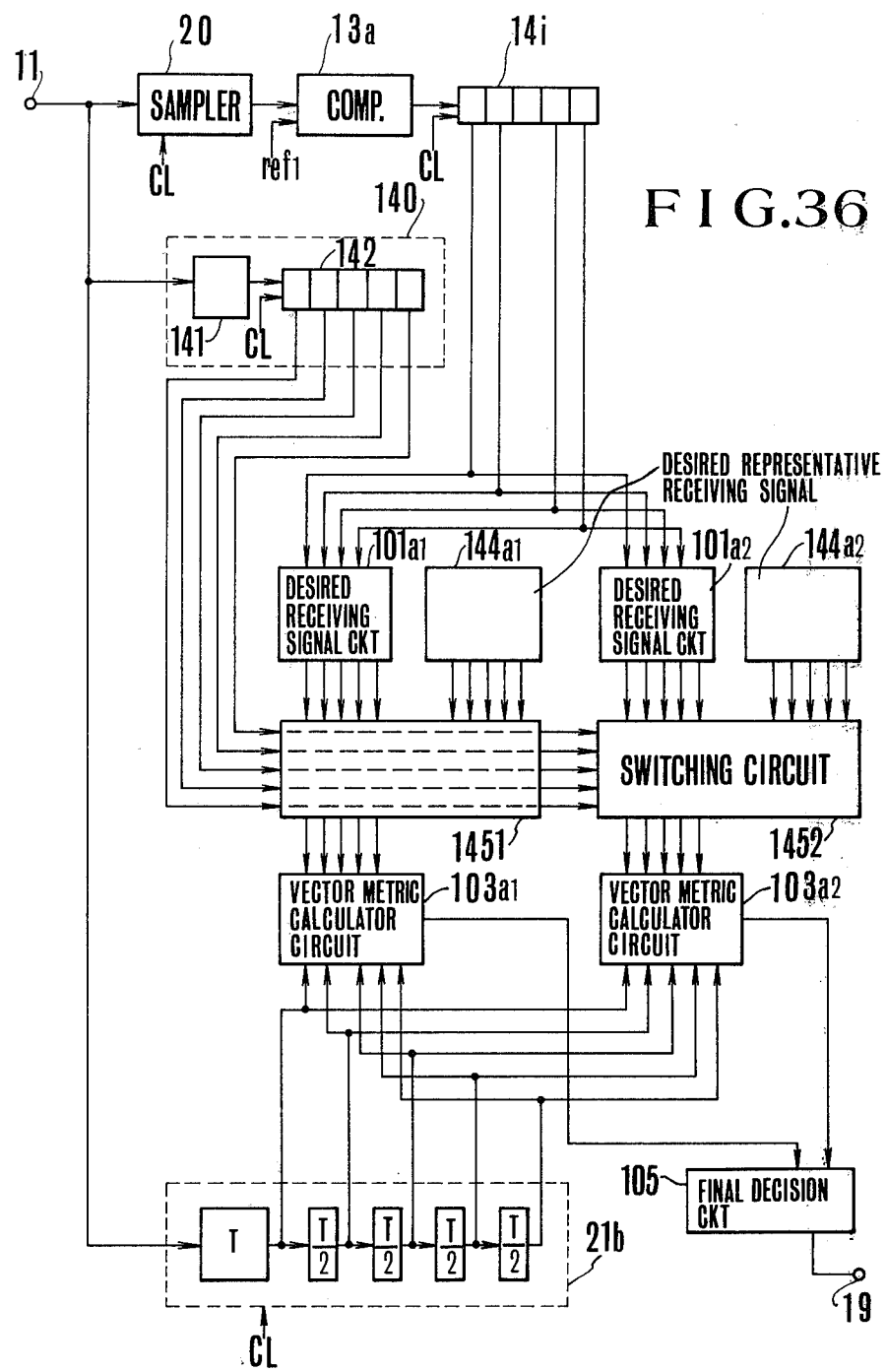
FIG. 36 is a block diagram to show the embodiment modified from that in FIG. 23.
Figure 37:
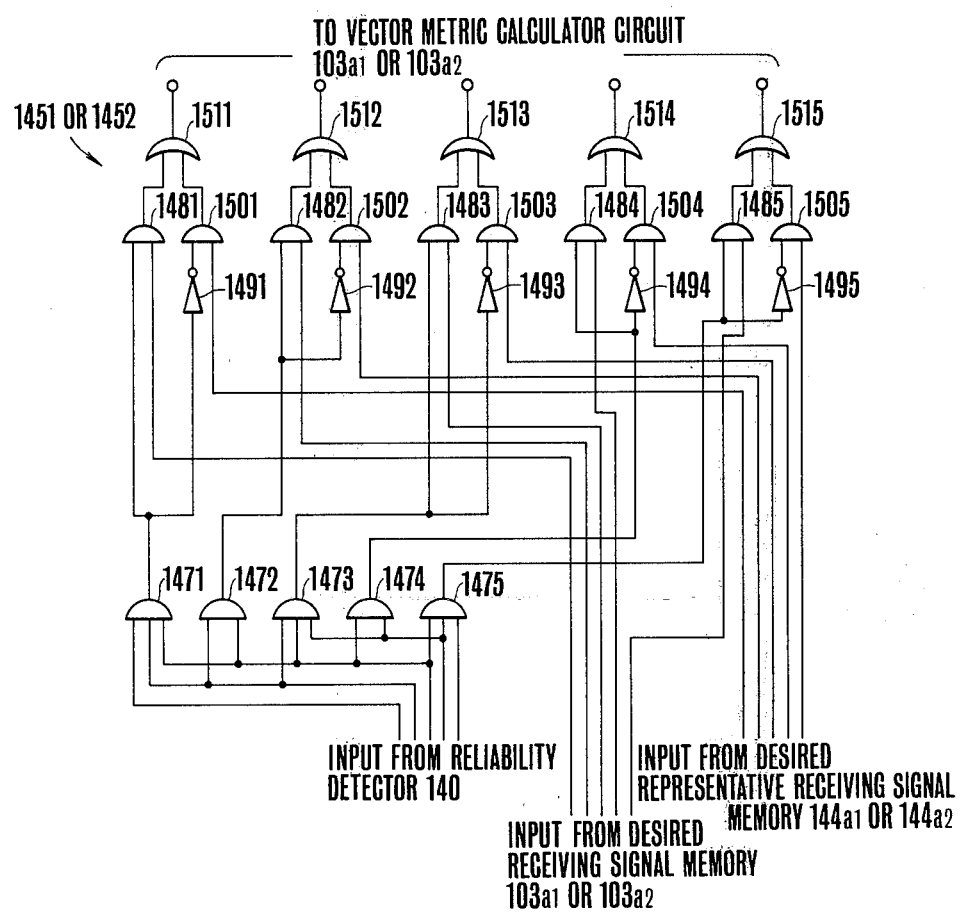
FIG. 37 is a block diagram of the switching circuit as shown in FIG. 36.

FIG. 36 is a block diagram of another embodiment of the present invention, wherein the null region is provided near the decision threshold value and the reliability of the tentative decision is judged by checking whether or not the receiving signal is in said null region. When it is found the tentative decision less reliable, the vector metric is calculated by using the mean value of the desired receiving signal. This method results in better signal detection than the tentative decision method. In FIG. 36, the input signal from the terminal 11 is divided into 3 ways. The first one is received by the delay circuit 21b with taps which causes the delay equivalent to 3 time slots. The second one is sampled at the sampler 20 and then receives a tentative decision "0" or "1" by the comparator 13a. The decision threshold of said comparator 13a is set as the center voltage between the voltage when "1" is received with no distortion and the voltage when "0" is received with no distortion. The third one is supplied to the reliability detector means 140, which puts out "0" by using the slicer 141 when each sample value is in the null region while "1" is put out when not in the null region. FIG. 14 shows the null region R having a certain width around the threshold value TL. The output of said slicer 141 are connected to the shift register 142. The tentatively decided signal is supplied to the shift register type memory circuit 14i which acts as a pattern detector means. In this case, said register is assumed to have 5 stages. Desired receiving signal memory means comprises desired receiving signal memory circuits 101a1 and 101a2, the former of which is for the case that the symbol to be decided is "0" while the latter is for the case that it is "1". From each desired receiving signal memory circuit, 5 signal trains are taken out corresponding to the first, second, fourth, and fifth bit patterns. All the output from said memory circuit 101a1 is given to a switching means 1451 along with the output of desired representative signal value memory circuit 144a1. Said switching means 1451 selects the output of either said memory circuit 101a1 or said representative signal value memory circuit 144a1 to supply its output to said vector metric calculator 103a1. In the same manner, either all the output from said memory circuit 101a2 or the output from said representative signal value 144a2 is selected by another switching means 1452 to be supplied to another vector calculator 103a2. These calculators 103a1 103a2 also receive all the tap output from said delay circuit 21b. Said calculators 103a1 and 103a2 calculate the quantity (each tap output minus corresponding desired receiving signal)$^2$, and the signal corresponding to such a vector distance as calculated above is supplied to the final decision circuit 105 constructed by using a comparator which puts out "0" or "1" according to whether the distance obtained by the calculator 103a1 is smaller or the obtained by 103a2 is smaller. Said memory circuits 101a1 and 101a2 have the construction as shown in FIG. 24 said calculator 103a1 and 103a2 have the structure like FIG. 25. Further, said switching means 1451 and 1452 are realized by the arrangement as shown FIG. 37. In other words, since each desired receiving signal is receiving the influence due to 3 to 2 symbols, there can be constructed a logic circuit which receives its input from the desired receiving signal memory circuit when all the output from shift registers are "1" for said 3 or 2 symbols; otherwise, it receives from the desired representative signal value memory circuit.

Each output from the register 142 of the reliability detector means 140 is selectively supplied to the input side of AND gates 1471 through 1475. The output from these AND gates is directly supplied to AND gates 1481 through 1485 and AND gates 1501 to 1505 as well through inverters 1491 through 1495. Other input terminals of AND gate 1481 through 1485 receive the output from the desired signal memory 103a1 or 103a2. Further, other input terminals of AND gates 1501 through 1505 receive the output of said representative signal value memory circuit 144a1 or 144a2. Accordingly, either AND gates 1481 through 1485 or AND gates 1501 through 1505 are driven in accordance with the state of AND gates 1471 through 1475, thereby either one of the output from said desired signal memory circuit or that of said representative signal memory circuit being supplied to OR gates 1511 through 1515, of which the output is supplied to vector metric calculator 103a1 or 103a2. With this construction, there is considerably lowered the probability of using incorrect tentative decision patterns erroneously.

Figure 38:
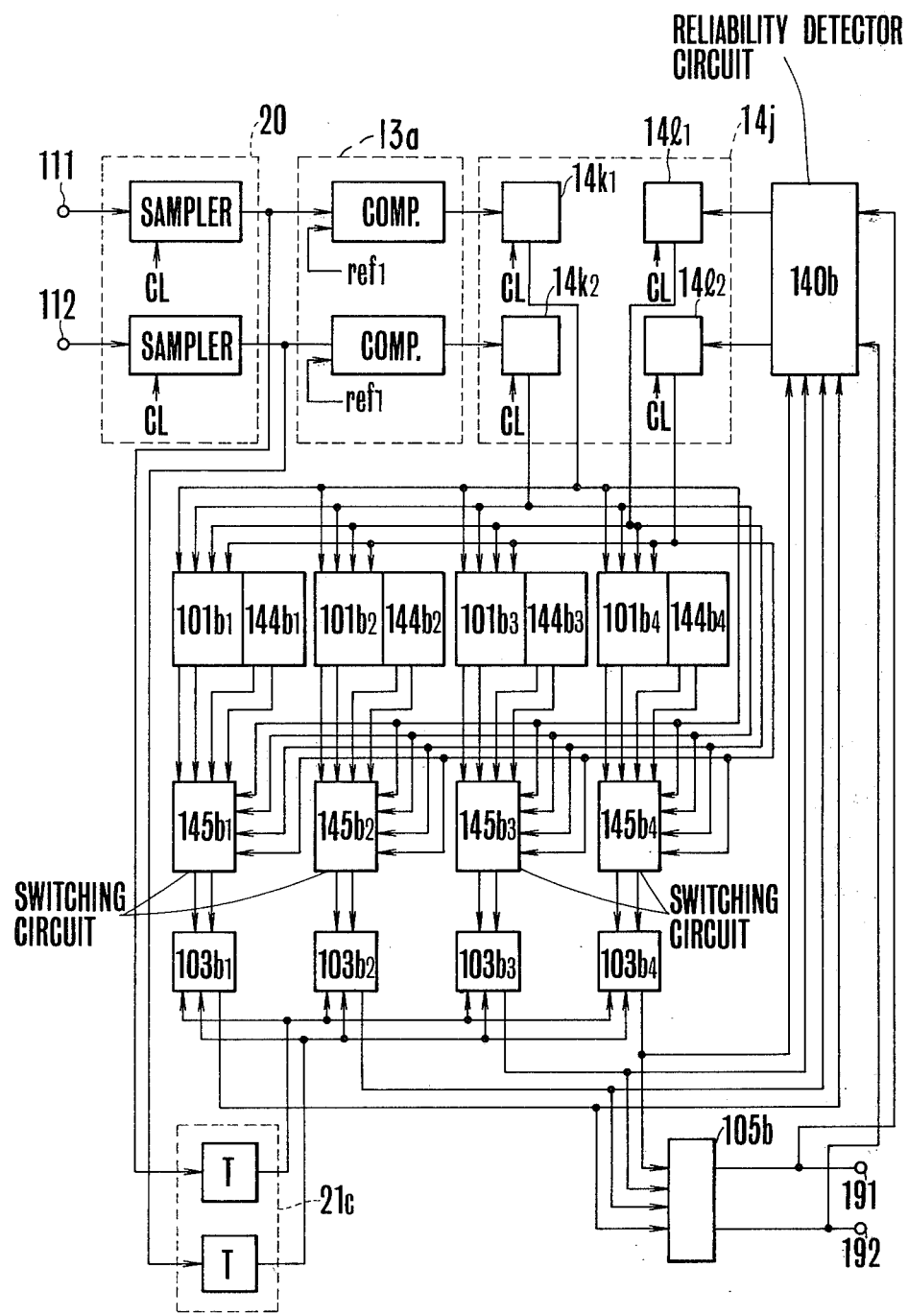
FIG. 38 is a block diagram of the embodiment which is modified from that in FIG. 36 and applied to 4-value quadrature amplitude modulation system.

FIG. 38 is a block diagram of another embodiment of this invention, which is constructed like that of FIG. 36 and is applicable to 4 value quadrature amplitude modulation system.

Figure 39:
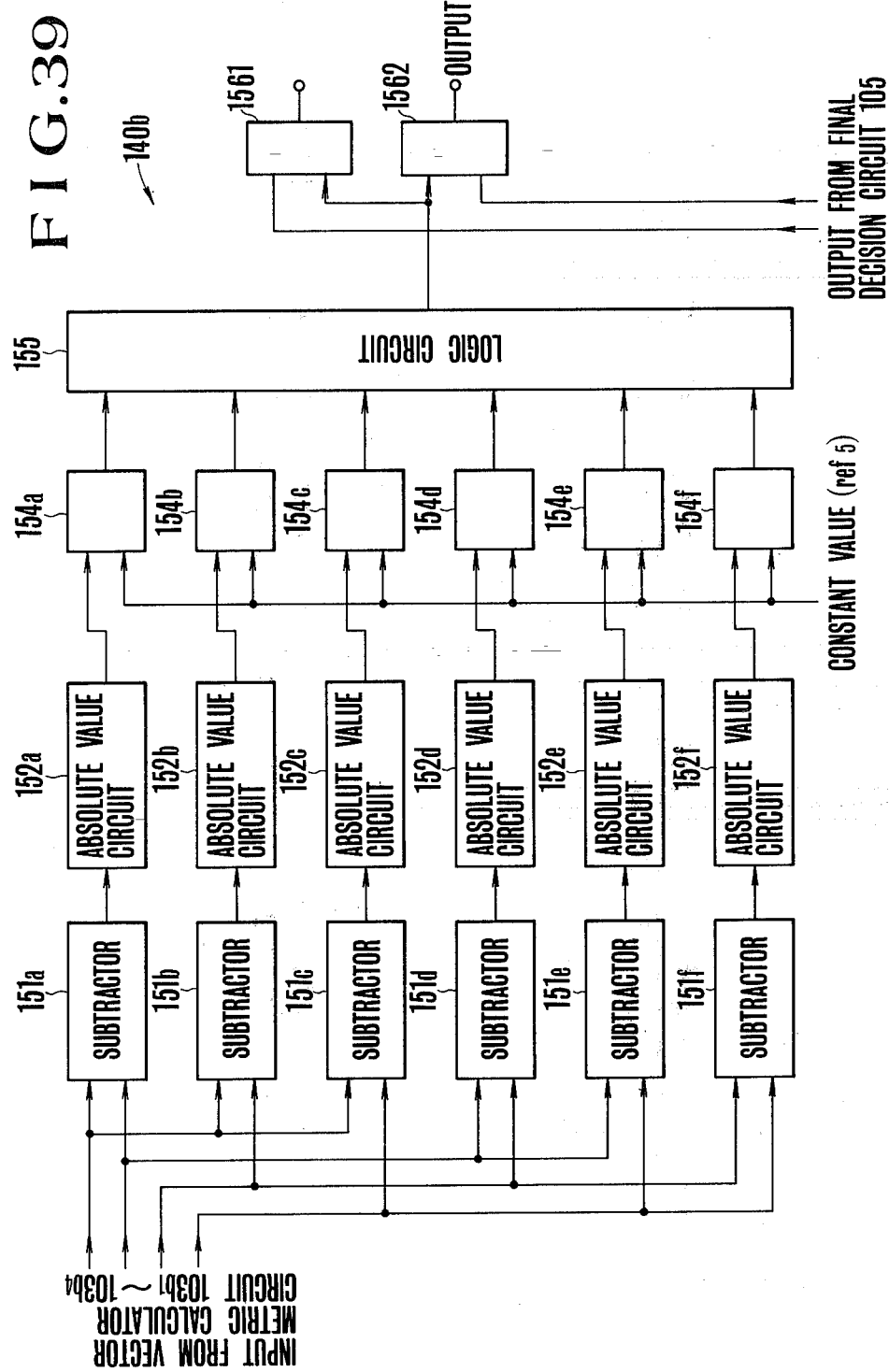
FIG. 39 is a block diagram of the reliability detector circuit in FIG. 38.

Input terminals 111 and 112 receive demodulated base band analog wave forms both in phase and in quadrature phase as receiving signals. Two base band signals in phase and in quadrature phase are supplied to the sampler 20 to be sampled and received the tentative decision at tentative decision circuit means 13a. At the same time, they are delayed by one time slot by means of the delay circuit means 21c. In the tentative decision circuit 13a, the decision is made on both phase with 3 values according to the rule of decision as mentioned in connection with FIG. 16, thereby the decision function of the tentative decision means and reliability detector means being realized in single circuit. The data decided tentatively are sent to pattern detector circuit means 14j. In this embodiment, as to data which are received after the delay circuit 21c has sent its output signal to be finally decided, the output of the tentative decision circuit 13a is stored in the shift register type memory 14k1 and 14k2. As to data, however, which are received before the output signal of said delay circuit 21c, the final decision has been made already, so that the output from the final decision circuit 105b and reliability detecting signal from the reliability detector circuit 140b are used to write 3 values corresponding to 3 output values of said tentative decision circuit into 14l1 and 14l2. Actually, these 3 values correspond to 1, 2, and 3 of FIG. 16, and (1, 1), (0, 0) and (0, 1) are written in 2 bit registers. In this way, the tentative decision data in phase and in quadrature phase, which are received in the next time slot of said delay circuit output, are stored in registers 14k1 and 14k2 while the final decision data in phase and in quadrature phase which are received before one time slot of said delay circuit output, are stored in registers 14l1 and 14l2. That is, the pattern detector circuit 14j includes a part each of the pattern detecting means and reliability detecting means. Desired signal memory circuits and vector metric calculators have to be prepared in consideration of the number of patterns to be decided. Now, let (a$_I$, a$_Q$) be data which are transmitted within one time slot (where a$_I$ and a$_Q$ denote data in phase and in quadrature phase respectively and take the value "1" or "−1"). In this case, there exist 4 combinations that are (1, 1), (1, −1), (−1, 1) and (−1, −1). For these combinations there are provided 4 desired signal memory 101b1 through 101b4; desired representative signal memory circuit 144b1 through 144b4; switching circuits 145b1 through 145b4; and vector metric calculator 103b1 through 103b4. For example, the desired receiving signal memory circuit 101b1 may be constructed in the same way as in FIG. 24, and put out desired receiving signals in phase and in quadrature phase. The output of said receiving signal memory circuit is received by said switching circuit 145b1 along with the output of said representative signal memory circuit 144b1. Said switching circuit 145b1 selectively puts out the output from either said receiving signal memory circuit or representative signal value memory circuit based on lower bit patterns stored in the pattern detector circuit 14j. The output of said switching circuit is supplied to said calculator 103b1 along with the output of said delay circuit 21c. Said calculator 103b1 has the same construction as shown in FIG. 25. The input from the memory circuit 101b1 as well as the delay line 21c samely includes with two signals, so that subtracting means and squaring means have to be prepared two each. Other desired signal memory 101b2 through 101b4 and vector metric calculators 103b2 through 103b4 are constructed in the same way as said memory 101b1 and calculators 103b1. The vector metric values calculated by said calculators 103b1 through 103b4 are transmitted to the final decision circuit 105b, where the minimum value is selected among the calculated values and is put out from terminals 191 and 192 as the final decision values in phase and in quadrature phase. The reliability detector circuit 140b is constructed as shown in FIG. 39. In this circuit 140b, 4 input signals supplied to said final decision circuit 105b are used as the input thereto and all the possible subtraction is performed by means of subtracting means 151a, 151b, 151c, 151d, 151e and 151f. Absolute value circuits 152a, 152b, 152c, 152d, 152e and 152f make absolute values on each result of said subtraction. These values are compared with a constant value ref. 5 by respective comparator 154a, 154b, 154c, 154d, 154e and 154f. In this comparison, when value less than said constant value is found, "0" is put out from the logic circuit 155 while "1" is put out when such is not found. 3-valued output in phase and in quadrature phase is produced by 2 to 3 value converters 1561 and 1562 based on the output from the logic circuit 155 and the final decision output in phase and in quadrature phase, and is supplied to registers 14l1 and 14l2.

With this construction, the circuit construction may become complicated a little but there will be lowered the probability of involving erroneous bits in the pattern detector circuit as well as the probability of using the desired receiving signal corresponding to wrong symbol data.

Figure 40:
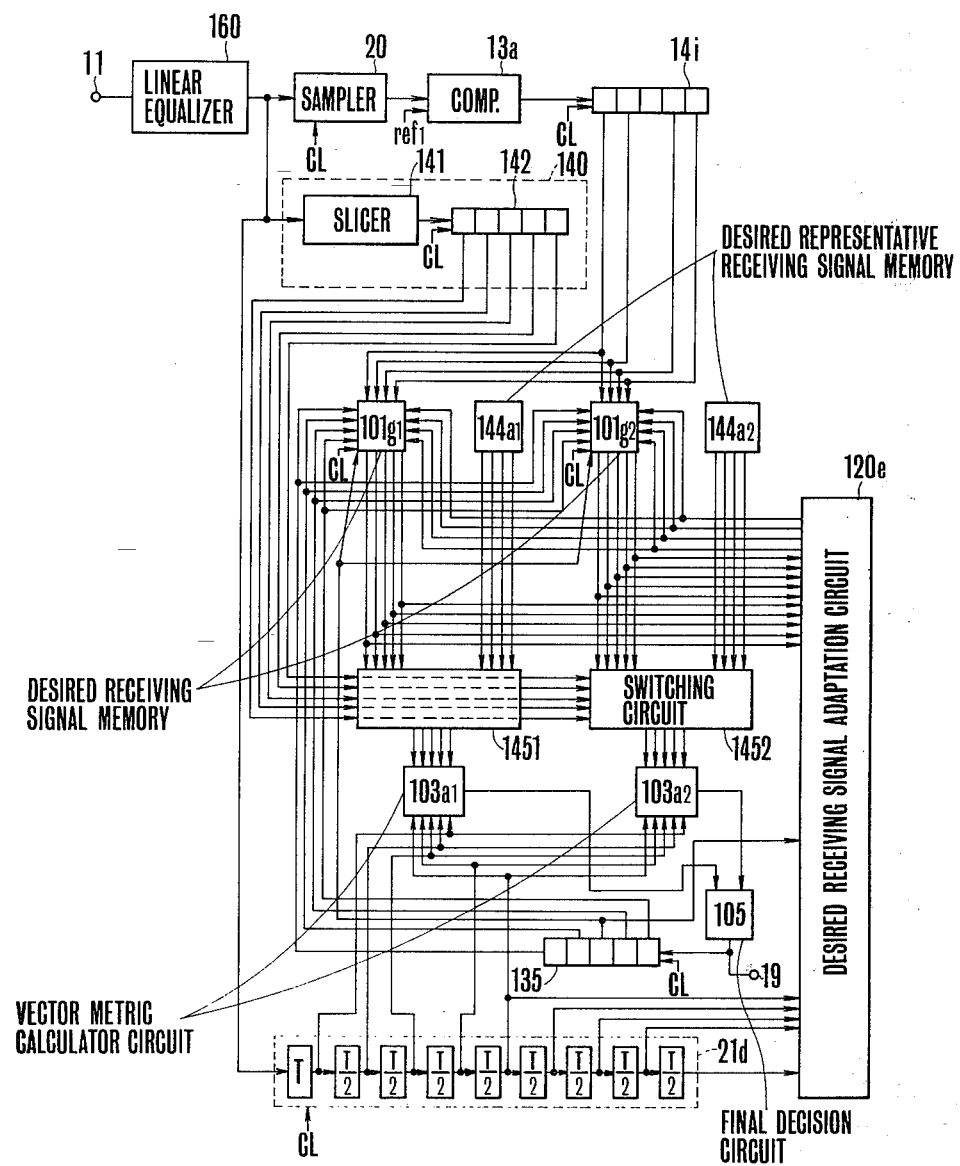
FIG. 40 is a block diagram of the embodiment which is achieved by combining those of FIGS. 33 and 36.

FIG. 40 is a block diagram of still another embodiment of this invention. In the embodiment shown in FIG. 29, even if the correction is made adaptively to the transmission line, there should be still problem on the reliability of the tentative decision. If the tentative decision is made incorrectly, the desired receiving signal read out should be far from the true receiving signal to be read out. Decision data at the concerned time should come to include serious error rate. Accordingly, the tentative decision should be made correctly. In the present embodiment, a filter means is inserted before the tentative decision circuit. Said filter can vary its characteristic adaptively so that the error in deciding sample values tentatively is lowered by controlling said filter characteristic adaptively. Actual filter may be formed by a transversal filter. The output sample value yi of the filter is expressed as follows.

$$yi = \sum_{k=1}^{n} C_R X_{i-R}$$

where $X_i$ represents an input sample value and $C_k$ a tap gain. The filter characteristic is varied by changing the tap gain $C_R$. Correction of the tap gain is performed by sequential correction according to the equation mentioned below.

$$C_R^{(New)} = C_R^{(Old)} - \alpha X_{i-k}(yi - di)$$

where, $\alpha$ represents a correction factor, and $C_R^{(New)}$ and $C_R^{(Old)}$ are tap gain values after and before correction.

Further, the null region may be used in order to prevent the enlargement of error due to the wrong tentative decision. It is apparent that using the value of representing desired receiving signal independent of patterns in front and rear sides are more desirable than using desired receiving signals that have been read out based on a wrong tentative decision. For instance, the error rate in discriminating signals will be effectively lowered by using the vector metric distance which is calculated by using the mean value of the signals. More particularly, since the wrong decision is apt to happen in the area adjacent to the decision threshold, there is provided a null region near said threshold. The reliability of the tentative decision is judged by whether or not the receiving signal is in said null region. When the signal is in such null region, that is, judged unreliable, a vector metric distance is calculated by using the mean value of desired receiving signals and is used for better discrimination of the receiving signals. In this embodiment, there is no specific requirement on the characteristic of receiving signals, thus the embodiment being applicable to the linear and non-linear transmission system. In the following, there will be considered the case in which desired receiving signals are assumed to give the signal to be decided the influence from front and rear time slots, that is, the influence from all the possible digital series pattern for two time slots, and the sample value of the desired receiving signal is assumed to be stored at a half signal interval.

The input signal from the terminal 11 is sent to the receiving filter and its output is divided into 3 ways. The first one is received by the delay circuit 21d with taps which causes the delay equivalent to 3 time slots. The second one is sampled at the sampler 20 and then receives a tentative decision "0" or "1" by the comparator 13a. The decision threshold of said comparator 13a is set by using the center voltage between the voltage when "1" is received with no distortion and the voltage at the time when "0" is received with no distortion. The third one is supplied to the reliability detector means 140, which puts out "0" by using the slicer 141 when each sample value is in the null region while "1" is put out when not in the null region. FIG. 14 shows the null region R having a certain width around the threshold value TL. The output of said slicer 141 are connected to the shift register 142. The tentatively decided signal is supplied to the shift register type memory circuit 14i which acts as a pattern detector means. In this case, said register is assumed to have 5 stages. Desired receiving signal memory means comprises desired receiving signal memory circuits 101g1 and 101g2. The circuit 101g1 is for the case that the symbol to be decided is "0" while the circuit 101g2 is for the case of "1". From each desired receiving signal memory circuit, 5 signal trains are taken out corresponding to the first, second, fourth, and fifth bit patterns. All the output from said memory circuit 101g1 is given to a switching means 1451 along with the output of desired representative signal value memory circuit 144a1. Said switching means 1451 selects the output of either said memory circuit 101g1 or said representative signal value memory circuit 144a1 to supply its output to said vector metric calculator 103a1. In the same manner, either all the output from said memory circuit 101g2 or the output from said representative signal value 144a2 is selected by another switching means 1452 to be supplied to another vector calculator 103a2. These calculators 103a1 and 103a2 also receive all the tap output from said delay circuit 21b. Said calculators 103a1 and 103a2 calculate the quantity (each tap output minus corresponding desired receiving signal)$^2$, and the signal corresponding to such a vector distance as calculated above is supplied to the final decision circuit 105 constructed by using a comparator which puts out "0" or "1" through the terminal 19 according to whether the distance obtained by the calculator 103a1 is smaller or the distance obtained by 103a2 is smaller. Further, the output of said final decision circuit 105 is supplied to the final decision pattern memory circuit 135.

On one hand, the desired receiving signal adaptation circuit 120e is constructed in the same way as shown in FIG. 30. In the figure, lines 121a, 121b, 121c, 121d, and 121e are for receiving signals from said desired signal memory circuit 101g1 while lines 122a, 122b, 122c, 122d, and 122e are for receiving signals from said desired signal memory circuit 101g2. In respective memory circuits 101g1 and 101g2, read-out is performed by using patterns formed of the contents in the first, second, fourth, and fifth regesters of said final decision pattern memory 135. All signals from said respective lines are put into multiplexer 123, by which the output from said memory circuit 101g1 or 101g2 is selected according to whether or not the third output of the final decision memory circuit 135 is "0" or "1". These selected signals are subtracted by subtractors 125a through 125e from respective signals supplied from respective taps of said delay circuit 21d through lines 126a through 126e. The output from said delay circuit 21d is delayed by 3, 3.5, 4, 4.5, and 5 time slots respectively. The result of the subtraction above is transmitted to adders 128a, 128b, 128c, 128d and 128e through fixed gains 127a, 127b, 127c, 127d, and 127e to be added to signals from said multiplexer 123. Resultant signals by these adders are sent out through lines 129a, 129b, 129c, 129d and 129e as new desired receiving signals. Said memory circuits 101g1 and 101g2 have the construction represented by a block diagram shown in FIG. 34. In this figure, memory means 130 stores the desired signal voltage corresponding to bit patterns for input address. In this embodiment, it stores 16 combinations each of the sample values of the desired signal voltage at each of 5 time points, 1T, 0.5T, 0, −0.5T and −1T, and 5 memory contents corresponding to 4 bit patterns of the shift register of the pattern detector 14i except the center thereof are read out when supplying to the vector metric calculator through the multiplexer 131 while 5 memory contents corresponding to 4 bit patterns of the shift register of the final decision pattern memory circuit 135 except the center thereof are read out when supplying to the desired signal adaptation circuit 120e. On one hand, the output of the desired signal memory adaptation circuit 120e is put into switching means 131, which performs connecting operation only when the output of the concerned signal memory circuit is corrected based on the third output of the final decision pattern memory circuit 135. With this connecting operation, new desired signals are written in correspondence with read-out addresses of the memory 130. Further, said calculator 103a1 and 103a2 have the same structure as shown in FIG. 25. In this figure reference numerals 110a through 110e designate subtracting means which make the balance between the input from said delay line 21b and the corresponding input from said memory circuit. The output of subtracting means is sent to squaring means 111a through 111e to be squared. The squared output are gathered at the accumulater 112i to finalize the calculation of the vector metric distance. In this case, said subtracting means included in the vector metric calculator as well as the desired receiving signal adaptation circuit have same construction, so that they may be arranged to be used commonly.

Further, the linear automatic equalizer 160 has the same construction as that of FIG. 22, which comprises a filter means 85 consisting of the variable receiving filter and a receiving signal filter adaptation circuit.

Figure 41:
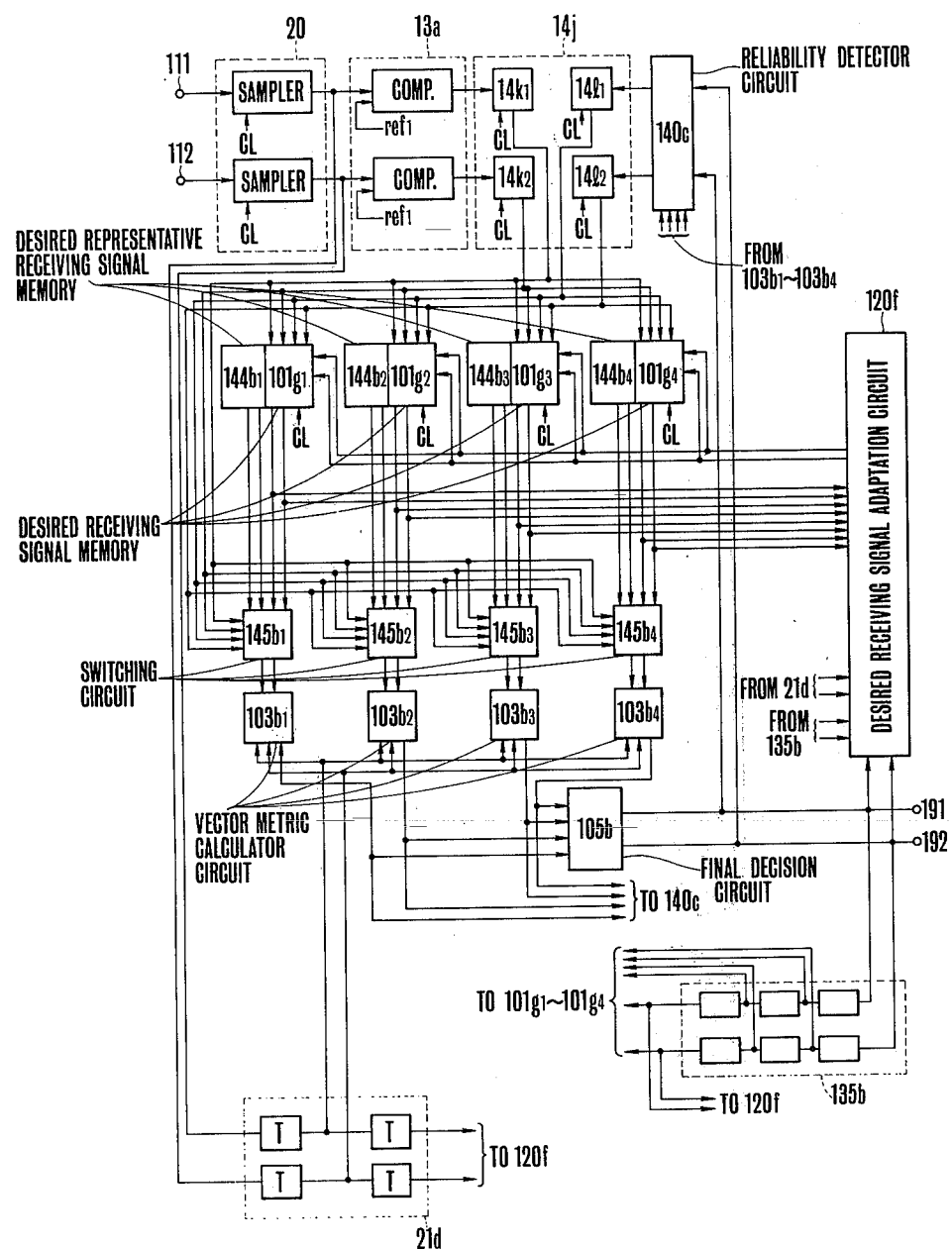
FIG. 41 is a block diagram of the embodiment which is modified from that in FIG. 40 and applied to 4-value quadrature amplitude modulation system.

FIG. 41 is a block diagram of the embodiment according to the present invention, which is applied to 4-value quadrature amplitude modulation system.

Input terminals 111 and 112 receive demodulated base band analog wave forms both in phase and in quadrature phase as receiving signals. These two series receiving signals are represented by complex numbers. With respect of vector metric, squared absolute value of the complex number, is calculated only at the time point to be decided. In other words, in this embodiment, the sum of the quantities of squared data in phase and in quandrature phase are calculated and at said time point, there is assumed the existence of influence from front and rear time slots. Two base band signals in phase and in quadrature phase are sent to the sampler 20 to be sampled and receive the tentative decision by the tentative decision circuit means 13a. At the same time, they are delayed by two time slots by means of the delay circuit means 21d with tapes. In the tentative decision circuit 13a, the decision is made on both phases with 3 values according to the rule of decision as mentioned in connection with FIG. 16, thereby the decision function of the tentative decision means and reliability detector means being realized in single circuit. The data decided tentatively are sent to pattern detector circuit means 14j. In this embodiment, as to the data which are received after the delay circuit 21d with taps has sent its first stage output signal to be finally decided, the output of the tentative decision circuit 13b is stored in the shift register type memory 14k1 and 14k2. As to data, however, which have been received before the first stage output signal of said delay circuit 21d, the final decision has been made already, so that the output from the final decision circuit 105b and reliability detecting signal from the reliability detector circuit 140c are used to write 3 values corresponding to 3 output values of said tentative decision circuit into 14l1 and 14l2. Actually, these 3 values correspond to 1, 2, and 3 of FIG. 16, and (1, 1), (0, 0) and (0, 1) are written in 2 bit registers. In this way, the tentative decision data in phase and in quadrature phase, which are received in the next time slot of said delay circuit output, are stored in registers 14k1 and 14k2 while the final decision data in phase and in quadrature phase, which are received before one time slot of said delay circuit output, are stored in registers 14l1 and 14l2. That is, the pattern detector circuit 14j includes a part each of the pattern detecting mean and reliability detecting means. Desired signal memory circuits and vector metric calculators have to be prepared in consideration of the number of patterns to be decided. Now, let $(a_I, a_Q)$ be the data which are transmitted within one time slot (when $a_I$ and $a_Q$ denote data in phase and in quadrature phase respectively and take the value "1" or "1"). In this case, there exist 4 combinations that are (1, 1), (1, −1), (−1, 1), and (−1, −1). For these combinations there are provided 4 desired signal memory 101g1 through 101g4; desired representative signal memory circuit 144b1 through 144b4; switching circuits 145b1 through 145b4; and vector metric calculator 103b1 through 103b4. For example, the desired receiving signal memory circuit 101g1 may be constructed in the same way as in FIG. 34, and puts out desired receiving signals in phase and in quadrature phase. The output of said receiving signal memory circuit is received by said switching circuit 145b1 along with the output of said representative signal memory circuit 144b1. Said switching circuit 145b1 selectively puts out the output from either said receiving signal memory circuit or representative signal value memory circuit based on lower bit patterns stored in the pattern detector circuit 14j. The output of said switching circuit is supplied to said calculator 103b1 along with the first output of said delay circuit 21d. Said calculator 103b1 has the same construction as shown in FIG. 25. The input from the memory circuit 145b1 as well as the delay circuits 21d is samely constituted with two signals, so that subtracting means and squaring means have to be prepared two each. Other desired signal memory 101g2 through 101g4 and vector metric calculators 103b2 through 103b4 are constructed in the same way as said memory 101g1 and calculators 103b1. The vector metric values calculated by said calculators 103b1 through 103b4 are transmitted to the final decision circuit 105b, where the minimum value is selected among the calculated values and is put out of terminals 191 and 192 as the final decision values in phase and in quadrature phase.

The final decision circuit 105b is used to find out the minimum value of four signals and constructed as shown in FIG. 28. In the figure, all the combination of 4 signals are put into 6 comparators 1171 through 1176 to be compared with one another. The output from these comparators is sent to the logic circuit 118 to receive logic calculation. After the calculation, "1" or "0" is put out from terminals 191 or 192 in correspondence of data "1" or "−1" in phase and in quadrature phase. The output from the final decision circuit 105b is supplied to the final decision pattern memory 135b which is constituted by two series of shift registers giving 3-bit delay. The desired receiving signal adaptation circuit 120f has the same construction as that of FIG. 30, and gives all the desired receiving signal memory circuit 101g4 through 101g2 new desired receiving signals in phase and in quadrature phase in correspondence with the first and third output of said final decision pattern memory 135b. Among the data stored in the desired receiving signal memory circuit, the contents of the data which have been selected in correspondence with the second output of the final decision pattern memory circuit 135b, are corrected based on the first and third output of said memory circuit 135b. The reliability detector circuit 140c is constructed as shown in FIG. 39. In this circuit 140c, 4 input signals supplied to said final decision circuit 105b are used as the input thereto and all the possible subtraction is performed by means of subtracting means 151a thrugh 151f. Absolute value circuits 152a through 152f make absolute values on each result of said subtraction. These values are compared with a constant value by respective comparator 154a through 154f. In this comparison, when value less than said constant value is found, "0" is put out from the logic circuit 155 while "1" is put out when such is not found. 3 value output in phase and in quadrature phase is produced by ⅔ value converters 1561 and 1562 based on the output from the logic circuit 155 and the final decision output in phase and in quadrature phase, and is supplied to registers 14/1 and 14/2.

The present invention has been adequately discussed in the above paragraphs by taking varionse examples. However, it is apparent that the present invention should not be limited by such example and that other modifications are available. In FIG. 7, for instance, it may be possible to construct the circuit such that the value obtained by multiplying the balance between the output of the subtractor 26 and the comparator 27 by a constant k is added to the output of the switch 38 in order to renew the contents of the second memory 6b. Further, in case of the digital circuit as shown in FIG. 8, the multipliers 451 and 452 may be replaced by the circuit which puts out a positive or negative constant (+1 or −1 for example) in response to only the signal (plus or minus) of the input signal, thereby symplifying the circuit. Still further, it may be possible to insert an A/D converter immediately after the input terminal. In this case, the circuit after said converter is constructed as a digital circuit, and any D/A converter such as shown in FIG. 5 will not be required. Still further, in FIG. 25, it may be possible to supersede squaring means 111a through 111e by absolute value circuits.

What is claimed is:

1. A signal detector for use in digital signal communication, comprising:
   a tentative decision means for assigning certain symbols to receiving signals based on a predetermined value;
   a first memory means for storing the output of said tentative decision means in sequence;
   a second memory means for storing a plurality of reference values prepared in association with all the signal patterns to be received, said signal patterns corresponding to the symbol sequence assigned by said first memory means, at least some of said reference values comprising a distortion correction quantity;
   a selection means for selecting at least one said reference values based on at least a part of the contents of said first memory; and
   a processing means wherein there is produced by using said selected reference value the process to relate said receiving signals with signals to be received that are the most likely receiving signals among all the signals to be received, thereby producing an output, said processing means including means using said distortion quantity for correcting the distortion of said receiving signals and means for assigning output signals based on a predetermined value.

2. A detector according to claim 1, wherein said processing means is provided with a modification means for modifying said predetermined value by said distortion quantity, and a correction means for correcting the distortion of said receiving signal based on said modified predetermined valve.

3. A detector according to claim 1 wherein said first memory has a memory unit for storing the output of said tentative decision means and an additional memory unit for storing the output of said processing means.

4. A detector according to claim 1, wherein said selection means receives signals both before and after receipt of said receiving signals as signals for use in selecting the output of said second memory means.

5. A detector according to claim 1, wherein said tentative decision means comprises comparators which compare receiving signals with at least one constant value, said comparators including means for sampling said receiving signals at a predetermined frequency.

6. A detector according to claim 1, wherein said signal detector further comprises delay circuit means for delaying receiving signals to be supplied to said processing means by a predetermined period.

7. A detector according to claim 1, wherein said second memory means stores a distortion quantity for pattern portions of relatively large distortion both before and after receipt of said receiving signals while said first memory means transmits only the contents of the corresponding portion to said processing means through said selection means as selection signals.

8. A detector according to claim 1, wherein said reference values are desired receiving signals; said selection means selects a plurality of desired receiving signal sequences based on the memory contents of said first memory; and said processing means has a calculation means for calculating vector metric distance between the receiving signal and the corresponding first memory contents, and a final decision means which put out the minimum of calculation results as its output.

9. A signal detector for use in digital communication using a 4-value quadrature amplitude modulation system, wherein independently demodulated signals in phase and in quadrature phase are detected respectively by signal detecting means, each of said detecting means comprising:
   a tentative decision means for assigning certain symbols to receiving digital signals based on a predetermined value;
   a first memory means for storing the output of said tentative decision means in sequence;
   a second memory means for storing a plurality of reference values prepared in association with all the signals to be received, said signals corresponding to the symbol sequence assigned by said first memory means;
   a selection means for selecting at least one of said reference values based on at least a part of the contents of said first memory;
   a delay circuit for delaying the receiving signal by a predetermined time; and
   a processing means coupled to said delay circuit wherein there is produced by using said selected reference value the process to relate said receiving signals to be received that are the most likely receiving signals among all the signals to be received, thereby producing an output.

10. A detector according to claim 9, wherein said first memory means belonging to each signal detecting means comprises:
   a multistage shift register type memory means for storing the output of said tentative decision means, said output corresponding to receiving signals and those thereafter which are transmitted to said processing means through said delay circuit means; and
   a memory means for storing the output from said processing means as the data before said receiving signals which are supplied to said processing means via said delay circuit means; whereby the output of said memory means for storing the output of said tentative decision means, which corresponds to said receiving signals supplied to said processing means via said delay circuit means, is combined with the output from all of remaining first memory means in both signal detecting channels so as to provide signals for selecting the output of each second memory means in each signal detecting channel.

11. A detector according to claim 9, wherein said second memory means and selection means in each signal detecting channel are constituted by single ROM.

12. A detector according to claim 11, wherein said signal detector further comprises a converter means for converting the output of said ROM into an analog signal, the output of said converter means being supplied to said processing means.

13. A signal detector for use in the digital signal communication, comprising:
a tentative decision means for assigning certain symbols to receiving digital signals based on a predetermined value;
a first memory means for storing the output of said tentative decision means in sequence;
a second memory means for storing a plurality of reference values prepared in association with all the signals to be received, said signals corresponding to the symbol sequence assigned by said first memory means;
a selection means for selecting at least one of said reference values based on at least a part of the contents of said first memory;
a delay circuit for delaying the receiving signal by a predetermined time;
a processing means wherein there is proceeded by using said selected reference value and the output of said delay circuit the process to relate said receiving signal with signals to be received that are most likely signals among all the signals to be received, thereby producing the output; and
a correction means for correcting the contents of said second memory means sequentially by using corrected values related to the output of said delay circuit means.

14. A detector according to claims 1, 9 or 13, wherein said selection means selects a plurality of reference values from said second memory means based on the output of said first memory means, and is provided with a means for obtaining the mean value of the selected output, said mean value being supplied to said processing means.

15. A detector according to claim 14, wherein said correction means includes:
a switch for selecting one reference value from a plurality of reference values, said one reference value corresponding to the output of said processing means;
an attenuater to attenuate the output of said delay circuit at a predetermined rate;
an adder to add the output of said switch to that of said attenuater;
another attenuater to normalize the output of said adder; and
a means for correcting the contents of said second memory selectively according to a predetermined address signal.

16. A detector according to claim 15, wherein said address signal is obtained by combining the output of said processing means and the output of said first memory means not corresponding to said output of said processing means.

17. A signal detector for use in the digital communication using 4-value quadrature amplitude modulation system, wherein demodulated signals in phase and in quadrature phase are delected respectively by independent signal detecting channels, each of said detecting channel comprising:
a tentative decision means for assigning certain symbols to receiving digital signals based on a predetermined value;
a first memory means for storing the output of said tentative decision means in sequence;
a second memory means for storing a plurality of reference values prepared in association with all the signals to be received, said signals corresponding to the symbol sequence assigned by said first memory means;
a selection means for selecting at least one of said reference values based on at least a part of the contents of said first memory;
a delay circuit for delaying the receiving signal by a predetermined time;
a processing means wherein there is proceeded by using said selected reference value and the output of said delay circuit the process to relate said receiving signal with signals to be received that are most likely signals among all the signals to be received, thereby producing the output; and
a correction means for correcting the output of said second memory means sequentially by using corrected values related to the output of said delay circuit means.

18. A detector according to claim 17, wherein said second memory means and selecting means are constituted by single RAM; wherein said signal detector is further provided with demultiplexers for switching the output of and input to said RAM at predetermined read and write timing and D/A converters which convert RAM output into analog signals based on the output of said first memory means; and wherein said correction means comprises first subtracting means for obtaining the distortion by taking the balance the output of said delay circuit means and the output of said processing means, A/D converters to convert the output of said subtracting means into digital signals, second subtracting means for subtracting RAM output from the output of said A/D converter, multipliers for multiplying the output of said second subtracting means by a constant, and adders for adding the output of said multiplier to RAM output, the output of said adders being supplied to said demultiplexer in order to use it as input signals to RAM for correction.

19. A detector according to claim 13 or 17, wherein said signal detector further comprises a third memory means for storing the output of said processing means in sequence, and a means for correcting the contents of said second memory means, said contents being designated by the output of said third memory in connection with the output of said processing means.

20. A detector according to claim 19, wherein said correcting means comprises a second delay circuit means for further delaying the output of said delay circuit means by a predetermined time, a first attenuater in which the output of said second delay circuit is multiplied by a coefficient less than 1, a multiplexer for selecting the content of said second memory based on the output of said third memory, and a second attenuator in which the output of the adder is multiplied by a constant coefficient, the output of said second attenuator being written in said second memory based on the output of said third memory means.

21. A detector according to claim 17, wherein said signal detector further comprises a third memory for storing the output signal of said processing means and means for amendment which is adapted to amend the contents of said second memory designated by the output of said third memory, in connection with the receiving signal and the output of said processing means.

22. A signal detector for use in the digital signal communication, comprising:
   a tentative decision means for assigning certain symbols to receiving digital signals based on a predetermined value;
   a first memory means for storing the output of said tentative decision means in sequence;
   a second memory means for storing a plurality of reference values prepared in association with all the signals to be received, said signals corresponding to the symbol sequence assigned by said first memory means;
   a selection means for selecting at least one of said reference values based on at least a part of the contents of said first memory;
   a delay circuit for delaying the receiving signal by a predetermined time;
   a processing means whrein there is proceeded by using said selected reference value and the output of said delay circuit the process to relate said receiving signal with signals to be received that are most likely signals among all the signals to be received, thereby producing the output;
   a decision means for deciding whether or not the value of said receiving signals is in a predetermined null region; and
   a switching means which is operated by the output of said decision means to cut or connect the signal line from said reference value selecting means to said processing means.

23. A detector according to claim 22, wherein said decision means comprises a slicer which accepts receiving signals; a third memory means which receives the output of said slicer in sequence, said third memory having the same construction as said first memory; and a logic circuit for deciding whether the output of said tentative decision means is correct or incorrect by using the contents of said third memory, the output of said logic circit being supplied to said switching means.

24. A detector according to claim 22 or 23, wherein said switching means supplies a reference value to said processing means when supplying no output of said reference value selecting means to said processing means.

25. A detector according to claim 24, wherein said reference signal supplied to said processing means when supplying no output of said reference value selecting means to said processing means is the earth potential.

26. A signal detector for use in the digital signal communication, comprising:
   a tentative decision means for assigning certain symbols to receiving signals based on a plurality of predetermined values;
   a first memory means for storing the output of said tentative decision means in sequence;
   a second memory means for storing a plurality of reference values prepared in association with all the signals to be received, said signals corresponding to the symbol sequence assigned by said first memory means;
   a selection means for selecting at least one of said reference values based on at least a part of the contents of said first memory;
   a delay circuit for delaying the receiving signal by a predetermined time;
   a processing means wherein there is proceeded by using said selected reference value and the output of said delay circuit the process to relate said receiving signal with signals to be received that are most likely signals among all the signals to be received, thereby producing the output; and
   a decision means for deciding whether the value of said receiving signals is in or out of a predetermined null region, based on at least a part of the contents of said first memory means; and
   a switching means for cutting or connecting the signal line from said reference value selecting means to said processing means by using the output of said decision means.

27. A signal detector for use in the digital communication using 4-value quadrature amplitude modulation system, wherein demodulated signals in phase and in quadrature phase are delected respectively by independent signal detecting channels, each of said detecting channel comprising:
   a tentative decision means for assigning certain symbols to receiving digital signals based on a plurality of predetermined values;
   a first memory means for storing the output of said tentative decision means in sequence;
   a second memory means for storing a plurality of reference values prepared in association with all the signals to be received, said signals corresponding to the symbol sequence assigned by said first memory means;
   a selection means for selecting said reference values based on at least a part of the contents of said first memory;
   a delay circuit for delaying the receiving signal by a predetermined time;
   a processing means wherein there is proceeded by using said selected reference value and the output of said delay circuit the process to relate said receiving signal with signals to be received that are most likely signals among all the signals to be received, thereby producing the output; and a decision means for deciding whether the value of said receiving signals is in or out of a predetermined null region, based on at least a part of the contents of said first memory means; and
   a switching means for cutting or connecting the signal line from said reference value selecting means to said processing means by using the output of said decision means.

28. A detector according to claim 22 or 27, wherein said signal detector further comprises a correction means for correcting the output of said second memory means sequentially by using a correction factor related to the output of said process means.

29. A detector according to claim 26, wherein writing operation to said second memory means are controlled by the output of said decision means.

30. A signal detector for use in the digital signal communication, comprising:
- a variable receiving signal filter means which receives signals supplied and varies its characteristics adaptively;
- a tentative decision means for assigning certain symbols to receiving signals based on the predetermined value;
- a first memory means for storing the output of said tentative decision means in sequence;
- a second memory means for storing a plurality of reference values prepared in association with all the signals to be received, said signals corresponding to the symbol sequence assigned by said first memory means;
- a selection means for selecting at least one of said reference values based on at least a part of the contents of said first memory; and
- a processing means wherein there is provided by using said selected reference values the process to relate said receiving signals with signals to be received that are most likely receiving signals among all the signals to be received, thereby producing output.

31. A detector according to claim 30, wherein said filter means comprises a receiving signal filter means and a control means; said receiving signal filter means being constructed with a delay lines having taps, variable gain circuits receiving the output from each tap of said delay line, and an accumulator for accumulating the output of said variable gain circits; and said control means being constructed with substracting means for subtracting the output of said tentative decision circuit means from that of said accumulator, multipliers for multiplying said tap output by the output of said subtractor, and integraters for integrating the output of said multipliers, of which the output is used for controlling gains of said variable gain circuits.

32. A signal detector for use in the digital signal communication, comprising:
- a tentative decision means for assigning certain symbols to receiving signals based on a predetermined value;
- a first memory means for storing the output of said tentative decision means;
- a plurality of desired receiving signal memory circuit means which are controlled by the contents of said first memory means and stores signals corresponding to all the symbols to be decided;
- a delay circuit means with taps for delaying receiving signals;
- a plurality of calculation means for calculating vector metric by using the tap output of said delay circuit means and the output of a plurality of said desired receiving signal memory circuit means as well;
- a final decision means which selects the minimum of the output from respective calculation means; and
- said desired receiving signal memory circuit means being constructed with memory means for storing respective desired receiving signals and multiplexer for selecting the output from said memory based on the output from said first memory means.

33. A detector according to claim 32, wherein said first memory means comprising a memory means for storing the output of said tentative decision circuit and a memory means for storing the output of said final decision circuit.

34. A detector according to claim 32, wherein said calculation means for calculating vector metric distance comprising a subtracting means for carrying out subtracting operation between the output of said delay circuit and that of said desired receiving signal memory circuit means; a means for squaring the output from said subtracting means; and an accumulater means for accumulating the output of said means for squaring, the output of said accumulater means being, supplied to said final decision circuit means.

35. A signal detector for use in the digital communication using 4-value quadrature amplitude modulation system wherein the output of the detector is produced by using demodulated signals in phase and in quadrature phase, comprising:
- a tentative decision means for assigning certain symbols to receiving signals of two series independently based on a predetermined value;
- a first memory means for storing the output of said tentative decision means;
- a plurality of desired receiving signal memory circuit means which are controlled by the contents of said first memory means connected to both signal series and store signals corresponding to all the symbols to be decided;
- a delay circuit means with taps for delaying the receiving signal;
- a plurality of calculation means for calculating respective vector metric by using the output of said delay circuit means and the output of a plurality of said desired receiving signal memory circuit means as well; and
- a final decision means which selects the minimum of the output from respective said calculation means, said respective desired receiving signal memory circuit means being constructed with third memory means for storing respective desired receiving signals and a multiplexer for selecting the output from said memory based on the output from said first memory means.

36. A detector according to claim 35, wherein said third memory and multiplexer are constructed with single ROM, of which the output is transmitted to said means for calculating vector metric through a means for converting said ROM output into analog signals.

37. A signal detector for use in the digital communication, comprising:
- a tentative decision means for assigning certain symbols to receiving signals based on a predetermined value;
- a first memory means for storing the output of said tentative decision means;
- a plurality of desired receiving signal memory circuit means which are controlled by the contents of said first memory means and store signals corresponding to all the symbols to be decided;
- delay circuit means with taps for delaying the receiving signal;
- a plurality of calculation means for calculating respective vector metric by using the output of said delay circuit means and the output of a plurality of said desired receiving signal memory circuit means;
- a final decision means for selecting the minimum of calculation results by said calculation means; and a desired receiving signal adaptation circuit means which receives the output from said delay circuit means, desired receiving signal memory circuit means, and final decision circuit means; each of said desired receiving signal memory circuit means having the second memory for storing desired receiving signal and multiplexer for selecting the output of said second memory means based on the output of said first memory means, and said desired receiving signal adaptation circuit means correcting the contents of said second memory by using said respective output.

38. A detector according to claim 37, wherein said desired receiving signal adaptation circuit means comprises multiplexers for selecting the output of said desired receiving signal memory circuit means by the output of said final decision circuit means; subtraction means for subtracting the multiplexer output from the output of said delay circuit; an attenuation means for multiplying the output of said subtraction means by a constant coefficient, and adders for adding the output of said attenuation means to that of said multiplexer, the output of said adders being written into said second memory in response to the output of said final decision circuit means.

39. A signal detector for use in the digital communication using 4-value quadrature amplitude modulation system wherein the output of the detector is produced by using demodulated signals in phase and in quadrature phase, comprising:
  a tentative decision means for assigning certain symbols to receiving signals of two series independently based on a predetermined value;
  a first memory means for storing the output of said tentative decision means;
  a plurality of desired receiving signal memory circuit means which are controlled by the contents of said first memory means connected to both signal series and store signals corresponding to all the symbols to be decided;
  a delay circuit means with taps for delaying the receiving signal;
  a plurality of calculation means for calculating respective vector metric by using the output of said delay circuit means and the output of a plurality of said desired receiving signal memory circuit means as well; and
  a final decision means which selects the minimum of the output from respective said calculation means; and
  a desired receiving signal adaptation circuit means which receives the output from said delay circuit means, desired receiving signal memory circuit means, and final decision circuit means, each of said desired receiving signal memory circuit means having a second memory means for storing desired receiving signals and a multiplexer for selecting the output of said second memory means based on the output of said first memory means, and said desired receiving signal adaptation circuit correcting the contents of said second memory by using said respective output.

40. A signal detector for use in the digital signal communication, comprising:
  a tentative decision means for assigning certain symbols to receiving signals based on a predetermined value;
  a first memory means for storing the output of said tentative dicision means;
  a plurality of desired receiving signal memory circuit means which are controlled by the contents of said first memory means and stores signals corresponding to all the symbols to be decided;
  a delay circuit means with taps for delaying receiving signals;
  a pluarlity of calculation means for calculating vector metric by using the tap output of said delay circuit means and the output of a plurality of said desired receiving signal memory circuit means as well;
  a final decision means which selects the minimum of the output from respective calculation means; and
  a second memory means for storing the output of said final decision circuit means sequentially; and
  a desired receiving signal adaptation circuit which is adapted to receive the output from said delay circuit, a desired receiving signal memory circuit, a second memory means and final decision circuit, each of said desired receiving signal memory circuit having a third memory means for storing respective desired receiving signals, a multiplexer means for switching the output of said first and second memory at a predetermined timing, and a switching means for controlling supply of the output of said adaptation circuit means to said third memory means according to the specific contents of the second memory means, said adaptation circuit means correcting said desired receiving signals of said third memory based on said respective output and said second memory output.

41. A signal detector for use in the digital communication using 4-value quadrature complitude modulation system wheren the output of the detector is produced by using demodulated signals in phase and in quadrature phase, comprising:
  a tentative decision means for assigning certain symbols to receiving signals of two series independently based on a predetermined value;
  a first memory means for storing the output of said tentative decision means;
  a plurality of desired receiving signal memory circuit means which are controlled by the contents of said first memory means connected to both signal series and store signals corresponding to all the symbols to be decided;
  a delay circuit means with taps for delaying the receiving signal;
  a plurality of calculation means for calculating respective vector metric by using the output of said delay circuit means and the output of a plurality of said desired receiving signal memory circuit means as well; and
  a final decision means which selects the minimum of the output from respective said calculation means;
  a second memory means for storing the output of said final decision circuit means sequentially; and
  a desired receiving signal adaptation circuit which is adapted to receive the output from said delay circuit, desired receiving signal memory circuit, a second memory means and final decision circuit, each of said desired receiving signal memory circuit having a third memory means for storing respective desired receiving signals, a multiplexer means for switching the output of said first and second memory at a predetermined timing, and a switching means for controlling supply of the output of said adaptation circuit means to said third memory means according to the specific contents of the second memory means, said adaptation circuit means correcting said desired receiving signals of said third memory based on said respective output and said second memory output.

42. A signal detector for use in the digital signal communication, comprising:
   a tentative decision means for assigning certain symbols to receiving signals based on a predetermined value;
   a first memory means for storing the output of said tentative dicision means;
   a plurality of desired receiving signal memory circuit means which are controlled by the contents of said first memory means and stores signals corresponding to all the symbols to be decided;
   a delay circuit means with taps for delaying receiving signals;
   a decision means for deciding whether values of said receiving signals are in or out of the predetermined null region;
   a plurality of desired typical receiving signal value memory means for storing values which represents typical values stored by a plurality of said desired receiving signal memory means;
   a switching means which supplies its output of either said desired receiving signal memory circuit means or desired typical receiving signal value memory circuit means based on the output of said decision means;
   a plurality of calculation means for calculating respective vector metric by using the tap output of said delay circuit means and the output of a plurality of said desired receiving signal memory circuit means; and
   a final decision circuit means which select the minimum of the output from respective calculation means,
   each of said desired receiving signal memory circuit means consisting of second memory means for storing respective desired receiving signals and multiplexer means which select the output of said memory means based on the output from said first memory means.

43. A signal detector for use in the digital communication using 4-value quadrature complitude modulation system wherein the output of the detector is produced by using demodulated signals in phase and in quadrature phase, comprising:
   a tentative decision means for assigning certain symbols to receiving signals of two series independently based on a predetermined value;
   a first memory means for storing the output of said tentative decision means;
   a plurality of desired receiving signal memory circuit means which are controlled by the contents of said first memory means connected to both signal series and store signals corresponding to all the symbols to be decided;
   a delay circuit means with taps for delaying the receiving signal;
   a decision means for deciding whether values of said receiving signals are in or out of the predetermined null region;
   a plurality of desired typical receiving signal value memory means for storing values which represents typical values stored by a plurality of said desired receiving signal memory means;
   a switching means which supplies its output of either said desired receiving signal memory circuit means or desired typical receiving signal value memory circuit means based on the output of said decision means;
   a plurality of calculation means for calculating respective vector metric distance by using the tap output of said delay circuit means and the output of a plurality of said desired receiving signal memory circuit means; and
   a final decision circuit means which select the minimum of the output from respective calculation means,
   each of said desired receiving signal memory circuit means consisting of second memory means for storing respective desired receiving signals and multiplexer means which select the output of said memory means based on the output from said first memory means.

44. A detector according to claim 42 or 43, wherein the signal detector further comprises a decision means for deciding whether the output of said calculation means for calculating vector metric distance is larger or smaller than the predetermined value that is set in advance.

45. A detector according to claim 42 or 43, wherein said detector further comprises a third memory for storing the output of said final decision circuit sequentially; and a desired receiving signal adaptation circuit means which receives the output from said delay circuit means, said desired receiving signal memory circuit means, and said final decision circuit means; said desired receiving signal adaptation circuit means correcting said desired receiving signal stored by said second memory based on said respective output and the output of said third memory.

46. A signal detector for use in the digital signal communcation, comprising:
   variable receiving signal filter means which receive digital signals supplied and vary its characteristics adaptively;
   a tentative decision means for assigning certain symbols to receiving signals based on a predetermined value;
   a first memory means for storing the output of said tentative dicison means;
   a plurality of desired receiving signal memory circuit means which are controlled by the contents of said first memory means and stores signals corresponding to all the symbols to be decided;
   a delay circuit means with taps for delaying receiving signals;
   a decision means for deciding whether values of said receiving signals are in or out of the predetermined null region;
   a plurality of desired typical receiving signal value memory means for storing values which represents typical values stored by a plurality of said desired receiving signal memory means;
   a switching means which supplies its output of either said desired receiving signal memory circuit means or desired typical receiving signal value memory circuit means based on the output of said decision means;
   a plurality of calculation means for calculating respective vector metric by using the tap output of said delay circuit means and the output of a plurality of said desired receiving signal memory circuit means; and a final decision circuit means which select the minimum of the output from respective calculation means, each of said desired receiving signal memory circuit means consisting of second memory means for storing respective desired receiving signals and multiplexer means which select the output of said memory means based on the output from said first memory means.

47. A detector according to claim 42, 43, or 46, wherein, said detector further comprises a correction means for correcting desired receiving signals of said second memory means by using the output from said delayed circuit, said desired receiving signal memory circuit, and said final decision circuit means.

48. A detector according to claim 46, wherein said detector further comprises a third memory for storing the output of said final decision circuit sequentially; and a desired receiving signal adaptation circuit means which receives the output from said delay circuit means, said desired receiving signal memory circuit means, and said final decision circuit means; said desired receiving signal adaptation circuit means correcting said desired receiving signal stored by said second memory based on said respective output and the output of said third memory.

* * * * *